US007515914B2

(12) United States Patent
Herrod et al.

(10) Patent No.: US 7,515,914 B2
(45) Date of Patent: Apr. 7, 2009

(54) TERMINAL WITH OPTICAL READER FOR LOCATING PRODUCTS IN A RETAIL ESTABLISHMENT

(75) Inventors: Allan Herrod, Farmingville, NY (US);
John Klein, Morgan Hill, CA (US);
Sarosh Vesuna, Los Altos, CA (US);
Simon Bard, Setauket, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 1166 days.

(21) Appl. No.: 10/057,463

(22) Filed: Jan. 24, 2002

(65) Prior Publication Data
US 2003/0181168 A1 Sep. 25, 2003

Related U.S. Application Data

(62) Division of application No. 08/906,722, filed on Aug. 5, 1997, now Pat. No. 6,405,049.

(51) Int. Cl.
*H04Q 7/20* (2006.01)
(52) U.S. Cl. .............. 455/456.1; 455/456.3; 455/404.2; 455/9
(58) Field of Classification Search .............. 455/159.2, 455/403, 414.1, 421, 422.1, 423, 425, 158.4, 455/158.5, 404.2, 407, 456.1, 456.3, 456.6, 455/457, 461, 9; 235/462.11, 462.12, 462.13, 235/462.14, 462.15, 462.24, 462.49, 477.82, 235/472.63
See application file for complete search history.

(56) References Cited

U.S. PATENT DOCUMENTS

| | | | |
|---|---|---|---|
| 4,807,143 A * | 2/1989 | Matsuura ..................... 700/131 |
| 4,882,724 A | 11/1989 | Vela et al. |
| 4,929,819 A * | 5/1990 | Collins, Jr. ................... 235/383 |
| 5,095,196 A * | 3/1992 | Miyata ....................... 235/382 |
| 5,325,483 A * | 6/1994 | Ise et al. ...................... 345/501 |
| 5,414,251 A * | 5/1995 | Durbin .................... 235/462.2 |
| 5,559,707 A | 9/1996 | DeLorme et al. |
| 5,717,430 A * | 2/1998 | Copland et al. ............. 345/168 |
| 5,721,679 A * | 2/1998 | Monson ...................... 701/207 |
| 5,751,583 A * | 5/1998 | Kyuno et al. ................ 700/137 |
| 5,754,872 A * | 5/1998 | Miyake et al. ................. 704/8 |
| 5,756,978 A * | 5/1998 | Soltesz et al. ............... 235/380 |
| 5,778,177 A * | 7/1998 | Azar .......................... 709/202 |
| 5,812,985 A | 9/1998 | Failing et al. |
| 5,821,512 A | 10/1998 | O'Hagan |
| 5,890,135 A * | 3/1999 | Powell ........................ 705/14 |
| 5,918,211 A * | 6/1999 | Sloane ........................ 705/16 |
| 5,959,869 A * | 9/1999 | Miller et al. ................ 700/231 |
| 5,991,276 A * | 11/1999 | Yamamoto .................. 370/260 |

(Continued)

FOREIGN PATENT DOCUMENTS

EP  07878999  6/1997

*Primary Examiner*—CongVan Tran
(74) *Attorney, Agent, or Firm*—Amin, Turocy & Calvin, LLP

(57) ABSTRACT

A product location information retrieval system for use by a customer in a retail establishment including a computer terminal with an optical reader arranged to receive a data input query from the customer using the terminal and relating to a product, and a display in the terminal for displaying an image of a product to be accessed by the user.

19 Claims, 29 Drawing Sheets

U.S. PATENT DOCUMENTS

| | | | | |
|---|---|---|---|---|
| 5,992,749 A | * | 11/1999 | Seo | 235/472.01 |
| 6,026,376 A | * | 2/2000 | Kenney | 705/27 |
| 6,039,258 A | * | 3/2000 | Durbin et al. | 235/472.01 |
| 6,105,004 A | * | 8/2000 | Halperin et al. | 705/28 |
| 6,129,276 A | | 10/2000 | Jelen et al. | |
| 6,204,879 B1 | * | 3/2001 | Koseki et al. | 348/230.1 |
| 6,308,888 B1 | | 10/2001 | Swartz | |
| 6,321,992 B1 | | 11/2001 | Knowles et al. | |

* cited by examiner

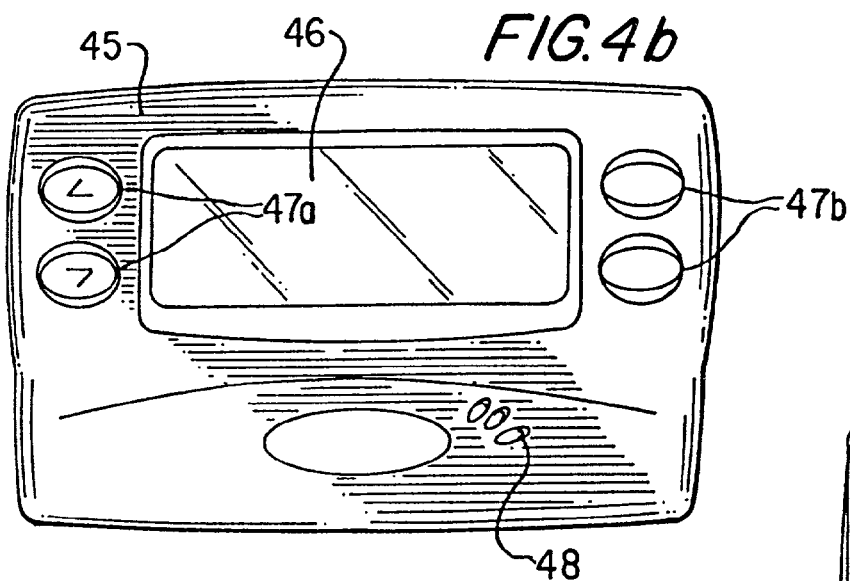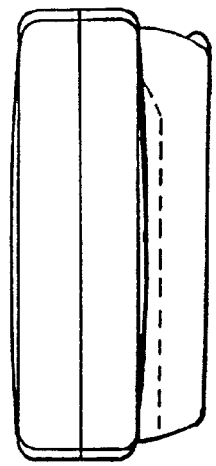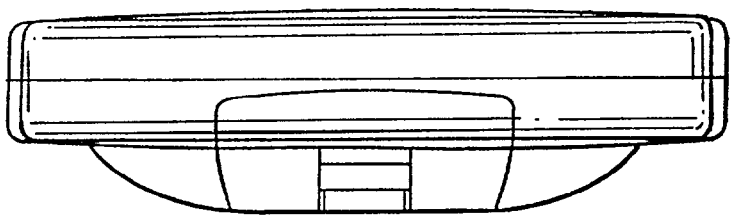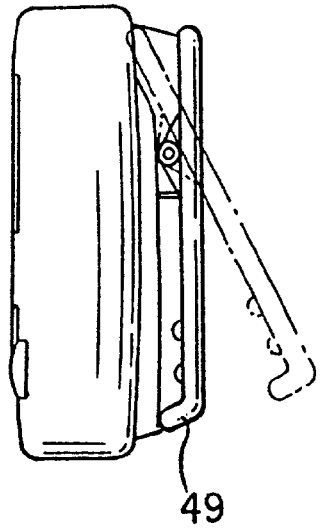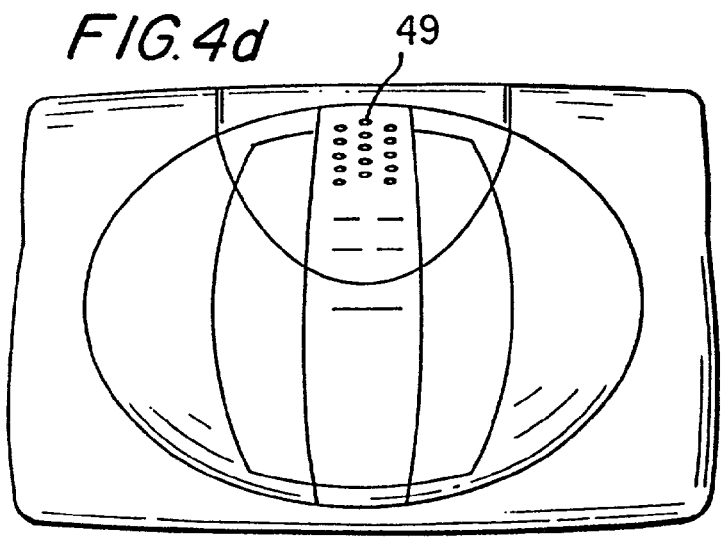

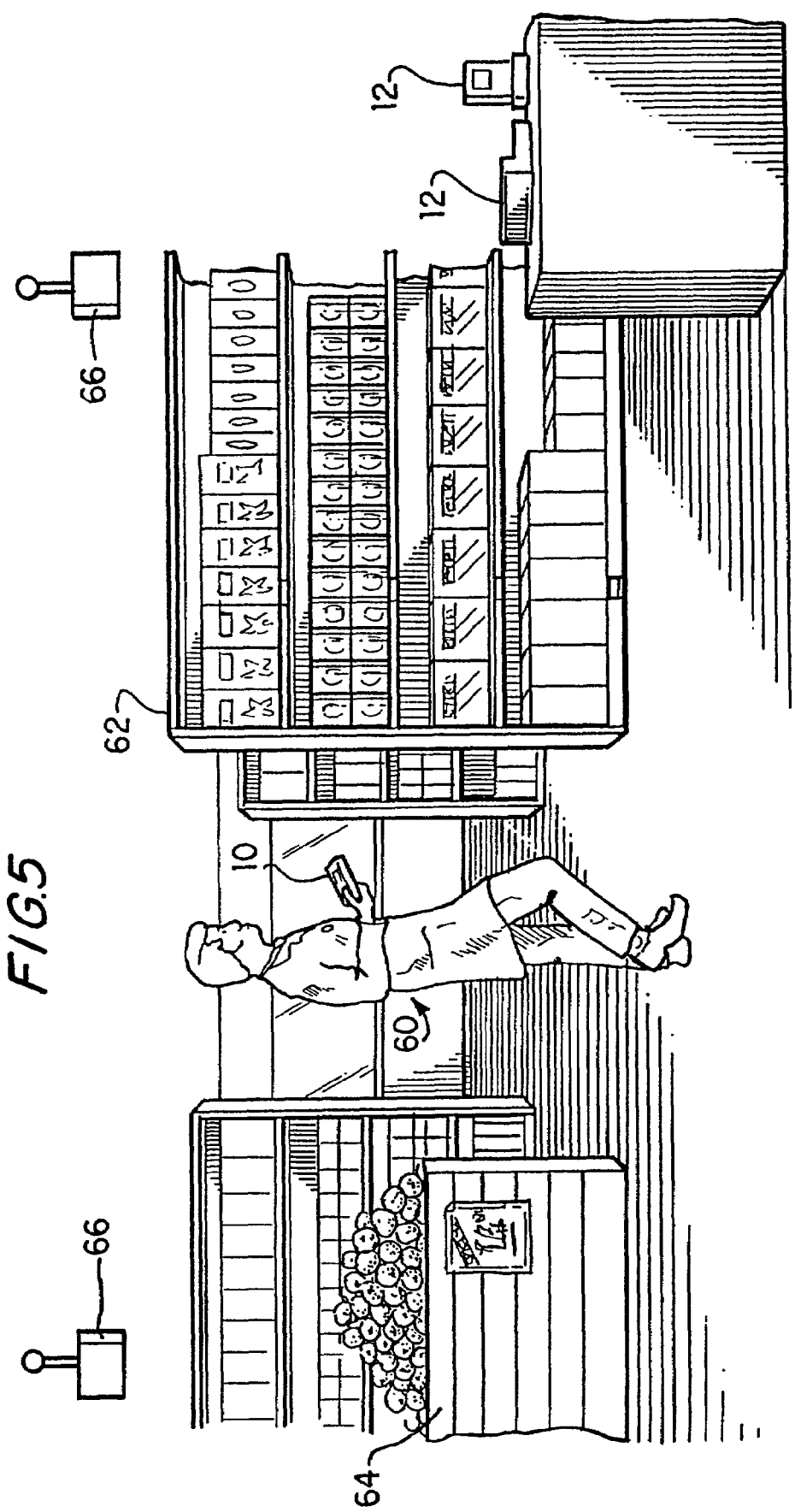

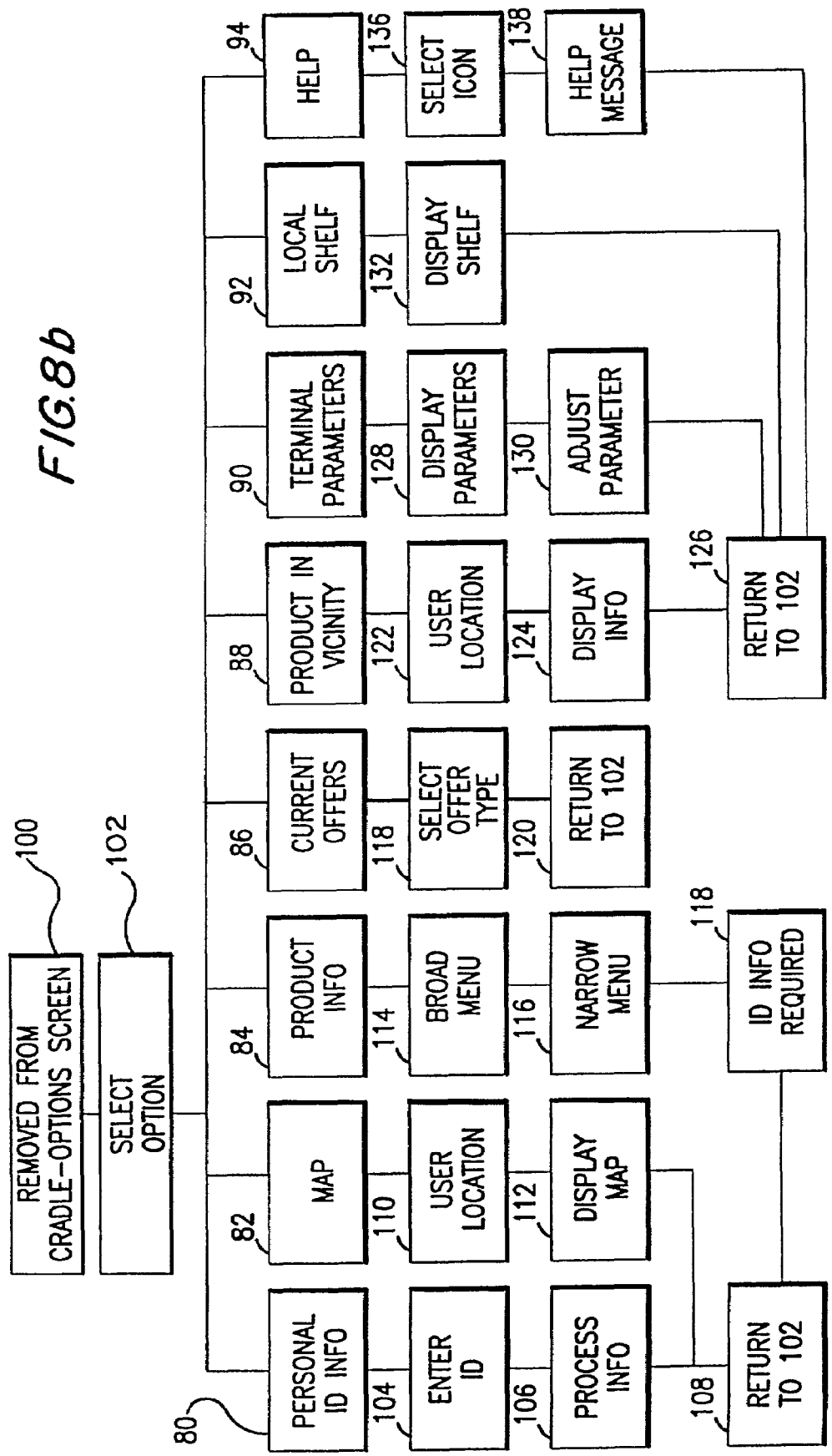

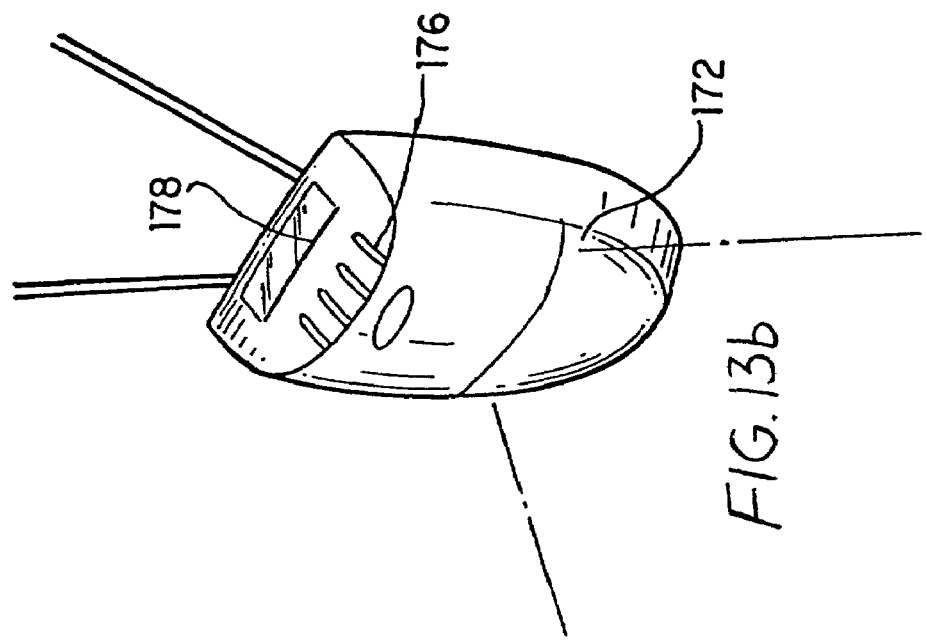
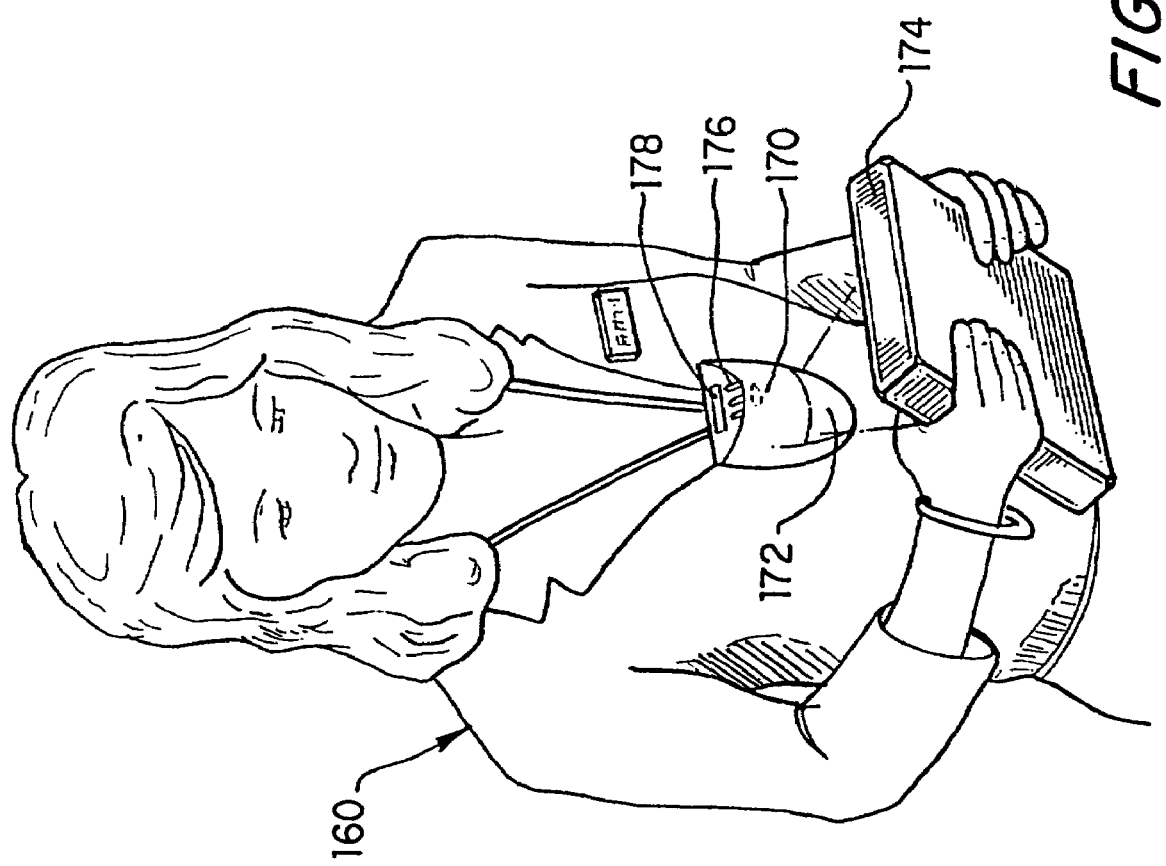
FIG. 13b
FIG. 13a

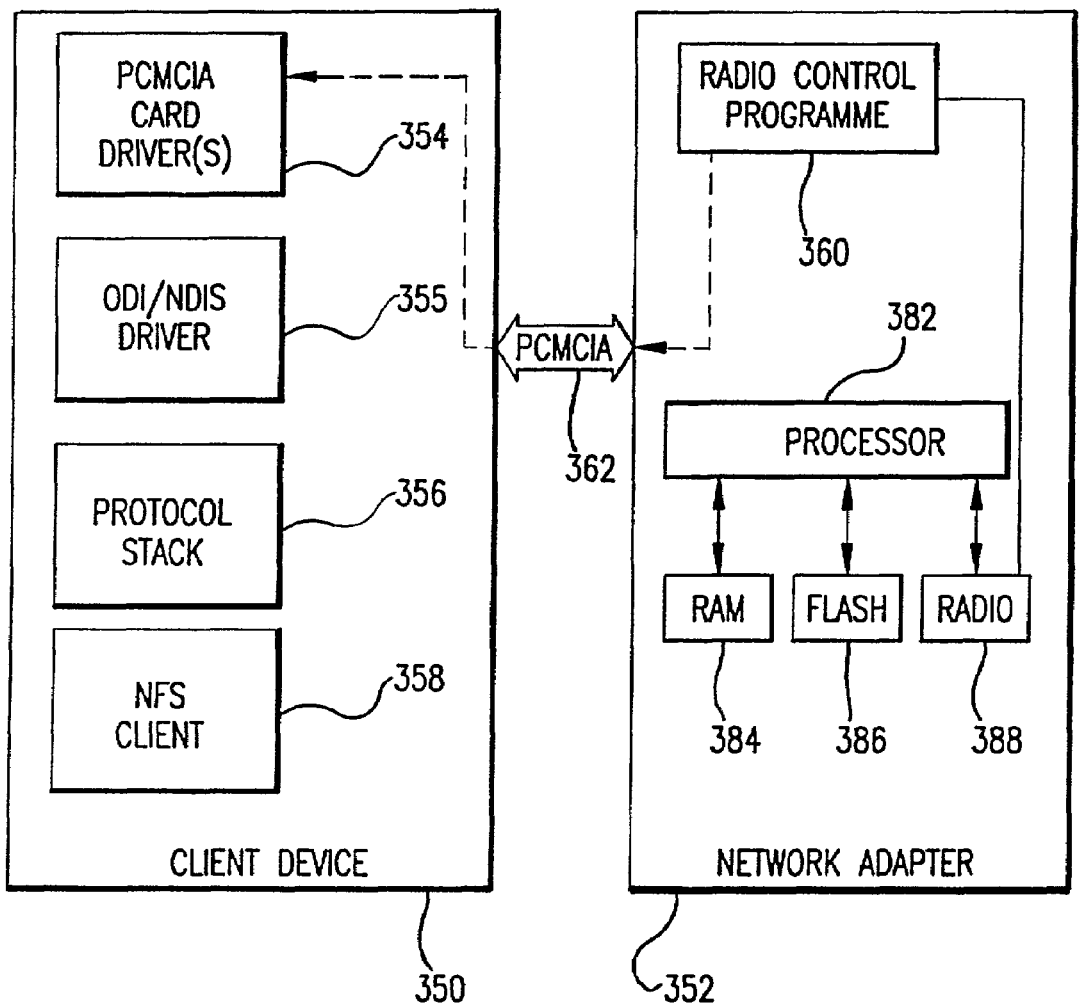
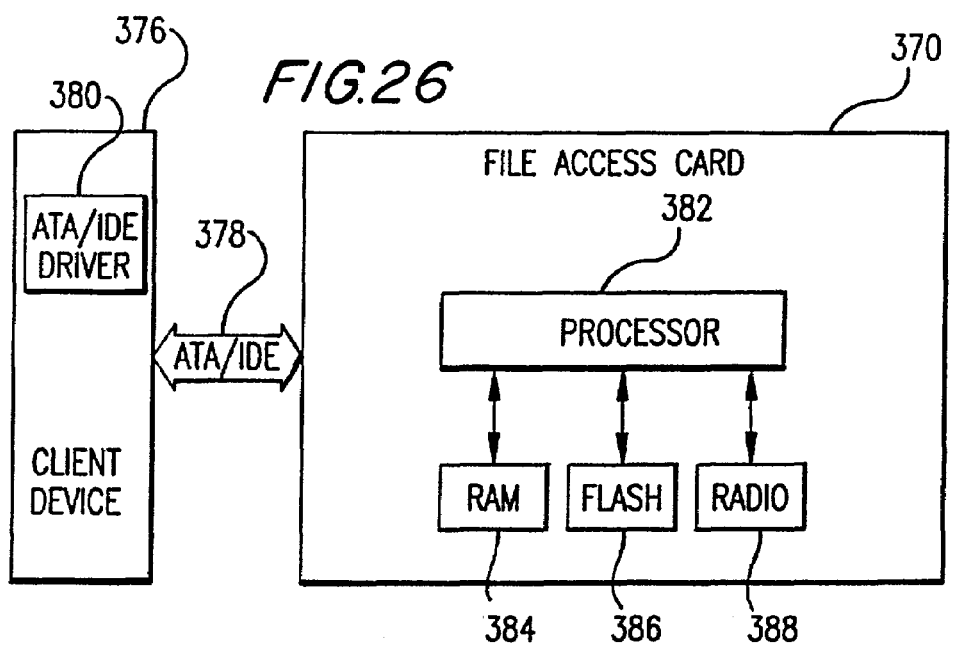

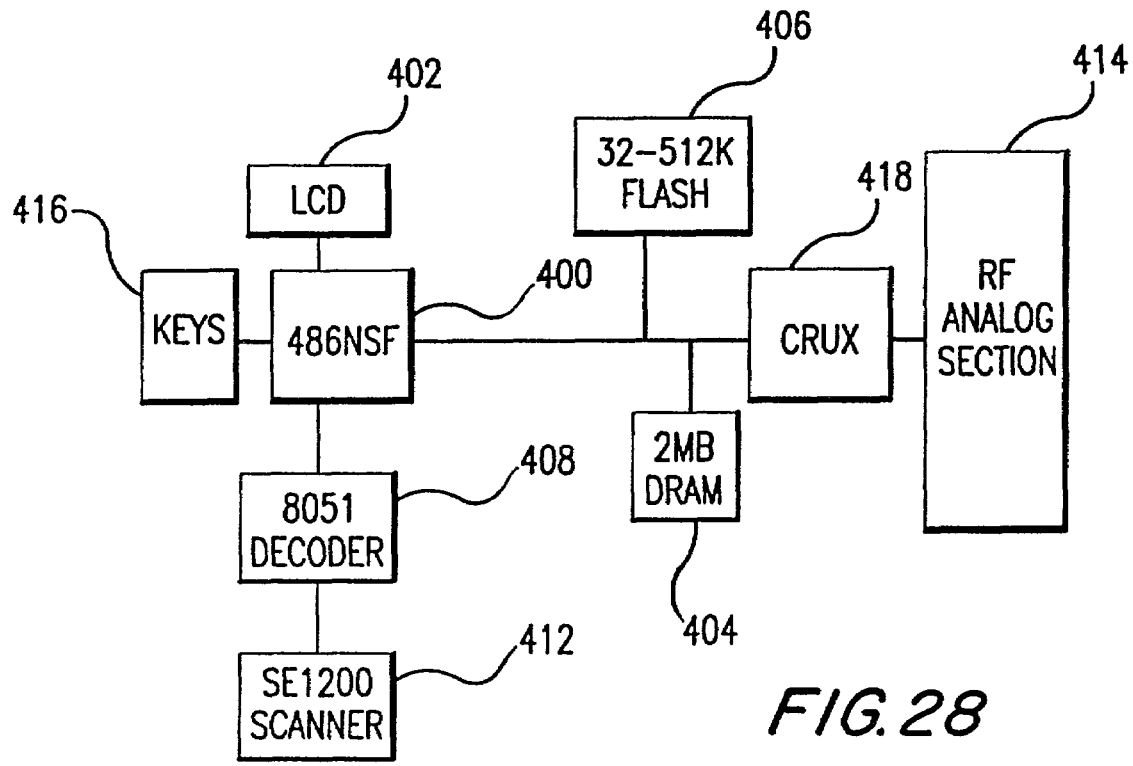
FIG. 28
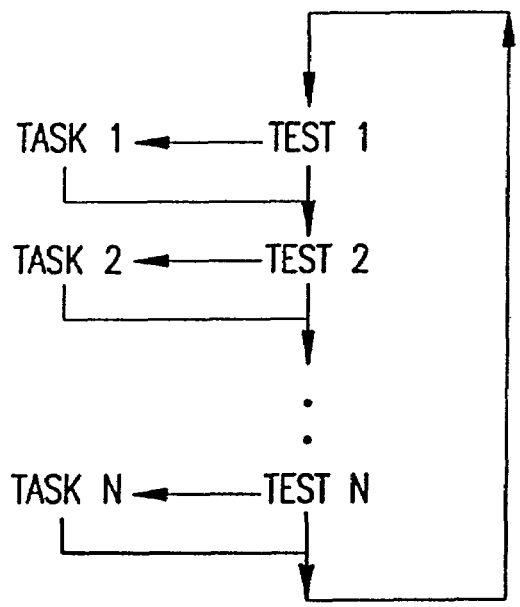
FIG. 29
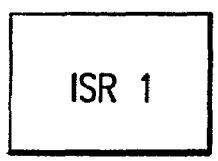
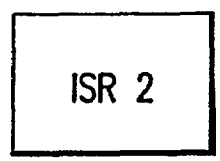

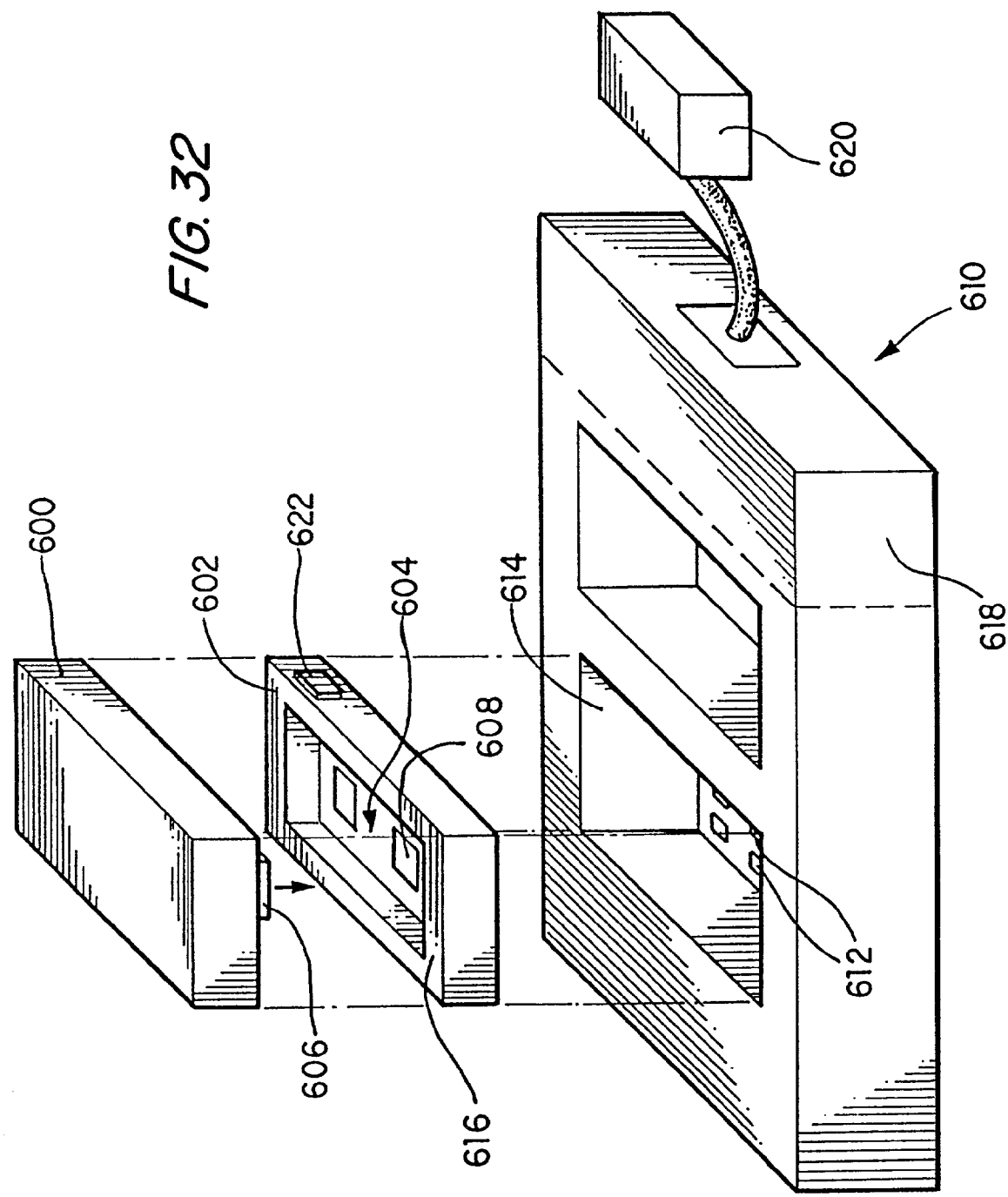

TERMINAL WITH OPTICAL READER FOR LOCATING PRODUCTS IN A RETAIL ESTABLISHMENT

This application is a divisional of application Ser. No. 08/906,722, filed on Aug. 5, 1997, now U.S. Pat. No. 6,405,049.

BACKGROUND OF THE INVENTION

1. Field of the Invention

The invention relates to computer terminals and systems for use in retail establishments for use by customers to locate a product, and in particular, to terminals including a bar code reader.

2. Description of the Related Art

Conventional portable data terminals comprise a data display, data input means such as a keyboard and data storage and processing means. A wide range of applications are now available on such terminals including word-processing, spread-sheeting, data base applications and so forth. Much of the development work in known portable data terminals is centered on increasing the data storage and processing capabilities. This has led to increases in cost and size/weight (and the corresponding need to subsequently miniaturise components) together with increased complexity leading to increased potential for defect or breakdown.

In another aspect, U.S. Pat. No. 5,410,326 relates to a programmable remote control device for interacting with a plurality of remotely controlled devices. The remote control device is configured to control a variety of devices and carries pictorial icons representing the different functions for selection by the user. The device is further configured to receive and display advertising messages, and operate various other functions such as electronic mail and order-out meal delivery. The system is, however, complex and cumbersome and of limited adaptability.

U.S. Pat. No. 5,521,370 relates to a hand-held portable data capture terminal for example for warehousing, which is mountable in a terminal mount for data communication with a host computer and/or battery recharging. The specification is directed to a data interface between the terminal and the terminal mount comprising abutting electrical contact pads. The terminal is arranged only to communicate with the terminal mount when it is docked therein. The terminal carries a processor and memory system serving as a communication controller and can be arranged to act as network controllers when docked. A difficulty with such a system is that a considerable processing and memory capability is included in the hand-held terminal and that data is only downloaded when the terminal is docked in terminal mount.

U.S. Pat. No. 5,280,621 relates to a control system for a personal computer. In conventional personal computers a system control processor provided an interface between the host processor and peripheral such as a keyboard. System performance was limited because of the slow communication rate between the system control processor and the keyboard, and was further degraded when the system control processor handled additional control burdens such as battery power management, external bus expansion control and so forth. According to U.S. Pat. No. 5,280,621 it is proposed to introduce microcontrollers to provide communication between respective peripheral devices and the system control processor, freeing the system control processor to do other tasks improving the overall system performance.

The question of power management in portable devices has been addressed in various manners conventionally. U.S. Pat. No. 5,027,294 relates to monitoring the voltage discharge of a battery power supply in which the user is issued warnings at various depletion levels allowing memory back-up, avoidance of over-depletion and so forth. U.S. Pat. No. 5,504,413 recites a battery charging system including feedback input allowing minimisation of overhead voltage levels, and connection of a recharging device to a peripheral device via a port at the recharger. U.S. Pat. No. 5,487,181 refers to power minimisation providing a main processor and a lower power processor which allows the main processor to "sleep" except when required. The lower power processor carries out various minor functions allowing the main processor to sleep as far as possible whilst being awoken as soon as required. U.S. Pat. No. 5,511,205 relates power management in a portable pen-based notebook computer. The system has a plurality of independently controllable power planes selectively powerable to ensure that a particular task is performed with minimum power consumption. In addition separate CPU's operate synchronously in relation to one another reducing the amount of processing time the main CPU is required to dedicate to the power management function.

SUMMARY OF THE INVENTION

Objects of the Invention

An object of the invention is to overcome or mitigate problems or disadvantages with prior art arrangements.

A particular object of the invention is to provide a simple and reliable portable data terminal.

A further object of the invention is to provide a simple reliable cradle for co-operation with a portable data terminal.

A further object of the invention is to provide a user interface between a portable data terminal that is simple to use and adapt dependent on the desired implementations.

Features of the Invention

According to the one aspect the invention relates to a data processing system comprising a portable terminal and a terminal mount wherein the mount includes a terminal interface and processor capability for processing data received from the terminal and the terminal includes a user interface, a mount interface and processor capability sufficient only to relay user input to the mount for processing and data from the mount to the user interface. Thus an ultra thin client is provided at the terminal, the mount carrying out the majority of the computing functions.

In another aspect the invention relates to a data processing system comprising a stand-alone data terminal, docking means for docking the terminal and a host network, the terminal including a user input and docking means interface arranged to relay user input to the mount and the mount including a terminal interface and a host interface arranged to relay the user input to the host, for processing and a method of relaying data between a portable terminal and a base station comprising the steps of inputting data to the terminal, relaying the data to the base station with minimal processing and processing the data at the base station. Optionally, therefore, the majority of the processing power can be maintained at the host, allowing a thin docking means or cradle.

According to another aspect the invention provides a product information retrieval system comprising a portable terminal arranged to receive data from one or more data output points in a product access zone in which the terminal is arranged to display an image of a product to be accessed in response to data received from the data output point and a method of retrieving product information in which a portable terminal is provided in a product access zone and receives data from one or more data output points, and in which the terminal displays an image of a product to be accessed in response to data received from a data output point, and a portable data terminal for operation in an operation zone having one or more physical items located at predetermined positions in the zone wherein the data terminal comprises a communications receiver and/or transmitter and a display arranged to display icon's representative of the physical item and/or its position in the operation zone. This icon based system allows a highly user-friendly, efficient and human-error free file system to be implemented.

According to another aspect there is provided a terminal mount for mounting a portable data terminal, the mount being adapted for wireless communication with the data terminal, wherein the mount is arranged to receive or derive display format information for a terminal to be mounted thereon and configure data to be displayed at the terminal according to the display format.

According to another aspect there is provided a data communications system comprising a portable data communication device and a device mount arranged to releasably receive the device, in which the device mount includes a user identification information input and a device lock arranged to release the device on input of approved user identification information and a method of monitoring access to a portable data communication device wherein the portable data communication device is releasably received in a device mount, a user inputs user identification information to the mount, the mount releases the device if the identification information is approved and, simultaneously, commences the timer, the timer is stopped when the terminal is reinserted on the mount and the identified user is billed for the timed period between release and reinsertion of the device. This arrangement is particularly suitable for rental in a public place such as an airport or retail outlet ("self shopper").

The invention further relates to a data communication device including wireless communication means for communicating with one or more access points to a local computer network, the device further comprising cellular telephone means for conventional telephone communication when the device is out of range of the access points to local computer network, a goods transport tracking system comprising a communication device for a transport vehicle arranged to log receipt and/or delivery of goods and including means for wireless communication with a communication network and means for creating a data file accessible via the communication network to provide receipt/delivery information, a goods transport tracking network comprising a physical network of transfer points comprising transport vehicles and intermediate stations and a communications network, in which an interface to the communications network is provided at each transfer point and in which the passage of goods is logged at each transfer point allowing transport information to be accessed at the communications network, a rechargeable battery pack for an electrically powered device arranged to be received in a battery charger for recharging, in which the battery pack has predetermined recharging requirements and includes recharging control circuitry for controlling the recharge operation to meet the predetermined requirements and a battery recharger for receiving and recharging a rechargeable battery pack having predetermined recharging requirements and responsive to recharging control means on the battery pack to control recharge operation to meet the predetermine recharging requirements.

The invention further provides a data device arranged to communication with a communication network including an adapter module interface and an adapter module in which the adapter module carries network communication capability and an adapter module for a data device communicating with a communication network in which the adapter module carries network communication capability for the device. As a result transparent network file access is achieved.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings. Further features of the invention are set out in the appended independent claims, and further preferred features are set out in the dependent claims.

BRIEF DESCRIPTION OF THE DRAWINGS

FIG. 4b is a plan view of an alternative terminal;

FIG. 4c is a side view of the terminal of FIG. 4b;

FIG. 4d is a rear view of the terminal of FIG. 4b;

FIG. 4e is another side view of the terminal of FIG. 4b;

FIG. 4f is a further side view of the terminal of FIG. 4b;

FIG. 5 shows a schematic representation of one possible use of a terminal according to the present invention;

FIG. 8b shows a flow diagram representing operation of the terminal;

FIG. 13a is a schematic representation of yet a further application of the terminal of the present invention;

FIG. 13b shows a pendant-type terminal;

FIG. 25 is a block diagram showing operation of a standard Client Device and File Access Card;

FIG. 26 is a block hardware diagram of an alternative Client Device and File Access Card system;

FIG. 28 shows a hardware model for a web-enabled terminal;

FIG. 29 shows a task structure for the arrangement of FIG. 28;

FIG. 32 shows an alternative inventive battery pack;

DETAILED DESCRIPTION OF THE PREFERRED EMBODIMENTS

Figure 1:
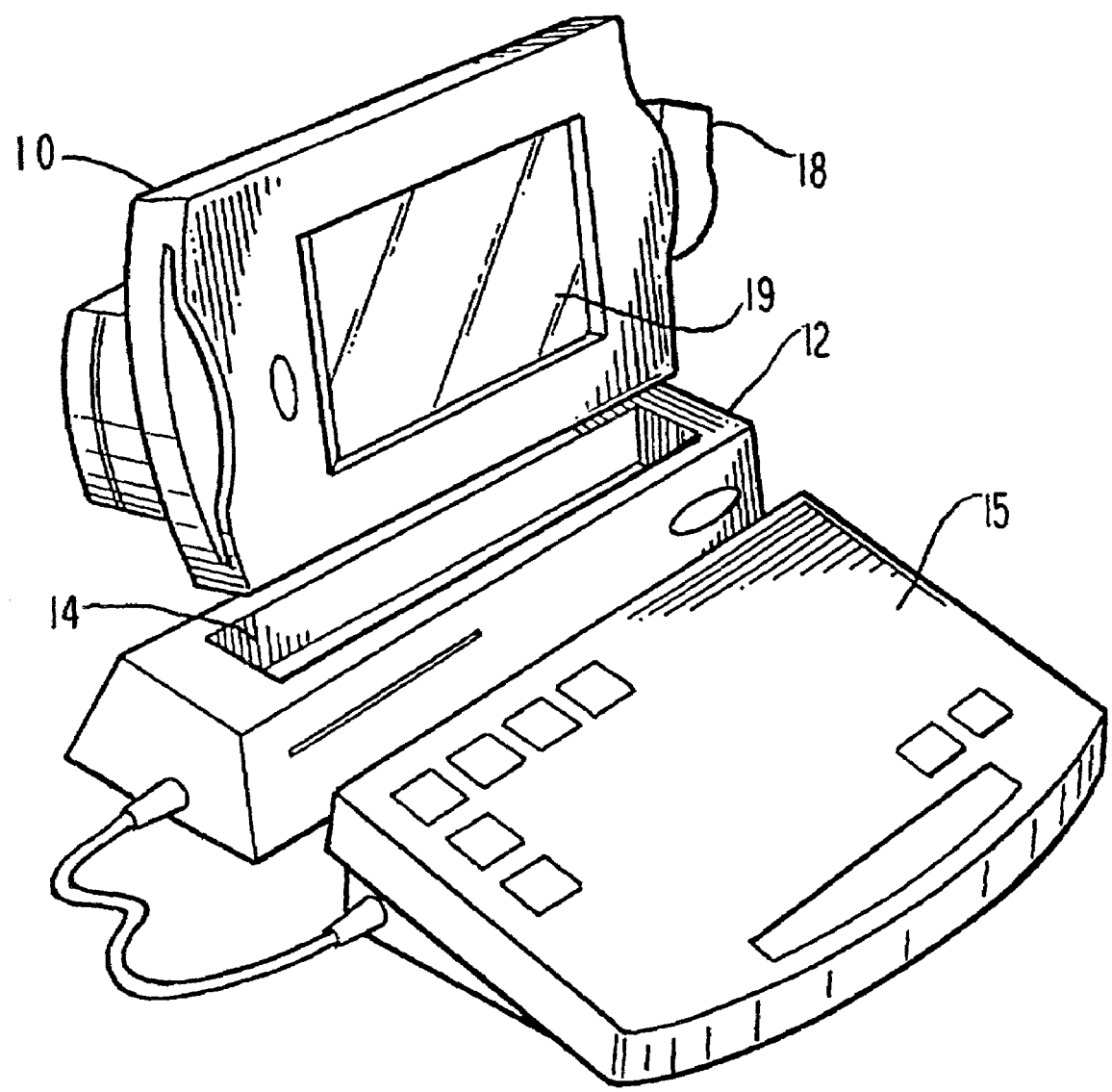
FIG. 1 shows a terminal and cradle according to the present invention.
Figure 2A:
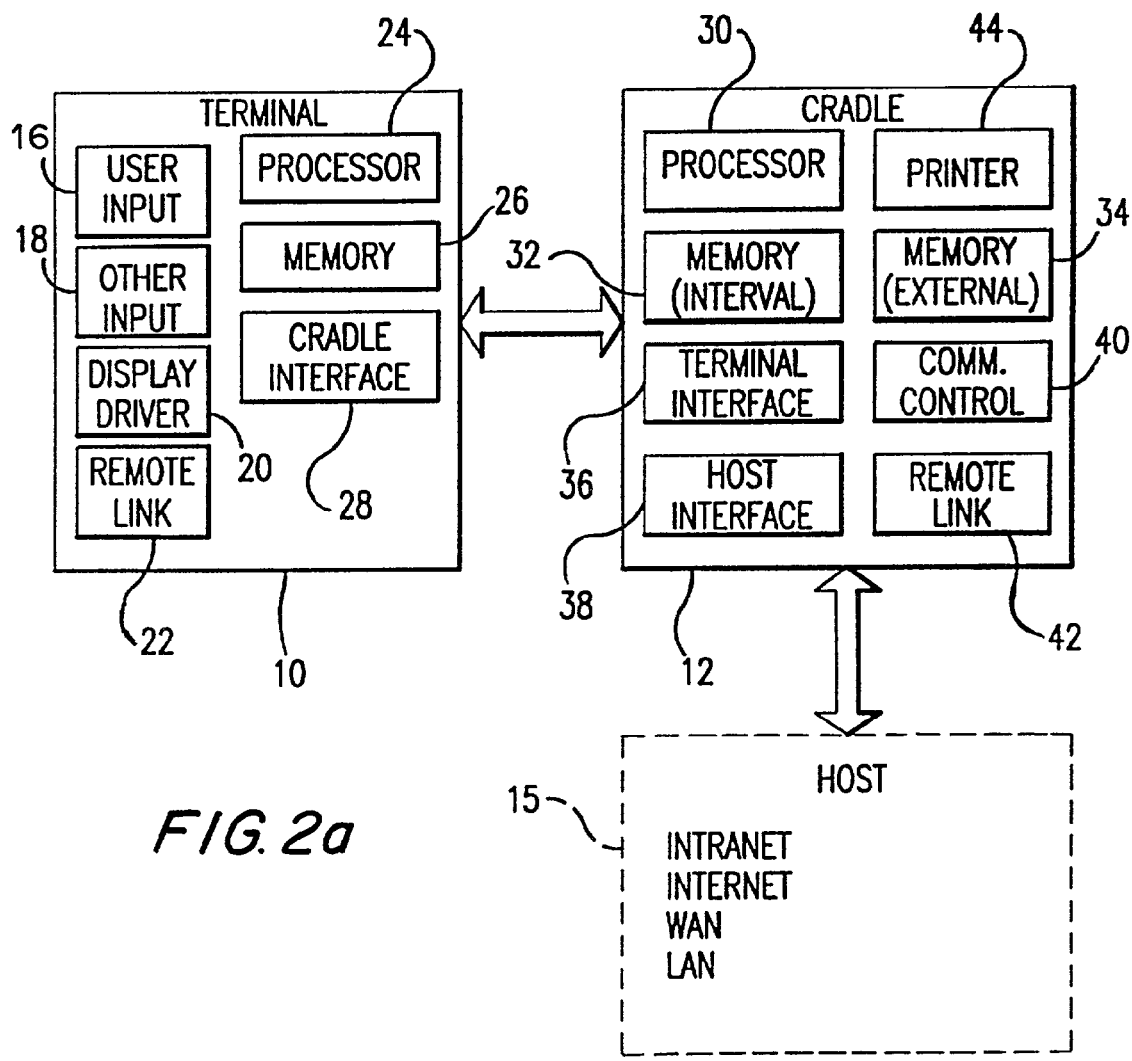
FIG. 2a is a block diagram of a terminal/cradle arrangement.
Figure 2B:
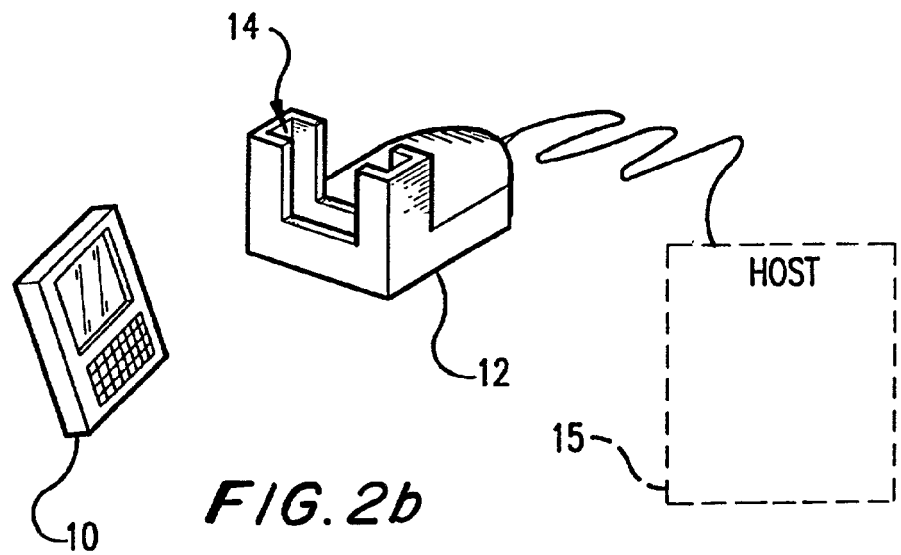
FIG. 2b is a schematic diagram of a terminal/cradle arrangement.

FIGS. 1, 2a and 2b show the basic components of the system according to the present invention. A portable terminal 10, for example a hand-held computer of the personal digital assistant type which can optionally carry scanning/barcode reading capabilities is arranged to interface with a cradle 12 via a physical connection. For example the terminal 10 is inserted into a suitable recess 14 in the cradle 12. The cradle 12 is itself connected with a host system 15 which can be a stand-alone computer, or part of an Intranet/LAN or Internet/WAN.

The basic components of the terminal 10,12 cradle and host 15 are standard and interconnected in standard ways using known interfaces and communication protocols except where otherwise indicated below. Accordingly full hardware details of the components are not discussed in detail here as they will be well known to the skilled reader. A brief discussion of the various components and their uses and interconnections is provided below, however.

As shown in FIG. 2a the terminal conventionally comprises a user input 16, an "other input" 18, a display driver 20, a remote link 22, a processor 24, a memory 26, and a cradle interface 28.

The user input 16 can comprise, for example, a keyboard with which the user can input information to the terminal. The user input is transferred to the processor and further processed as discussed below.

The "other input" 18 can comprise, for example, a barcode scanner or other reader, video camera input, audio input or any other appropriate data input. FIG. 1 shows a terminal 10 including a swivel mounted barcode reader head 18. The input information is transferred to the processor 24 for further processing as discussed below.

The terminal 10 preferably includes a display 19 for displaying information to the user. For example the display may represent input data for checking purposes, or carry instruction or error messages for the user, or even communication messages transmitted from remote points. The display driver drives the display and receives display instructions from the processor.

The terminal can be a CRT type television display, a flat panel LCD type display or any other suitable display. The advantage of flat panel displays is of course the low bulk complementary to the compactness of the terminal as a whole.

A remote link 22 is provided allowing communication between terminal 10 and the cradle 12 (or indeed any other access point as defined by the operational parameters of the system) by remote, wireless communication such as infrared IRDA, microwave, RF or any other suitable method. Data to and from the remote link is processed by the processor 24.

The processor 24 can comprise any standard processing system such as a CPU. The processor allows centralised control of the other components as discussed above and below, together with general operational conditions of the terminal, data and power checks, compatibility checks and so forth as appropriate.

Shown separate from the processor 24 is a memory 26, although this may be incorporated in the same unit as the processor 24. The memory 26 allows long or short term data storage for example of data received at the user or other input 16, 18, via the remote link 22 or, as discussed in more detail below, via the cradle interface. Memory control, management and transfer can be controlled by the processor 24.

The cradle interface 28 allows downloading of data stored in the terminal 10 to the cradle 12 as well as transfer of control or other data from the cradle 12 to the terminal 10. Information to and from the cradle interface 28 is processed by the processor 24 as appropriate. As discussed in more detail below, the cradle/terminal interface is a physical interface which operates during, and can be enabled by, insertion of the terminal 10 into the recess 14 of the cradle 12.

The cradle 12 also includes various components shown in block form in FIG. 2a, both arranged to deal with control and communication with the terminal 10 as well as communication with the host and other peripheral functions.

The cradle 12 includes a processor 30 for controlling the remaining components as discussed below as well as operational conditions of the cradle 12 and general communication needs between the cradle 12 and the terminal 10, between the cradle 10 and the host 15 and, where the cradle acts transparently, between the terminal 10 and the host 15.

The cradle further comprises internal memory 32 and external memory 34. Both of these are for storage of information received from the host 15 and/or terminal 10 for transfer between the two, as controlled by the processor 30. The internal memory can, for example, comprise part of the processor unit 30. The external memory 34 preferably makes use of external storage devices such as disks etc.

The cradle 12 communicates with the terminal 10 by virtue of a terminal interface 36 communicating with the cradle interface 28. The terminal and cradle interfaces are preferably physical interfaces as discussed above. Information to and from the terminal 10 can be controlled via a processor 30. The cradle 12 further comprises a host interface 38 for communicating with the host 15. The interface can be a wired interface or a wireless interface of known type as appropriate. A communication controller 40 can also be provided additionally to control the various communication protocols between the terminal 10, the cradle 12 and the host 15.

A remote link 42 is provided in the cradle 12 for communication with the remote link 22 in the terminal 10. The communication can, as discussed above, be any wireless means of communication such as infrared IRDA, radio or microwave.

The cradle 12 can also include various peripherals of standard types found with computers generally such as a printer 44 or other component such as an enlarged display, a modem link to a remote host, additional storage or processing capacity and so forth.

The cradle 12 communicates via the host interface 38 with the host 15. The host 15 can be a stand-alone computer or part of a local area network such as the Intranet. The Intranet can itself be part of the Internet or another wide area network, and if appropriate suitable security measures such as a "fire wall" can be put in place.

Numerous applications and advantages are provided by the system shown in FIGS. 1, 2a and 2b. In particular, all of the advantages of a hand-held terminal are available, such as portability, ease of use, and suitability for mobile uses. Particular applications include inventorying, monitoring of transported goods, point of sale use, stock exchange formulations, auctions and so forth. Because the cradle includes a data interface, information input to the terminal, for example as keyboard input or barcode input can be stored short-term in the terminal and transferred at regular intervals to the cradle when it is inserted in the cradle. Once the information is downloaded the memory in the terminal can be cleared. At the same time control or application data can be transferred from the cradle to the terminal such that the terminal application can be changed or updated as desired. The cradle further preferably includes a battery charging module which connects with the terminal when it is inserted into the cradle to allow simultaneous battery recharging. This option is discussed in more detail below.

The cradle then communicates the downloaded information to the host, and allows communication of update/application information from the host to the terminal.

Accordingly the system allows rapid updating of the host data base with information from the terminal whilst requiring reduced memory capacity in the terminal. At the same time the cradle allows significant time-efficiency benefits, both in reducing user involvement in data transfer to a minimum and in allowing the utilisation of user down-time to download information. The remote link further allows immediate update capability where necessary, at the same time allowing this capacity to be kept to a minimum (by virtue of the regular downloading sessions) giving rise to a corresponding reduction in power drain.

As discussed in more detail below, particular benefits of the invention lie in a system in which the basic system described with reference to FIGS. 1, 2a and 2b is enhanced, and memory/computing tasks distributed so as to allow maximum flexibility and minimum demand on the terminal 10. Known hand-held computers are continually being updated and redesigned to allow maximum memory capacity, data storage and application availability. Generally this involves increasing the cost and complexity of the system, and will lead to increases in weight and bulk which is of course undesirable in a portable system. In addition the overheads on the system are very high—updating of the computer is costly and must be done on an individual basis, and based on added peripherals or software that will carry a considerable cost burden. This tendency to increased, internal capacity and capability leads to a greater risk of defect or error and the attendant disadvantages. Such systems are currently known by the term "fat clients".

The present invention, on the other hand, allows an "ultra-thin client". In principle, this is achieved by reducing the computing and memory burden in the terminal to the greatest possible extent and incorporating that burden instead within the cradle or, if possible, in the host itself. This also allows the cradle 12 to operate as a "thin client". As a result the terminal includes the minimum capacity for user interface, including the display capacity, user or other input capacity, minimal memory and processing capacity and the communications capacity discussed above. The cradle/host thus acts as the true computer, carrying a majority of the processing and memory capacity, including disk drives, communication interface and so forth. Because the cradle acts as a thin client, its simplicity and adaptability can be maintained by ensuring that as much processing as possible is carried out at the host.

Figure 3:
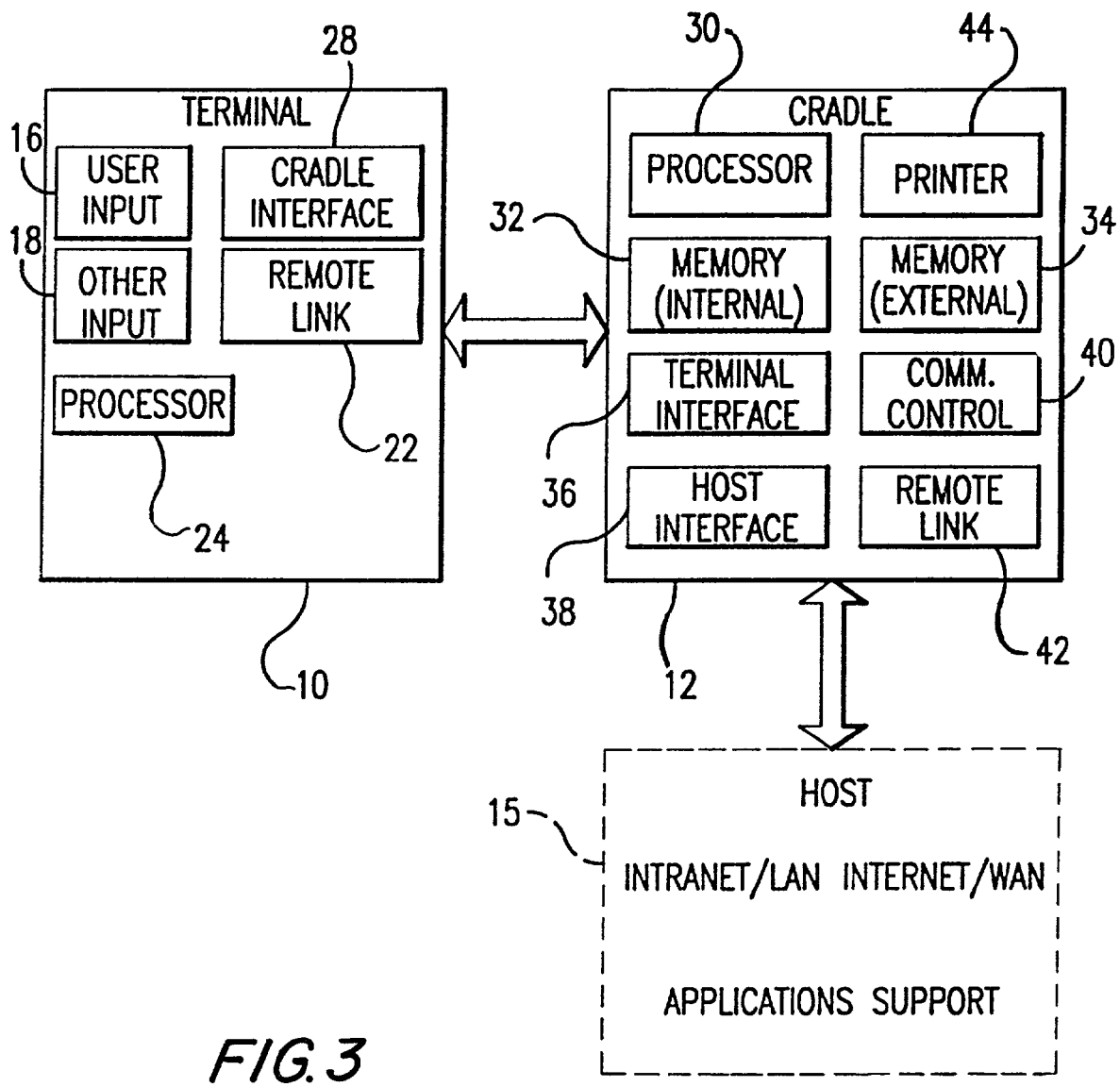
FIG. 3 is a block diagram of a "thin client" terminal/cradle arrangement.

A basic architecture allowing an ultra-thin client is shown in FIG. 3. Similar reference numerals are used to depict similar features throughout the specification and explanation of the various features will not be repeated in detail except as appropriate.

It will be seen that the terminal 10 still supports various basic capabilities to the same extent as the version shown in FIG. 1, in particular the user and other inputs 16, 18 and the cradle interface and remote link 28, 22 must retain many of their features in order that the terminal 10 can perform its basic front-end functions adequately. However, the processor, memory and display driver are all consolidated into a single, lower specification unit, once again sufficient to drive the required front-end functions adequately. Management of the transferred functions is therefore handled by the cradle and/or host. For example, processing of the data input to the terminal can be carried out by the cradle after the information has been downloaded, such that the terminal needs to carry and store only raw data, requiring less memory space and processing power. The cradle also operates as the client in terms of external data storage and peripheral applications such as printing and display. The cradle 12 then communicates with the host 14. Significantly, however, the host itself provides applications support as discussed in more detail below. In addition the host can take on more of the cradle functions as appropriate if it is desired to reduce the cradle specifications, as long as the cradle retains it basic downloading and intermediary functions.

Returning once again to conventional "fat clients", applications to be run by the terminal such as business applications for objects to be accessed, data base, file, mail, printing and directory services and other dedicated functions are provided internal to the terminal itself. This necessitates considerable memory and processing requirements, added complexity and bulk and the need for regular updating and quite possibly servicing.

The present invention, however, operates according to a different system, the applications discussed above such as data bases, mail delivery or further alternatives such as inventorying systems, pricing/coding systems, spread-sheeting and word-processing applications are stored neither on the terminal, nor on the cradle, but on the host to which the cradle has access. These applications are provided and maintained by a central server or distributed servers on the host network as appropriate, allowing central control updating and maintenance. In addition multiple copies of the application software are not required for permanent storage on a large number of independent terminals which would give rise to yet further software License cost burdens and maintenance and updating difficulties.

When it is desired to make use of a specific application, that application can be called up at the cradle and cached for dynamic use, and deleted when it is no longer needed. As a result the amount of memory required is considerably reduced. For example, where it is desired to process data input to the terminal following a specified application, the application can be called up from the host and processed at the cradle 12, and the results stored in the internal or external memory, printed out, displayed in a suitable display or downloaded to the host for further processing. In a further alternative the data from the terminal can be transferred from the cradle to the host as raw data with instructions to the means of processing and processing carried out at the host, reducing the memory and processing burden on the terminal and cradle yet further.

As discussed above, there are numerous applications for the system of the present invention, for example in transportation and logistics fields, warehouse facilities, public safety, retail and any other enterprise relying on fast and efficient data flow and requiring portable data collection and transmission. As will be discussed in more detail below, one possible cradle implementation comprises a vehicle based, wireless cradle communicating with access points via wireless communication. This allows vehicle based use, yet more suitable for transportation in courier companies, utilities, public safety organisations, field sales and service and any other mobile operations.

Figure 4A:
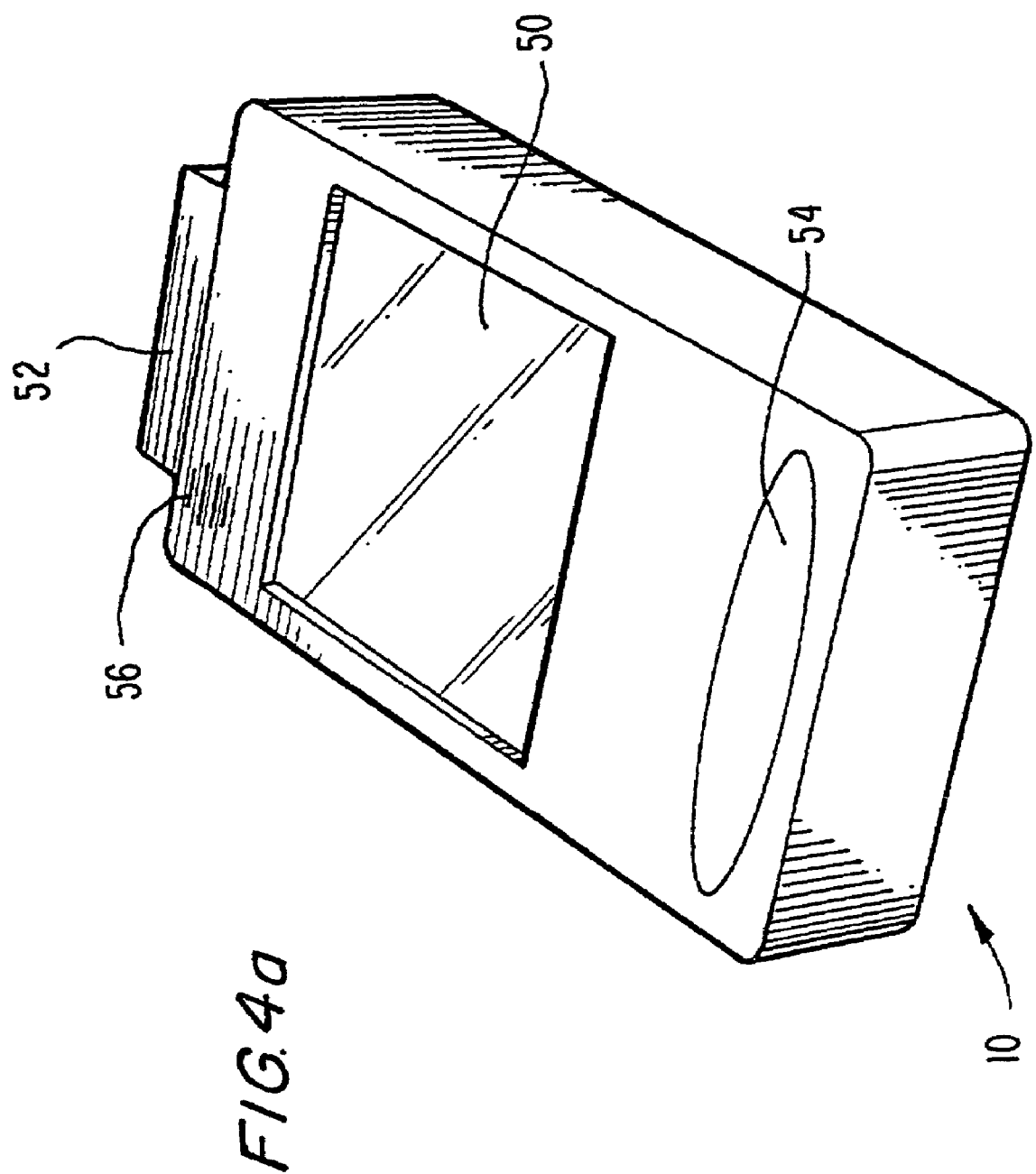
FIG. 4a is a view of a further embodiment of a terminal.

One possible embodiment of the terminal according to the present invention is shown in more detail in FIG. 4a. The terminal 10 is preferably shaped with ergonomic considerations in mind allowing easy use, carrying and storage by the user. A significant feature of the terminal is the display 50. This may be an LCD or video display, for example. It is preferably of high resolution, sufficient to show detailed icons and, preferably, detailed video images as discussed in more detail below. The terminal 10 carries functions suitable for laser scanning and/or pen-based data collection. For example the terminal 10 can include a reader component 52 which can be integral as shown or modular. The reader 52 is arranged for laser scanning of graphic indicia such as barcodes and includes the basic component features of a reader, namely a reading beam emitting means such as a laser diode, a reflected reading beam detecting means and means for scanning the beam if that is desired, for example an oscillating mirror (in the case of a "flying spot" optical scanner). If the scanner is a "field of view" scanner, on the other hand, no scanning means is required, and the detector comprises a CCD (charge coupled device) array. Data collected by the reader 52 is treated as "other input" shown in block 18 of FIGS. 2a and 3 in relation to the terminal, and the data is processed accordingly.

In addition the terminal 10 can include a data pen 54. Such features are known in the art. In particular the data pen 54 can be used to write directly onto the display 50 of the terminal 10, either for data entry, for signature capture and verification or other appropriate data collection and verification purposes. The terminal 10 also includes an audio speaker 56 allowing alarm signals and/or other audio messages such as voice synthesised speech or human voice to be output by the terminal to the user, as well as an audio input such as a microphone for example for two-way voice communication.

FIGS. 4b to 4f show an alternative terminal implementation 45. The terminal 45 includes a display 46, controls 47a,47b and a speaker 48. The terminal is arranged for wireless communication with, for example, a local Intranet network. Messages to the terminal 45 are displayed on the display 46. Simple messages can also be relayed from the terminal 45, alternatively the terminal 45 can relay basic information as to location or user identification. Preferably the display 46 is an ICON based display in which, for example, the user is able to select messages to be relayed to the network by scrolling between suitable icons using control buttons 47a,47b. The terminal 45 can also include audio capability either emitting a short "beep" type signal when a message is received or, in more sophisticated versions, incorporating a voice synthesizer which can notify the user that a message has been received or indeed speak the message. The terminal 45 can also include a microphone (not shown) allowing audio messages to be relayed to the network via the terminal 45. For ease of use the terminal preferably also includes a clip 49 allowing it to be releasably attached to a user's clothing.

The system preferably incorporates power management/distributed power management to ensure that, for the portable components at least the power supply is as efficiently used as possible ensuring that the full life of a power supply is obtained. In particular where the terminal is capable of performing different tasks using different components, the power usage for each component is preferably distributed by individual adjustment in relation to each component to optimise power demand to meet the necessary power requirements.

A retail application of the invention is shown in FIG. 5. A customer 60 enters a retail outlet such as a supermarket (as shown), or any other suitable store selling merchandise or products. The retail outlet automatically provides a plurality of portable terminals 10 stored at a convenient location in their respective cradles 12. The customer 60 selects a terminal 10 from a cradle 12. As shown the retail outlet sells a variety of products for example at shelves 62 or counters 64. Also provided in the retail outlet are a plurality of radio or other suitable wireless transmitters or access points 66, at appropriate locations.

As the customer 60 moves about the retail outlet the access points 66 broadcast to the terminal 10. The terminal 10 uses known prioritising systems and/or algorithms to accept signals only from the nearest access point 66. The access point 66 transmits information concerning products available in the locality of the terminal 10 for display on the display 50. The terminal 10 receives the signals via the remote link 22 shown in FIG. 2a.

Figure 6:
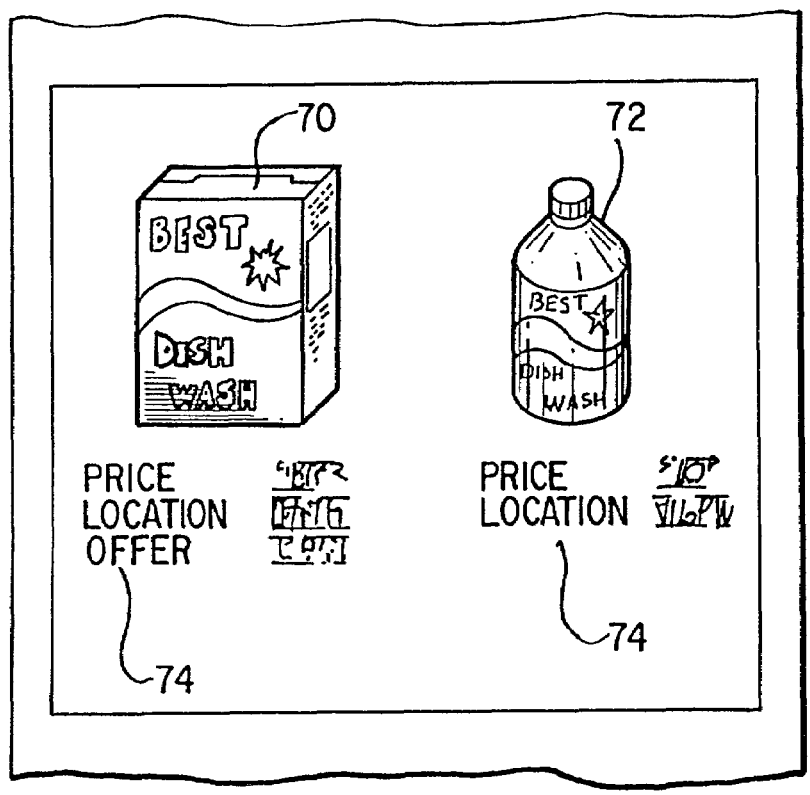
FIG. 6 shows a first ICON display on the terminal.

The information transmitted by the access point 66 to the terminal 10 can take various forms, and in one preferred embodiment the terminal displays graphic icons representing products available in the locality, as shown in FIG. 6. For example where the consumer is in the vicinity of the laundry section and the terminal 10 selects the broadcast signal from the nearest access point 66, products available in the laundry section can appear on the terminal display 50 such as dishwashing or normal washing up liquid, 70, 72 respectively. Actual pictorial representations of the products can appear for the customer's ease of reference. Accompanying information such as price, location and any special offers can also be provided at 74. Accordingly, the retail environment can be tailored for optimum efficiency.

Figure 7:
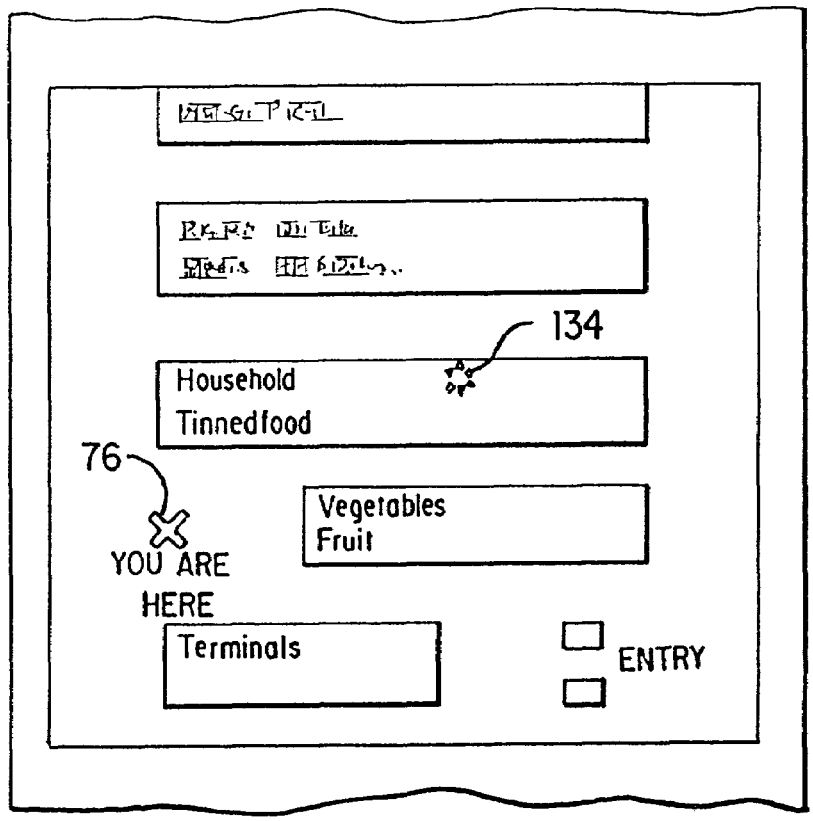
FIG. 7 shows an alternative ICON display on the terminal.

Either a dedicated access point 66 or each of the plurality of access points 66 can also provide, for example, a map of the retail outlets and the products found as shown in FIG. 7. Optionally the map could include a marker 76 indicating the current location of the user—this could be approximated by establishing which access point was currently in communication with the terminal, or a simple geometric positioning system could be used. Indeed such a positioning system would further allow broadcasts to the terminal to be dependent upon the customer's position as established by the positioning system rather than as determined by the location of the closest access point.

Figure 8A:
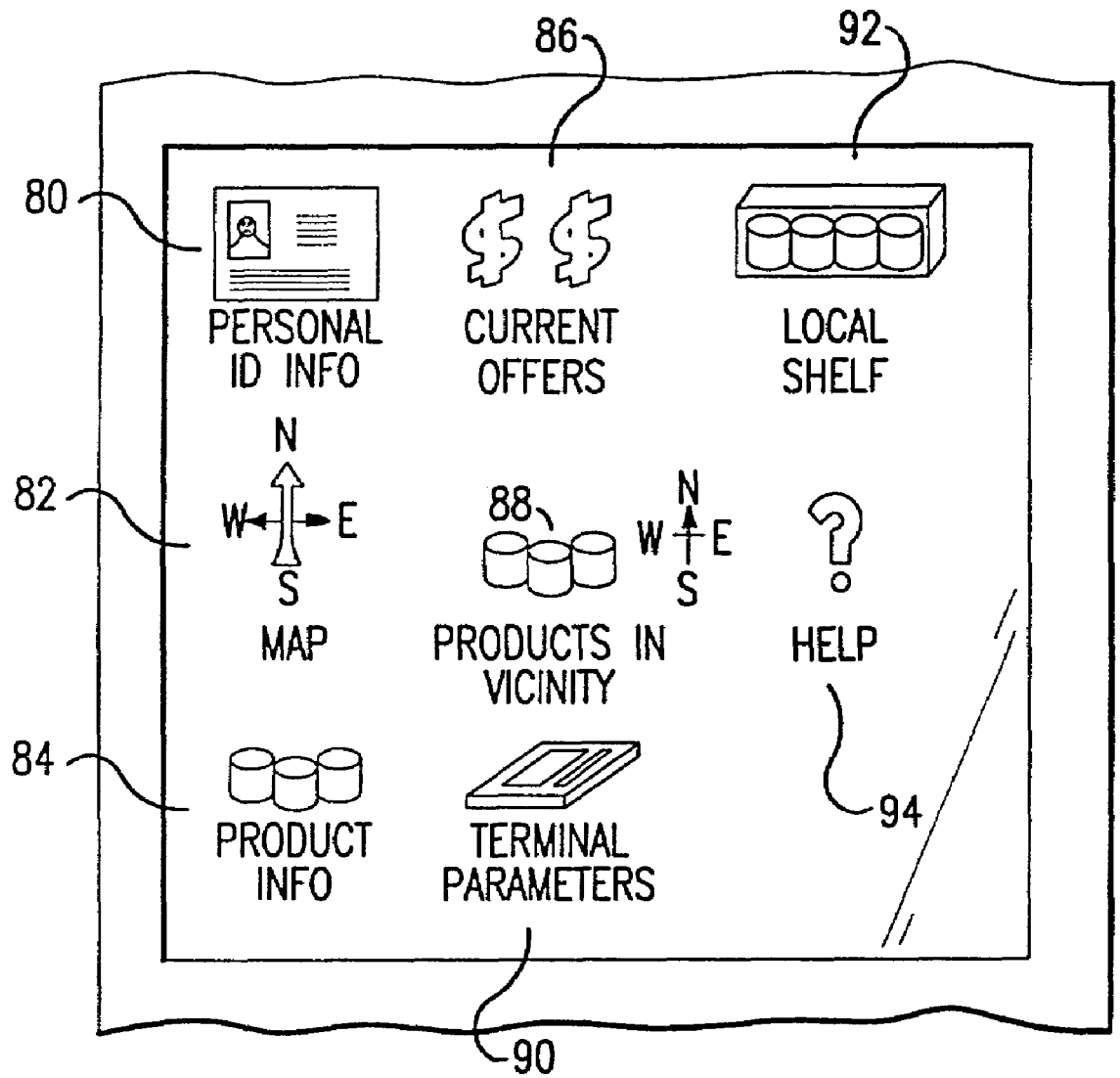
FIG. 8a shows a further alternative ICON display on the terminal.

The terminal can include a preliminary option screen, as shown in FIG. 8a, which is displayed to the customer when the terminal is first accessed. Various icons are shown depending on what functions the customer wishes to utilise. The icons can be accessed and processed by the customer in various known ways, for example by using an integral "mouse" type roller on the scanner, by having a touch-sensitive screen, by having a "digital pen" arranged to interact with the screen or by using a keyboard on the terminal. The icons can include the following: personal identification information entry 80, map 82, product information 84, current offers 86, products in the user's vicinity 88, terminal parameters 90, depiction of a local shelf 92 and help 94. It will be appreciated that many other icons and functions can be incorporated as will become apparent from the following discussion.

Operation of the initial screen and the subsequent screens is represented by the flow chart shown in FIG. 8*b*. At step 100 the terminal is removed from the cradle which automatically initiates presentation of the option screen. The terminal then awaits selection of a given option at 102. The system then moves to the sub-menu required by the icon 80 to 94.

If the personal identification information entry icon 80 is selected then the terminal awaits entry of the relevant information. This can be, for example, by entering a credit card or other identification number, by swiping a suitable magnetic swipe card through a slot in the terminal, or by using barcode capabilities on the terminal to read barcoded personal ID information. This is shown generally at 104. Once the information is entered automatic crediting or debiting of items scanned and purchased by the customer can be initiated, or additional information concerning the customer's buying patterns and preferences can be utilised to target the customer with selected product advertisements. The information can be relayed from the terminal to the access points via wireless communication. Alternatively, the user identification information can be entered while the terminal is in the cradle, for example via a swipe slot on the cradle. Indeed this can be used to release art initiate the terminal as an additional security measure. Once the information has been entered and processed as appropriate at step 106 the system returns to the menus screen at 102.

If the map option is selected then, optionally, the user's current location is identified at 110 and the map is displayed showing this information at 112. The customer then has the option to return to the initial menu at step 108.

Where product information is required at 84, the required product can either be typed in or can be selected using a series of menus descending in scope—114 to 116. Once the product is identified then the customer can be presented with various options as to what information is required—price, brands available, offers available, location and so forth at 118. The user can also return to the main screen 102 at step 108.

If the customer wishes to view current offers, at 86, then the offer type of interest can be selected at 118. For example all current offers can be scrolled past the user, offers linked into purchases that the user has already made can be shown, offers relating to a particular class of goods can be shown, or offers in the vicinity can be shown as selected by an appropriate icon or data entry. The user can then return to the main screen 102 at step 120.

If the user wishes to find out what products are available in the vicinity then the user location is established at 122 and broadcast signals from the relevant access points 66 received and displayed at 124. This option may be maintained in default to present suitable information to the customer as the customer proceeds around the retail outlet. Once again the customer has the option of returning to the main screen 102 at step 126.

If the customer wishes to select terminal parameters at step 90, the various parameters available are displayed at step 128. Those parameters can be, for example, display brightness, display size, language, volume (where a voice synthesizer is incorporated) and so forth. The parameter is adjusted as appropriate at step 130 and the user can then return to the main menu 102 at step 126.

Where the "local shelf" icon 92 is selected, the closest shelf can be selected depending on the customer's location, and the shelf displayed pictorially. For example where the customer is trying to find a specific product, the product can be highlighted. This option can be used in conjunction with the map system to identify a given shelf as shown by the flashing sign 134 in FIG. 7. Alternatively, the shelf representation could highlight products with offers on or any other relevant information, at step 132.

If the help icon 94 is selected then the customer is then invited to select which of the icons he requires further explanation on at step 136. The appropriate help message 138 is then displayed accordingly. For each of the options, the customer has the option to return to the main screen 102.

It will be seen that the system offers a very user-friendly layout allowing the customer to identify products, find out where the products are in relation to the customer, become aware of special offers and so forth. Where customer identification information is stored then the customer can be targeted with marketing/advertising information tailored to his specific stored preferences. The system can be yet further improved by incorporating a voice synthesizer or other audio message means in the terminal such that the terminal can "speak" to the customer to pass on information concerning various products of interest and any other relevant information.

The system can also have application in inventorying and stocking of the outlet (or indeed for warehousing and so forth although the following discussion is limited to the retail outlet discussed above). For example, where it is desired to re-stack the shelves a shelf in its current form can be shown on the screen and re-arrangement could be carried out virtually first by dragging and dropping the relevant graphics to show the movement of the actual goods on the shelves. The physical moves could follow. This would allow both a guide as to how the re-stacked shelves will look and also a very helpful check to ensure that shelf stackers were able to compare the steps they had taken with those that were required. Alternatively, for a given product or brand name or class of products, by highlighting the representation of that product on screen, relevant data such as inventory, delivery, sales history and so forth could be presented to the user. A similar system of icons and steps could be used to those discussed with reference to FIGS. 8*a* and 8*b*. Dedicated terminals could be provided for these purposes in the retail outlet discussed above. Alternatively, the shelf stacker, inventory officer or other relevant personnel could enter their user identification information to the cradle prior to removing the terminal such that the terminal is initialised appropriately. It will be appreciated that the same system could be used for inventorying in warehouses or general product tracking, using graphic icons to represent the products and allow quick, user-friendly accessing of background, ordering or destination information.

It will be seen that a variety of other peripheral features can be envisaged for the system. For example the system can include a range alarm such that if a terminal is taken outside the store, or outside the designated area within the store, an alarm will sound. For example if the customer carrying the terminal strays into an area where no access points are available or where access is generally restricted to staff then the alarm can sound. The alarm is provided within the terminal and can operate, for example, on the basis of range signals from the closest access point to establish whether it has exceeded that range in which case the alarm will sound.

The terminal can be used in conjunction with a "self-scanning" system by the user whereby the user scans those products purchased personally, removing the need for checkout personnel and generally accelerating the shopping process. In that case the terminal can store the purchasing details against the user identification information—where appropriate—to update data bases on the particular customer's marketing profile. The scanner can also be used to read codes directly from products in order that additional information can be called up at the terminal.

The system described above is particularly useful for "ultra thin" clients in the form of portable terminals. The basic capabilities that must be carried on the terminal itself are the display driver, minimal memory and processing requirements and communications capabilities and protocols for communication both with the access points and the cradle. Information concerning products, maps and other relevant aspects can be accessed on demand via the access points from a host. Data stored concerning a given customer's buying patterns and, as appropriate, queries and other transactions can be downloaded to the cradle after each use, reducing the memory requirements considerably. Similarly, the exact functions required for the terminal e.g. customer use, inventory use, re-stacking use and so forth can be loaded from the cradle once the use has been identified whilst the terminal is still stored in the cradle. As a result the memory and processing burden on the terminal itself can be kept to a minimum, allowing simplicity and reduction in costs, as well as ease of updating applications and so forth.

In an alternative arrangement each terminal can communicate with its respective cradle if the store is of suitable size. Accordingly the ultra-thin client-thin cradle implementation can be achieved.

The system can be yet further enhanced in various manners. For example the terminal could incorporate a detachable scanner portion, such that the scanner and/or terminal are each autonomous and independently accessible. In some circumstances the capabilities of the terminal itself or the scanner itself will only be required and the additional burden of the other components would not be desired. This would be the case for example where a portable digital assistant was required.

A further possibility would be that of adapting the display format of the terminal. This would preferably be incorporated as a software facility in the cradle, rather than burdening the terminal with the capability. The display format—i.e. the number of characters in the horizontal direction—could be adapted to the horizontal length of the screen of the terminal. To make the system as user-friendly as possible it would preferably be the case that the terminal communicates the display dimensions to the cradle such that the server/cradle could automatically format the display page to fit the screen without the requirement for "wrap-around", that is, an intended single line of text being split into two or more lines. As an alternative to automatic formatting, a predetermined selection of available predefined format options could be accessed, and the suitable option adopted. An alternative method of avoiding wrap-around for text lines would be to scale the text down to create a smaller typeface size allowing a single line accommodated without wrap-around.

In addition to its downloading/uploading/initialising, security and storage capabilities, another important function fulfilled by the cradle is a battery recharging function. Whenever the cradle receives a terminal, a battery level check is carried out and if the batteries are below full power, or a predetermined threshold power level then recharging will automatically take place during the down time of the terminal. The terminal carries suitable contacts arranged to mate with charging contacts on the cradle itself in a known manner. Battery recharging technology will be well known to the skilled person and is not described in any detail here.

Figure 9:
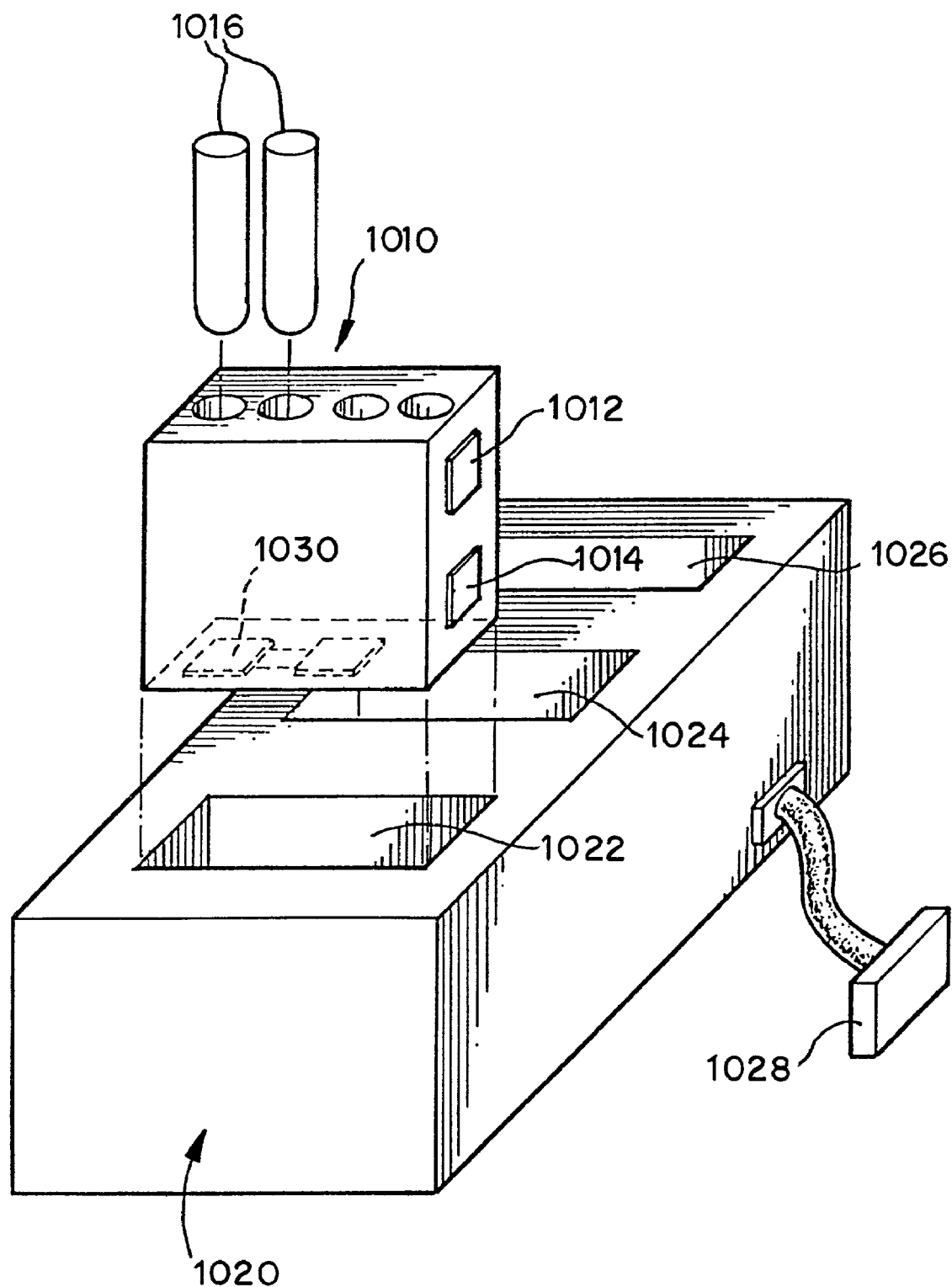
FIG. 9 shows a battery pack and battery charger for the terminal.

A charging configuration is shown in FIG. 9. According to this configuration the terminal 10 includes a rechargeable battery pack 1010 which is removably insertable into the terminal and includes suitable powering contacts 1012, 1014 to cooperate with corresponding contacts in the terminal 10. The battery pack 1010 includes a plurality of power cells 1016 which are either permanently retained in the battery pack 1010 or replaceable to prolong the life of the battery pack as a whole. The battery pack 1010 is received in a charger 1020 which has one or preferably a plurality of battery pack receiving slots 1022, 1024, 1026. The charger 1020 is powered from a suitable power source shown schematically at 1028. This system allows multiple battery packs to be recharged at the same time, such that a plurality of terminals can operate on a fully charged battery pack whilst a replacement battery pack is being charged. This decreases the down time of the portable terminals to an extent limited only by the availability of battery packs and chargers.

The charger 1020 can be incorporated in a cradle or provided separately as appropriate.

It is necessary in any such arrangement to introduce adapter circuitry which determines the charging rate and other parameters dependent on the nature both of the battery pack and the charger. Conventionally such adapter circuitry is provided in the charger itself, reducing the weight and complexity of the portable battery packs accordingly. According to an aspect of the present invention, however, the adapter circuitry is provided on the battery pack itself for example on a bottom face as shown schematically at 1030. According to this system charging operation and charger 1020 design are greatly simplified. In particular the battery pack 1010 can be inserted into in the appropriately configured charger and the adapter circuitry 1030 provided on the battery pack 1010 adapts operation accordingly. The user therefore does not have to spend time ensuring that the correct charger 1020 has been selected. Yet further enhancements of the terminal are discussed in the 5 following paragraphs.

In a further revised variant shown in FIG. 32 each battery pack 600 is provided with an adapter 602 which receives in a suitable recess such as that shown at 604 all or a portion of the battery pack 600. In the embodiment shown the battery pack 600 includes a projecting connecting portion 606 which is received in the recess 604 of the adapter 602. The connecting portion 606 and recess 604 have complementary contacts shown generally at 608 for power supply and so forth.

The adapter 602 is received in a base unit 610 and provides a suitable interface between the battery pack 600 and the base unit 610. Complementary contacts shown generally at 612 are provided on the adapter 602 and an adapter receiving recess 614 on the base unit 610 for power transmission and so forth.

The adapter 602 carries all charging electronics except the power lines themselves. Accordingly control of the charging process is achieved as discussed in more detail above. The adapter 602 can carry indicators such as LED's shown generally at 616 to indicate charging completed, error, charging in progress and so forth.

It will be seen that the base unit 610 is a multi-slot unit allowing the charging of a plurality of battery packs via respective adapters simultaneously. The base unit 610 can work off an internal power supply 618 or an external power supply 620 as appropriate.

If it is desired to charge only a single battery pack then the adapter can further carry a power supply connector for connection directly to a power supply. As a result, in those circumstances, the base unit 610 is-not required at all.

According to yet a further variant, it is known to provide "smart" batteries including complex electronics such as EEPROMS, input/output and so forth. These smart batteries communicate with the charger or other host to provide various parameters including gas gaging, status of charge, cycle number and so forth. The smart batteries, however, add considerably to the cost of a pack and at the end of the limited life cycle of the cells (usually a few hundred cycles) the whole "smart" battery pack must be disposed of.

This can be overcome by using a battery pack 1010 of the type shown in FIG. 9. In this case the cells 1016 are replaceable, the smart electronics being kept in the battery pack 1010. For example the cells can be accessed through a door or cover as appropriate. As a result the expensive electronics and costly battery pack housing can be saved and used repeatedly.

Figure 33A:
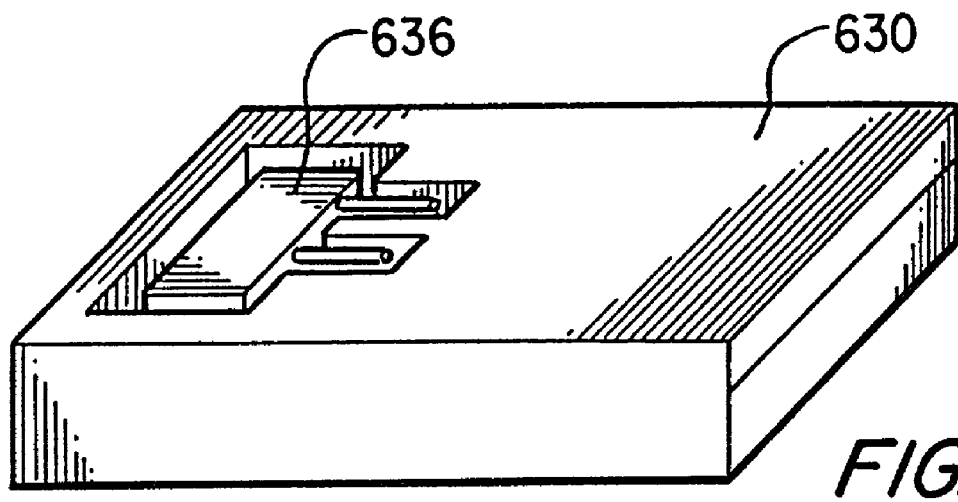
FIG. 33a shows an improved battery pack arrangement.
Figure 33B:
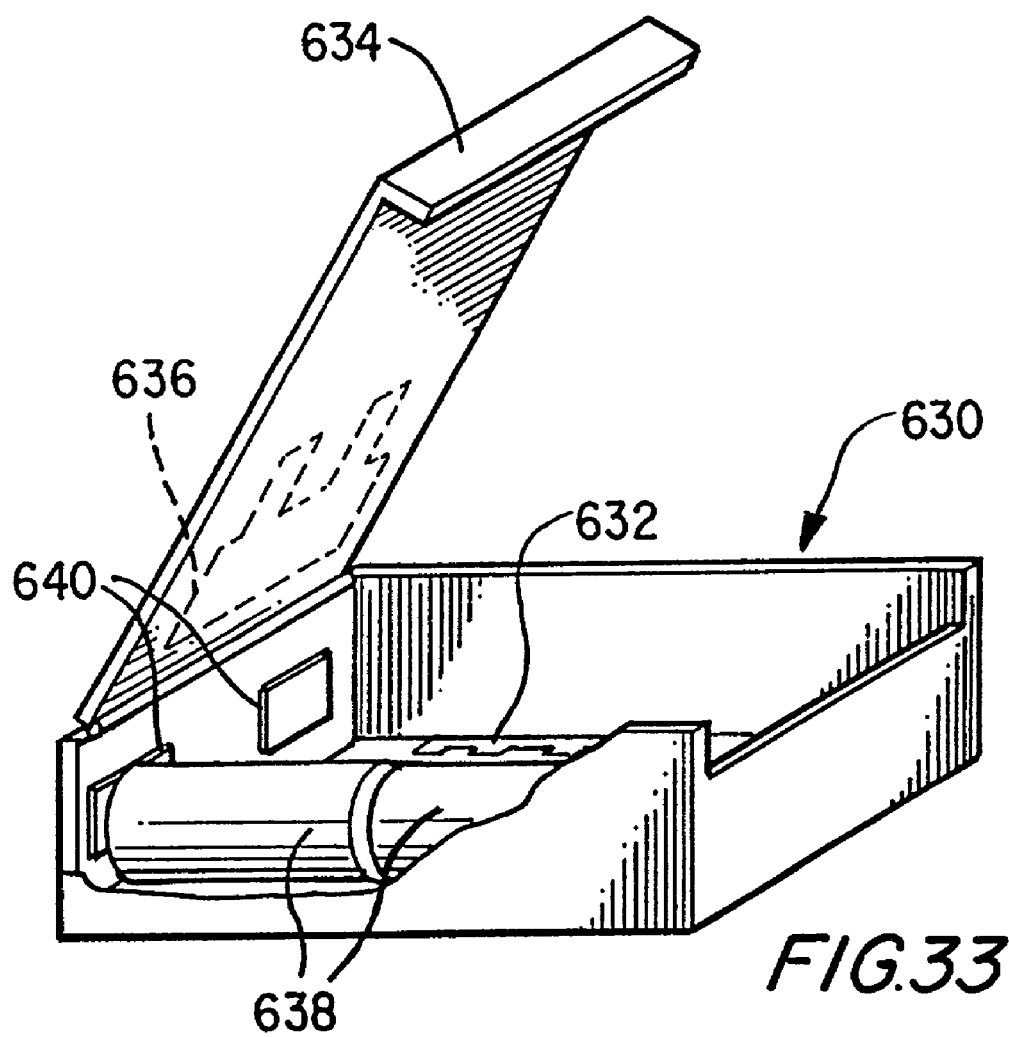
FIG. 33b shows an alternative improved battery pack to that shown in FIG. 33a, in cut-away form.

FIGS. 33*a* and 33*b* illustrate yet further variants to battery pack/charger arrangements. In known systems, battery packs are charged by miniature chargers which are either incorporated into the large outlet plug-type of a housing or in a plastic module which is externally attached to the battery pack. Both solutions require, external to the battery pack, either cord or module parts. In the arrangements shown in FIGS. 33*a*, 33*b*, any such external charging device to charge the batteries is eliminated by providing a battery pack 630 including, as shown generally at 632 in FIG. 33*b*, a charger component such as an AC/DC convertor, charge electronics, gas gage, all incorporated as permanent components. Two alternative types of battery package 630 are proposed. In FIG. 33*a* the pack is disposable after the individual cells (not shown) reach their lifetime limit. In FIG. 33*b* it will be seen that the battery pack 630 includes, for example, a hinged cover 634 (on which the retractable plug 636 is optionally mounted) allowing the cells 638 to be replaced after they reach their life limit. It will be seen that the battery pack 630 as shown in FIG. 33*b* includes suitable contacts 640 against which the cells 638 can be mounted for operation of the battery pack 630.

In one embodiment it may be desired to allow "renting" of the terminals—for example where use of the terminals is at a premium and optional. The cradle carries a physical lock on the terminal and/or some form of power/access lock such that, without authorisation, the user cannot release the terminal from the cradle, or cannot use the terminal. Authorisation can be obtained by suitable user identification, for example swiping a credit card or other user identifying means through the cradle. If authorisation is given the lock is released and the user can remove and use the terminal. At the same time the release time is clocked so that the user will be billed for the rental time until the terminal is returned to the cradle at which time the timing clock will cease to increment. Billing can be carried out automatically, where appropriate, to the user's credit card. One capability that the terminal could incorporate would be as a portable telephone or "cellphone" in which case the terminal/cradle would be a marketing tool for renting cellphones for a period of time. Whatever the desired use, operational checks can be carried out by the cradle when the terminal is returned to it to ensure that it is operative and has not been damaged during the rental period. If damage has-occurred then the user will be identified by the identification information and can be billed appropriately. In addition information can be stored such that, in future, the user is not authorized to use the terminal or only at a premium rate.

In cases where the terminal is, or incorporates a cellular telephone an automatic facility can be provided in which the terminal/telephone operates over a wireless LAN as a preferred default option, but if the terminal is out of range of the access point (as defined by a predetermined level of communications reliability) the system uses the cellular telephone capability. Accordingly, the user can connect to the desired destination even if he moves outside the wireless LAN area, making the calling network transparent to the user whose only concern is that guaranteed communications are provided.

It is further desired to allow individual portable terminals to network with one another. This networking can be carried out using any suitable protocol, for example the system set out in the article "Routing in Ad-hoc Networks of Mobile Hosts", David B. Johnson, 1995 IEEE Pages 158-163. In particular a protocol specific to the network of mobile hosts is required taking into account the mobility of the hosts and the limited transmission range. A source host finds a route to a target host via intermediate hosts by broadcasting a query packet which records its route to the target host. The request pack carries a request identifier so that intermediate hosts ignore all but the first copy of the request packet. The total number of steps is limited. As a result the shortest path can generally be found with a minimum of communication overhead. Although the routes are discovered this way, the route may also be maintained and problems can arise where one of the intermediate hosts in the selected route moves out of transmission range. To overcome this route maintenance is carried out using a hop-by-hop acknowledgement system such that if there is a transmission problem this is reported back to the original sender and the route discovery system recommenced.

It is also desirable, in a mobile computer network, to ensure that the current location of the mobile terminal is known, not least for the reasons discussed above in relation to message routing. One method of doing this is to ensure that the current location of each mobile terminal is periodically communicated to a network centre. As a result a dynamically updated map of the location of all of the mobile terminals can be maintained which can be further used to determine routing of messages. Similar systems are known, for example, in relation to cellular telephone networks and systems. A suitable system is disclosed, for example, in U.S. Pat. No. 5,612,703 which relates to a cellular communication system in which the position of a selected user unit can be determined by issuing a timing signal from a node, analyzing a timing response signal from the user unit and determining the position of the user unit based on the round trip transmission and receipt time.

U.S. patent application Ser. No. 08/614,068 commonly assigned herewith and incorporated herein by reference relates to a portable terminal including a data input and data display and a motion detector. When movement is detected a controller activates relevant circuitry. For example where the terminal is sensed to be in a first positional orientation a first function can be performed whereas when it is sensed to be in a second positional orientation a second function is performed. It will be seen that this capability can be incorporated in the terminals of the present invention. For example it can be used to activate the terminal and deactivate it when it is removed and reinserted into the cradle.

Figure 10:
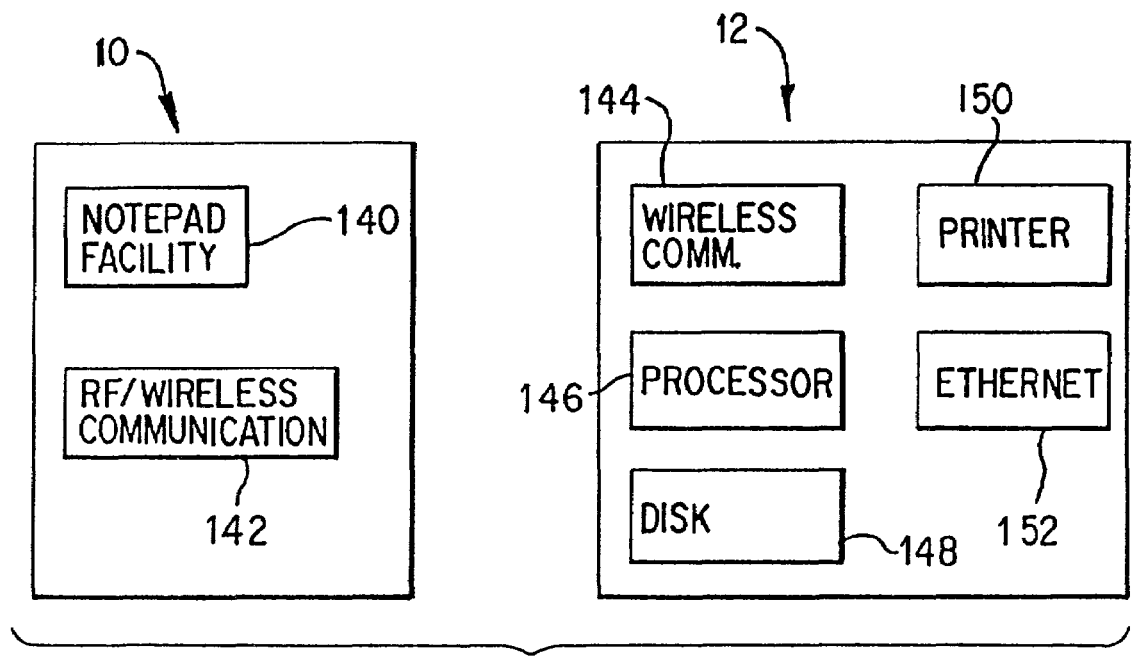
FIG. 10 is a block diagram of an alternative terminal configuration.

Yet another preferred variant of the invention is shown in FIG. 10. In this case the terminal 10 is an ultra thin client relying on the cradle for the majority of the computing and processing burden. In fact the terminal 10 can be represented by two basic components, a notepad facility 140 and a wireless communications component 142. The exact details of these components are not shown in detail as they will be well known to the skilled man. Effectively the notepad facility allows the input of data to the terminal and display of relevant information at the terminal. The processing burden at the terminal is largely restricted to this basic input/output capability together with control of the wireless communications component 142. The wireless communications component communicates with a corresponding component 144 in the cradle 12. As a result raw data input to the terminal 10 is transmitted straight to the cradle 12 without the need for processing (other than for communications reasons) in the terminal, leading to a concomitant reduction in the processing and memory capabilities and thus power consumption of the terminal 10. Instead the bulk of the computing capability is held at the cradle, including a data processor 146 incorporating memory space as appropriate, additional memory space in the form of for example disks, a printer peripheral 150, and Ethernet communications capabilities 152 allowing the cradle to form part of a larger wireless network connected, for example, to a host itself part of an Intranet or having access to the Internet. In effect, therefore, the portable terminal 10 is no more than a display for a computer held in the cradle, communications being carried out via the wireless communications link using for example RF or infrared protocols or any other suitable link. Rather than communicating directly with the cradle the terminal can communicate with one or more nearest access points, each themselves communicating with the cradle, allowing a greater range for the terminal.

Such a system is particularly useful, for example, for dealers at a stock exchange or comparable implementations. The dealers can carry out their transactions using the hand-held displays, for example buying/selling stocks, keeping up to date with their current holdings and all other suitable transactions without the need for major processing, memory or power requirements in the terminal. When the terminal is not required it can be returned to the cradle for downloading of any further information that is required, for updating of its internal applications by the cradle and for battery recharging. As a result a useful, lightweight and highly mobile terminal is provided with the background applications expected from a full scale personal computer or equivalent.

Figure 11:
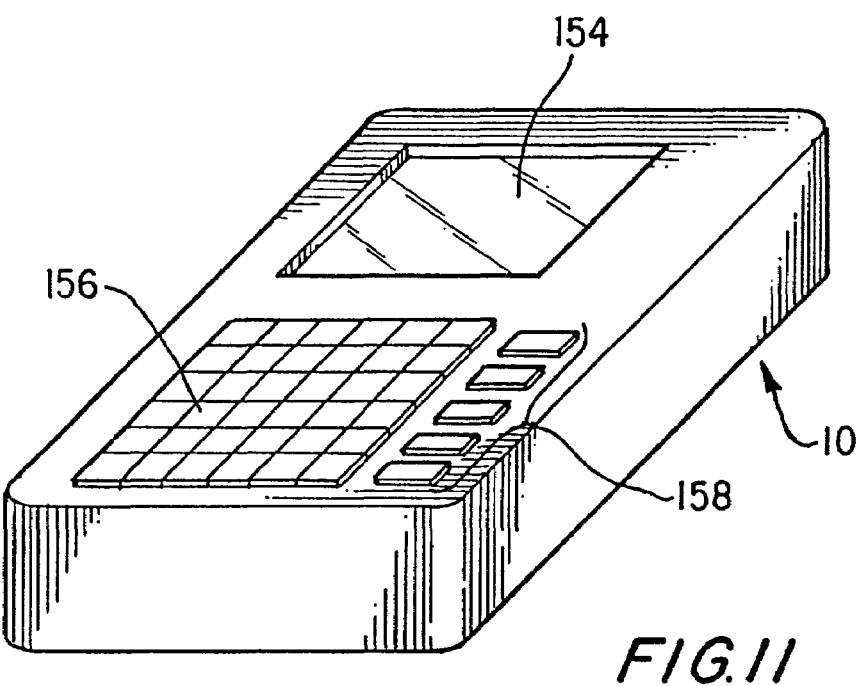
FIG. 11 is a schematic view of an alternative terminal configuration.

Yet further implementations envisaged for the terminal include the provision of an AM/FM radio and/or broadcast television receiver incorporated into the terminal. As a result the user may use the unit for entertainment as well as computer-related tasks. Such a terminal is shown in FIG. 11. The terminal includes a display 154 which is adapted not only for presentation of text and icons, but also video images. The terminal then further incorporates a keyboard, for example a full alphanumeric keyboard 156 allowing operation of the terminal either as a personal digital assistant or, in conjunction with a wireless link, as a low level personal computer. The terminal 10 further includes additional controls 158 allowing the selection and/or control of a T.V. or radio facility—for example volume/brightness/channel and so forth. As a result a portable computer is provided which makes additional use of its display functions by allowing a T.V. receiver to be incorporated, as well as optionally a radio facility.

In an alternative configuration which can be used as an enhancement or adaptation of the above embodiments, or as a stand-alone product, the portable terminal can comprise an Internet "browser". This allows operation in conjunction with the "ultra thin" client facility. In effect, the client, apart from basic processing displaying communication facilities, carries browser software allowing the user, via the wireless link to the cradle, to browse the Internet for relevant applications and information. Using this basic facility, applications and/or data can be called up on demand and stored in a lower level short term memory for as long as they are required. As dedicated software and applications are not required on the terminal itself the storage and processing requirements are correspondingly reduced. An icon-based display can be incorporated on the terminal allowing user-friendly access to the Internet or Internet access as one of various possible options on a selection menu. Such a system can, for example, be implemented using as a basis the computer language Java (a trade mark) and supporting software available from Sun Microsystems (a trade mark).

These points are of particular relevance now that Internet Web "pagers" have moved on from being static entities viewable using a browser to true applications or "applets". Systems have been developed on existing local networks in which browser capability is introduced to existing hardware, forming a "web top". In many applications this comprises the first step to a move towards a true "thin client"—it is envisaged that conventional "fat clients" are generally truly required only for dedicated use high volume processing applications. Introduction of such browsers allows the user to access the Internet via the Intranet for downloading of applications and information together with corresponding broadcasting of information. In addition to browsing services the system can support mail services, administration services and so forth as is well known.

As discussed to a certain extent elsewhere, the advantages of this system include security, update at run time and virus/tampering monitoring. Applications are developed more quickly because of the level of use to which they are subjected and hence testing. Because applications are stored at the server, administration can be centralised and users can obtain the most recent update consistently across the system. The system can support multimedia applications largely irrespective of the client platform—for example a telephone-type system including a display, personal digital assistants, set-top boxes, point of sale devices/kiosks, entertainment facilities and so forth.

Systems incorporating the terminal/cradle facility discussed above are of benefit, for example in mobile operations such as packaging, tracking systems and courier systems. Such a system is shown schematically in FIG. 12. The user 160 carries a portable terminal 10, preferably having laser scanning and pen-based data capabilities as discussed above. The terminal is rechargeable at a cradle 12 mounted in the user's vehicle 162 and can also download information.

In the embodiment shown the cradle is installed on the dashboard although it can also be installed on the seat or floor. The cradle 12 is connected to the vehicle battery 164 or if required an auxiliary power supply. This connection provides the basic power from the vehicle to the terminal for battery charging and communications functions. Battery charging begins automatically when the terminal is inserted into the cradle. The cradle preferably carries a display indicating when the battery is being charged, and when the battery is fully charged, and a cut-off facility is included such that power is no longer drawn from the vehicle once the battery is fully charged. The terminal can of course use modular battery packs allowing a first battery pack to be in use while a second battery pack is being charged.

The cradle incorporates or cooperates with a vehicle mounted wireless wide area network modem allowing transmission to and from an access point 166, itself communicating with a host 168. As a result, via the host, two-way wireless data transmission is achieved between remote operation sensors and mobile field personnel. For example, pick up and delivery times, work orders, activity reports, transaction records and all other relevant information can be communicated between the user 160 and the host 168 quickly and efficiently. In particular the user 160 can input information to the terminal 10 via the keyboard or via a scanner or pen reader or other suitable input interface and await downloading information each time the terminal 10 is placed in the cradle 12. Alternatively the terminal 10 can communicate via a wireless link with the cradle 12 for instantaneous data transmission at an appropriate level.

Figure 12:
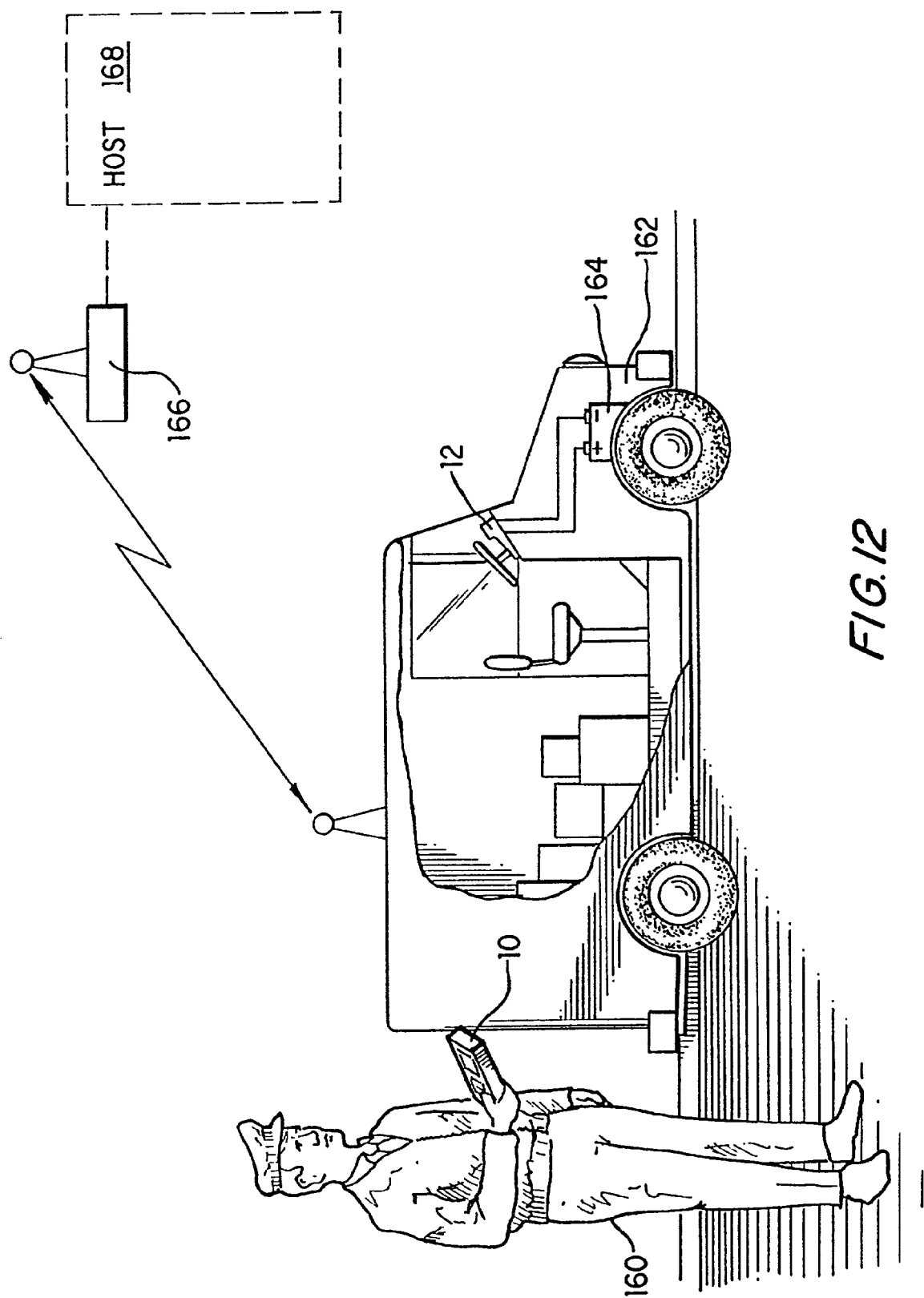
FIG. 12 is a schematic representation of a further application of the terminal of the present invention.

Preferably the system incorporates an automatic "return receipt requested" facility, where the terminal 10 is an Intranet server terminal. A server terminal of this type is described in more detail in co-pending U.S. application Serial No. _____ filed 28, Mar. 1997 commonly assigned herewith, which is incorporated herein by reference. In essence the server terminal includes the server software within the terminal itself allowing direct creation of Internet files/"websites" without the need for complex communications with a remote server. In such an implementation, the cradle 12 is provided in the vehicle 162 as shown in FIG. 12 and the user 160 takes the terminal 10 to the package recipient to sign for the package, noting the time of delivery. As the terminal/cradle is a server (in an alternative implementation the server software can be incorporated in the cradle with no loss in efficiency and a reduction in the processing burden on the terminal), and the server can communicate over a wide area network to the host or depot, an interface can be provided to the Internet allowing the sender of the package to determine at any time if the package has been delivered yet, or whether a delivery has been attempted but the package has not been received. Accordingly, the delivery company can set up an additional facility to attract and satisfy customers, giving instantaneous information, via the Internet, on the status of any delivery.

The detailed implementation of this can be carried out in various ways. For example the sender of the package can access the delivery company's website and then trace the progress of the particular package of interest using, for example, a code number assigned at the time of ordering the delivery. At the same time the progress of the package can be logged by the user, or delivery agent by entering the delivery or attempted delivery times against the code. The code can, for example, be read by a scanner provided in the terminal from the barcode provided on the package, if appropriate.

Logging of the progress of the package can be improved yet further by logging transfer of the package at intermediate stages between the sender and recipient, for example, at each stage of the depot chain. The development of a routing table is of particular importance in the general case where the exact route to be taken by the package via the depot chain is not decided at the time that delivery is ordered. This can facilitate double checking of the progress of the package. It is preferred that the routing table features details of the ultimate delivery truck as this will be easier to trace than individual packages. Preferably the sender pays a premium for this system of "instantaneous return receipt" so that the burden of transmitting the status of every package is reduced and need not be accessible on a real time basis except where paid for.

Referring to FIGS. 13a and 13b a particularly useful implementation of a portable terminal is shown for use with the delivery implementation discussed above. In such implementations it is desirable for the user to have both hands free for delivery of packages. Accordingly a "pendant" type scanner 170 is used, hanging around the user's neck. The terminal includes a scanner window 172 angled so as to point in the direction of a package held at waist height by the user. Such a package is shown as 174. The terminal 172 is thus able to scan the package and any barcodes held on it with optimum ease. For simplified manipulation the terminal further includes controls 176 and a display 178 on an upwardly facing surface such that the user can manipulate the controls and read the display without having to remove the pendant scanner. The terminal 170 can in addition communicate with, or interface with, the cradle 12 in the manner discussed above.

As discussed above any uses can be envisaged for the terminals of the type discussed above, including warehousing and generally logistics-type arrangements. The "thin client" system as described above is particularly suitable for incorporation with existing infrastructures including the hardware—PC's systems, networks and data tools, and software—databases and so forth which are already in place. This applies throughout the relevant areas of the market for example retail, distribution or manufacturing. Such a system will preferably incorporate a central server carrying a suitable database together with appropriate clients—for example wireless terminals of the type described above incorporating a graphical user interface to the user. The system introduces the benefits of real time operation which shortens the lead time on instructions and-provides optimum implementation of both staff and hardware, at the same time allowing checking to take place on an immediate, continuing basis. Inventory information can be dated and processed in real time. Levels can be tailored accordingly and optimized/minimized. The user will automatically know where items are stored and be able to locate them promptly. At the same time the administrative burden is decreased. All of this is achieved without costly across the board changes to the existing hardware infrastructure.

The use of an icon based user terminal means that the system can be introduced quickly and with simple training only, but the system can also be extended to more complex systems including wave planning, resource scheduling, productivity measurement and real time assessment and ordering of jobs. As the inventory is continually updated there is no down time for physical inventorying. Management, data, inventory, stock and other relevant reports can be obtained at any time again decreasing the administrative burden.

A central server can run both client-types instantaneously. In addition to wireless terminals run via some form of radio network controller, PC's or other fixed terminals can also be wired to the system either at the base station or remote. Standard interfacing communications protocols can be incorporated together with standard network architectures to achieve a reliable, interchangeable and adaptable system preferably linked into other business systems as required.

Terminal/cradle arrangements of the type discussed above provide compact base stations allowing high speed data networking at the same time as battery charging for-the terminals. The systems are appropriate for transportation and logistics companies, warehouse facilities, public safety, retail and other appropriate organisations. Preferably upon initiation, the cradle powers on and performs self-diagnosis to ensure proper system operation. Battery charging preferably begins automatically when the terminal is seated in the cradle and indicators such as LED's can be provided on the cradle to indicate when power is on and when charging is taking place. Data transmission can be quickly and efficiently achieved with a host for example by modem using standard communications protocols. Master cradles can be linked to, for example, a host PC or another cradle chain. Preferably standard interfaces such as RS232 and RS485 are provided for use with a variety of portable printers and peripherals.

The system can also be mounted in a vehicle where appropriate, for transportation and courier companies, utilities, public safety organisations, field sales and service and other appropriate operations. The cradle includes the capability for in vehicle battery charging in two-way wireless communication. It can be installed for example on the dashboard, seat or floor of the vehicle and can take power from the vehicle battery. The system can allow two-way wireless data transmission between remote operation centres and mobile field personnel, allowing rapid transmission of pick-ups and deliveries, work orders, activity reports and transaction records.

In either case it will be seen that the provision of an ultrathin client reduces the weight and power requirements of the hand-held terminal making it yet more suitable for the portable uses envisaged.

Many of the components forming the detailed embodiments discussed above, are individually known to the skilled person and do not require detailed discussion here.

It will be seen that it is highly desirable to create clients that are "web enabled", that is, configured for connectivity to the Internet. In many cases it is desirable to remove previous operating system based terminals using, for example, DOS and move instead to, for example, HTML (hypertext mark-up language). Referring to FIG. 28 the hardware and software design for a web optimized terminal is shown. The hardware model presents the major subsystems. The software model describes how the radio and HTML software coexist.

The digital portion of the design is fairly simple. The primary CPU 400 can be, for example, a National 486 SXF or SXL (Trade Mark). It is a highly integrated CPU that includes a variety of peripherals including LCD 402 controller, DRAM 404 controller, timers, serial ports, etc. It also has an onchip code cache and extensive facilities for low power operation. It executes 32 bit protected mode 386 instructions however it cannot run DOS or Windows (Trade Marks).

There is a single 128 KB flash memory chip 406 containing compressed object code. When the unit starts up the code is decompressed into the DRAM 404 and executed from there. The 128 KB should contain about 256 KB of 86 object code. This code contains the radio firmware, setup routines, and sufficient Web Client code to download the actual runtime code from a server.

There will be a single 1M×16 DRAM 404 on the unit, providing 2 MB of DRAM. This will be capable of low power and self refresh.

The scanner interface 408 will be, for example, the preprogrammed 8052 used on the currently available SE1222 decoder board. The decoder board itself will not be used, just the components from it. The 486 will communicate with it via its integrated serial port. A scanner 412, for example the SE1200, is also incorporated.

The interface to the radio 414 will be preferably a simple 8 bit parallel port, although a PCMCIA can be used. The radio module will be a pure radio capability only or "dumb "kappa"" unit that does not have its own CPU, flash, RAM, etc.

There are two options for LCD support. The 486SXF processor 400 supports up to 320×200 display. Use of the 486SXF allows a "dumb" LCD unit without built-in controller. If the SXL version is used, the LCD controller must have its own controller.

The keyboard 416 is just basic switches. Debouncing is done by the 486 processor 400.

The entire system runs off a single 5 volt supply. The radio 414 requires 5 volts and so does the 486 processor 400. This costs some power but eliminates the need for a separate 3.3 v supply thereby reducing the associated costs.

The most cost effective model is a two board setup, the motherboard and the "Kappa" radio module. On one side of the motherboard are the "keys" 416, LCD 402, and whatever parts can be assembled thereon. On the other side is the radio module 414 (attached directly to the motherboard) and the rest of the parts. The whole thing can be ½" to ¾" high, ~2¼" wide, and 4-6" long. The scanner 402 also mounts on it. The goal is to eliminate all the flex cables, further reducing costs.

The software on the design shown in FIG. 28 is built around a small, non-preemptive multitasking kernel that currently runs on known radio cards such as the Spectrum 24 card (Trade Mark) (available from the assignees' radio card). There are tasks for handling the user interface, Crux or Cetus 418, sending and receiving, and roaming. They communicate via shared variables and message passing. There is an idle task that is the lowest priority task and it may be preempted. This task forms the basis for a single, polled loop structure in which the protocol stack and HTML runtime exists.

In this model there is one task that operates at "task" level. It performs a series of tests which may result in some processing taking place. Interrupts are generally enabled at all times. The structure is shown in FIG. 29.

It should be noted that the tasks may be quite complex. For example the test may be whether a packet has been received on the RF interface. If one has been, the packet is passed to a network protocol stack that processes it.

This software model has been used successfully on known systems for pagers and modems, for example the Symbol Technologies Spectrum 24 pager and Modem. Accordingly further detail is not required here. The pager version includes the radio firmware, UDP/IP protocol stack, pager protocol interpreter, and pager user interface all running on a single 80188 CPU. The HTML runtime code has been designed to fit into this single task, polling model.

Known cradles have various basic requirements:

Full hardware signal compatibility at the connect between the cradle and the host such that the host does not require modification, and full hardware signal compatibility with a serial port present on the terminal.

Low insertion force connection between the terminal and cradle allowing frequent and preferably unlimited removal and re-insertion.

Full hardware register compatibility within the terminal with existing communication software, for example IBM PC compatible communications software.

Support for "chaining" of multiple cradles to a single host serial port. In one embodiment a "master" cradle is provided for connection to the host, and supports a large number of "slave" cradles. Two access modes must be supported, single access mode and multiple access mode. In single access mode, one terminal at a time receives exclusive control and the host serial port and all of the terminals experience results equivalent to "no cable attached". In multiple access mode, all terminals are granted receive access to the host serial port but the right to transmit is granted to only one terminal at a time. Both modes should support standard application software without modification despite the occurrence of multiplexing.

The terminal/cradle should be implementable in a vehicle configuration as discussed above.

It is proposed to use IrDA (Infrared Data Association) compatible optics for the zero insertion force interface to allow use of the terminal with readily available (non-dedicated) IrDA compliant peripherals and host computers.

Solutions to the various points are discussed below.

Solution 1

Each terminal comprises two pairs of optics (two transmitters and two receivers) as does each cradle. Accordingly two full duplex datapaths are provided. Each cradle contains a microprocessor plus two pairs of optics per slot (for receiving a terminal). In this four slots design, a single microprocessor handles all four slots. The primary optical channel between the cradle and a terminal carries the data part of a full IBM-PC compatible 9 wire series interface, for example TXD, RXD and SG. The auxiliary optical channel between the cradle and a terminal carries control information (DTR and RTS), status information, (DSR, DCD, CTS, RI) of a full IBM PC compatible 9 wire serial interface and bus information (BREQ and BACK).

The data interface is gated between the optics and the RS-232 by the cradle. The control and status information is communicated over the auxiliary optical channel. Within the terminal itself, control, status, and bus information are used to produce the effects of single or multiple access mode as required.

Multiple 4 slot cradles could be chained together (up to 4 physical cradles, for 16 slots). The bus signals (BREQ and BACK) are passed as "tokens" from one cradle to the next to provide inter-cradle multiplexing.

The BIOS of the hand-held computer implements the cradle protocol and provides both IBM PC-compatible serial BIOS services and a proprietary extended serial BIOS service set. Since few, if any, IBM PC-compatible serial communications program use either set of BIOS services (instead of going directly to the hardware), communications via the cradle cannot support standard communications applications. Since this is also true of the physical serial port this is not a particular hardship. A single slot version of these cradles has all the same functionality of the 4 slot versions except it does not support chaining. Since only one slot is present and the chaining logic is not required, the hardware design is somewhat simpler. The two optical channels are handled identically, however, and the terminal BIOS code is the same.

An alternative single slot configuration is simplified and does not include chainability or an optical interface. A modular (phone jack) style of connector can be used to provide either cabled serial communications (via an adapter cable) or can be used as the cradle "docking" connector, which provides a wired path for both of the data channels that are normally optical.

To improve IBM PC-compatibility an alternative approach can be used to emulate the IBM PC serial communications interface. This involves "bridging" the control and status information (conditioned as appropriate based on bus information) between the auxiliary optical channel and the "emulated" UART registers. This bridging is done using a special "Super-State" mode of the Chips and Technologies F8680 microprocessor in the terminal. Since all software in this device runs in real-mode, most "well-behaved" IBM PC-compatible serial communications programs could be used.

One solution to reduce the cost of multiple cradle installations is eliminating the microprocessor in all but one (the "master") of the cradles in each "chain" of up to for example 60 cradles.

In order to meet all of the common requirements for cradles (especially chaining), a method for synchronizing access to the cradle bus from multiple hand-held computers, without a processor in each cradle, is required. The mechanism can be a variant of CSMA/CD (Carrier Sense Multiple Access/Collision Detection). In this matter, the processors in the hand-held computer themselves, with the co-operation of the single processor in the "master" cradle, manage all required bus control.

Unlike the above variants a single data channel is used, thus freeing up a UART on the terminal and reducing the number of optic pairs in a terminal+cradle combination from 4 pairs to 3 pairs (2 transmitters and a receiver in the cradle and 1 transmitter and a receiver in the terminal). The third pair (a transmitter in the cradle and a receiver in the terminal) is required to allow the Carrier Sense and Collision Detection.

To allow for interchaining with different cradles, a switch on the "master" cradle is used to select which type of emulation to support. This feature allows a chain of cradles to be placed at the end (farthest from the host) of a different free cradle chain.

To provide IBM PC-compatibility, an approach similar to that discussed above is used to emulate the IBM PC serial communications interface. Since no direct data channel is available (since there is only a single data channel), data, control, and status information must travel on the same channel. This requires that the "emulation" be more complete.

The emulation is done using support hardware in the terminal ASIC interface and control. This involves using I/O register traps to generate NMI (non-maskable interrupts) to allow the cradle support software to emulate the results of application accesses to the UART registers. Using an open system based on the 486 processor, intended to run protected mode software such as DOS extenders and Windows (trade mark), the potential number of interactions with the cradle support software is effectively infinite.

In a further cradle approach a modular (phone jack) style of connector is used to attach a serial adapter cable to attach to the cradle. The cradle, however, simply passes the signals through to the cradle serial port connector. Since the serial port is IBM PC-compatible, the cradle is as well.

Where the device and its cradles do not support internal battery charging, the cradle is effectively reduced to a "port replicator" or "cable extended" and a stand.

As a further development is it proposed to make full use of IrDA capability, in particular using IrDA for wireless communication and using the same IrDA optics as the cradle interface to avoid to unnecessary duplication of hardware.

Using IrDA 9 wire emulation mode (called IrCOMM) to the standard protocol stacks designed for this type of application allows the cradle to be an IrDA+IrCOMM to RS-232 converter with multiplexing. The multiplexing could be relatively simple (i.e. the "token" passing scheme discussed above), hence it can be implemented in hardware as an ASIC. Alternately, the multiplexing could be performed by the processor needed to run the IrDA protocol stack and IrCOMM layer.

Adding a processor to each cradle may still be more efficient than putting different sets of optics on each hand-held computer. Since the IrDA optics are half duplex, they cannot easily be used in central constant cradle schemes. Use of the IrDA+IrCOMM standard protocol stack layers is the logical method of using these optics. In the cradle, since these protocol layers must be converted into RS-232, a processor is mandatory.

Within the terminal, emulation of an IBM PC-compatible serial port is still required. An approach similar to that discussed above could be used to "wrap" the IrDA and IrCOMM interfaces and make them look like a standard COM port. Alternately, to avoid the software interactions that the emulation approach experienced, it is possible to add another microprocessor (such as an 8031) to the hand-held computer itself. This processor would then emulate the "hardware" interface of the UART and run the IrDA+IrCOMM layers. This approach would eliminate any possible software incompatibilities.

It is further desired to develop a subsystem for use in a terminal that complies both with external standard such as IrDA and any dedicated internally determined standards. The subsystem must be capable of communicating with other internal standard or IrDA equipped computing devices, with internal standard and/or IrDA, and must be suitable for use in the implementation of non-physical connection cradles. These cradles must be capable of providing emulation of a full RS 232 serial port (with and without cradle chain) A suitable system covers the functionality of the subsystem, the hardware and software needed to implement the subsystem (both at terminal and cradle portions) and the design, implementation, interface and the characteristics of the subsystem and identifies the functional hardware and software requirements for the complete internal standard/IrDA subsystem (both the terminal and cradle portions).

Referring to FIGS. 14 to 21 the wireless communications strategy for the system is based on two fundamental physical communications technologies: IrDA (Infra-red Data Association) and a dedicated proprietary internal standard arranged to eliminate peripheral cables. IrDA is open systems standard. For both the same communications protocols (IrLAP, IrLMP, TinyTP and IrCOMM) will be used to allow transparent interoperation amongst the two interfaces in a system equipped with both.

Both technologies can be used in any or all of the following three operational modes: Point-to-multipoint "Air Network" mode, Point-to-point "Serial Port Emulation" mode, and multi-point to point "Chainable Cradle" mode; The system provides for one or more of the following configurations as shown in Table 1:

TABLE 1

| Configuration Name | Technology Used | Mode Used |
| --- | --- | --- |
| Vehicle Cradle | Internal Standard and/or IrDA | Serial Port Emulation |
| Depot Cradle | Internal Standard | Chainable Cradle |
| IrDA Peripheral | IrDA | Air network |

Supporting the combination technologies provides optimal connectivity and flexibility. IrDA provides fairly high bandwidth (115.2 K Baud), line-of-sight, short range (sub-meter), low power communications, plus compatibility with industry-standard IrDA peripherals. The internal standard provides a lower bandwidth (19.2 K Baud), omni-directional, medium range (3-6 meters), higher power communications. By providing a single integrated solution that supports the two technologies and allows them to be used interchangeably, the system should maximize the potential for wireless connectivity.

Figure 14:
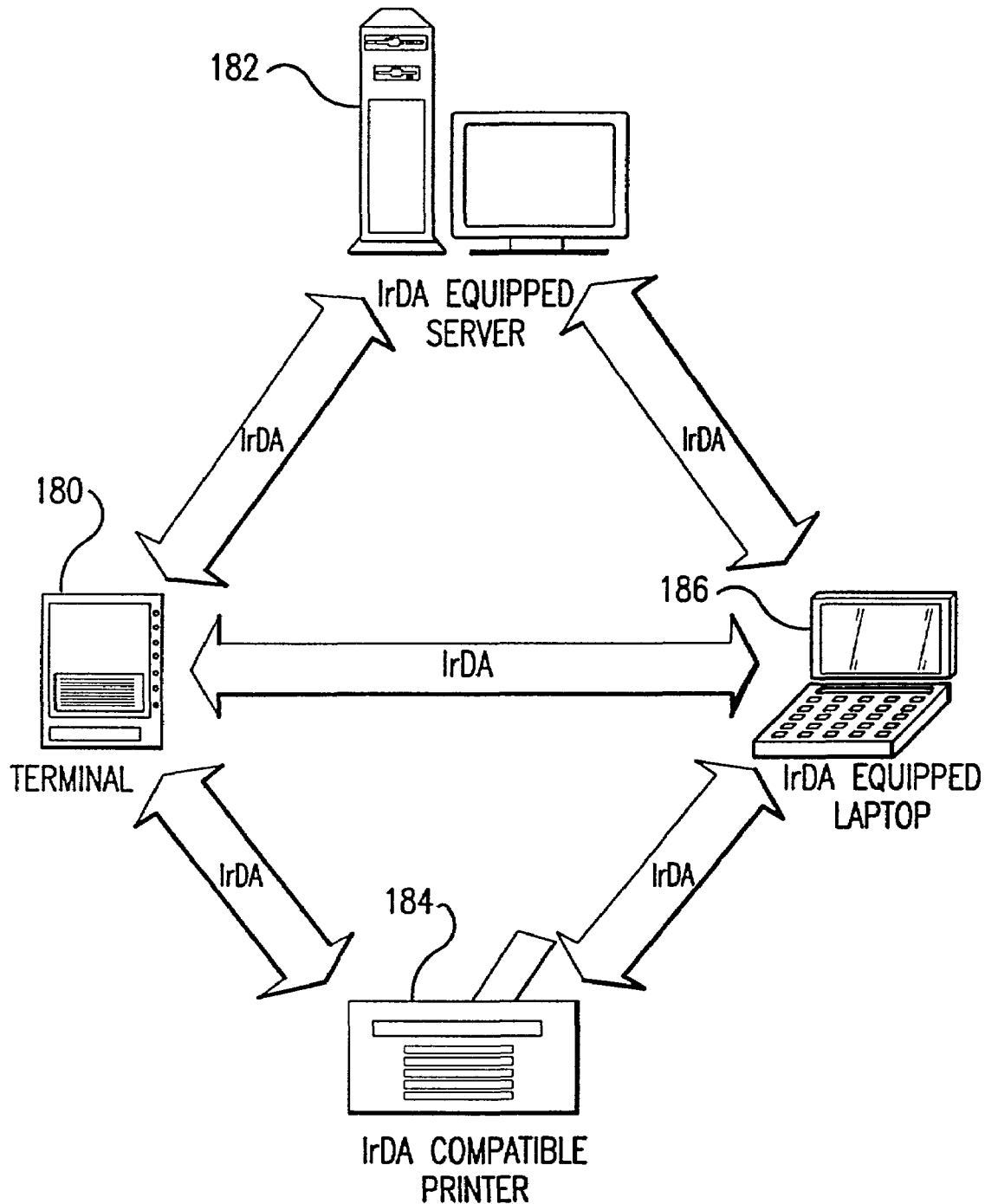
FIG. 14 shows a wireless network configuration.
Figure 15:
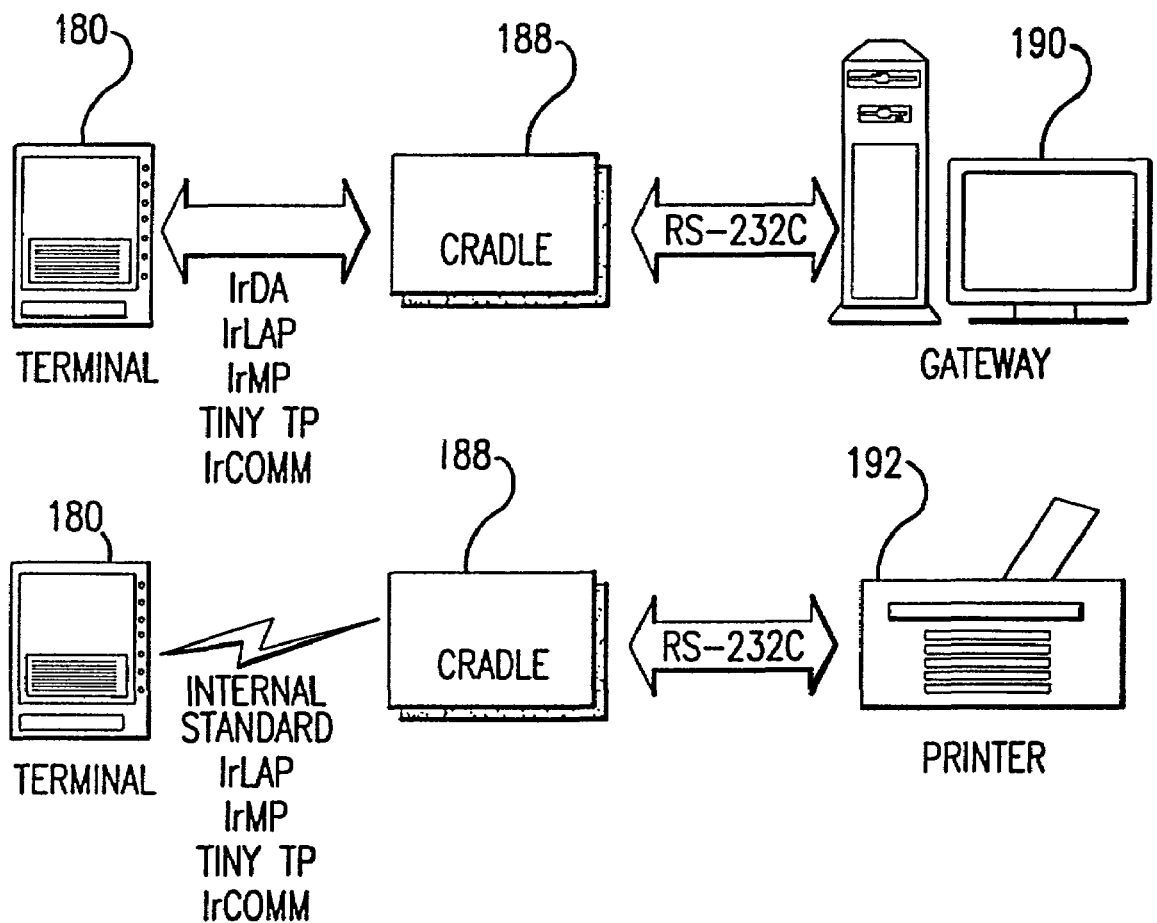
FIG. 15 shows a detail of a wireless network configuration.

FIG. 14 shows an IrDA "air" network allowing IrDA wireless communication between a terminal 180 and each of an IrDA equipped server 182 and an IrDA compatible printer 184, IrDA communication between IrDA equipped lap-top or other portable computer 186 and each of the server 182 and printer 184, as well as IrDA communication between the terminal 180 and the lap-top 186. In FIG. 15 serial port emulation is shown for IrDA and/or internal standard technology. A terminal 180 communicates with a cradle 188 by IrLAP, IrLMP, TinyTP and IrCOMM and either of IrDA or the internal standard technology. Where IrDA technology is used the cradle 188 communicates with a host/server gate way 190 via a RS-232 C interface. Where the system uses the internal standard technology the cradle 188 communicates with a printer 192 via a RS 232C interface.

Figure 16:
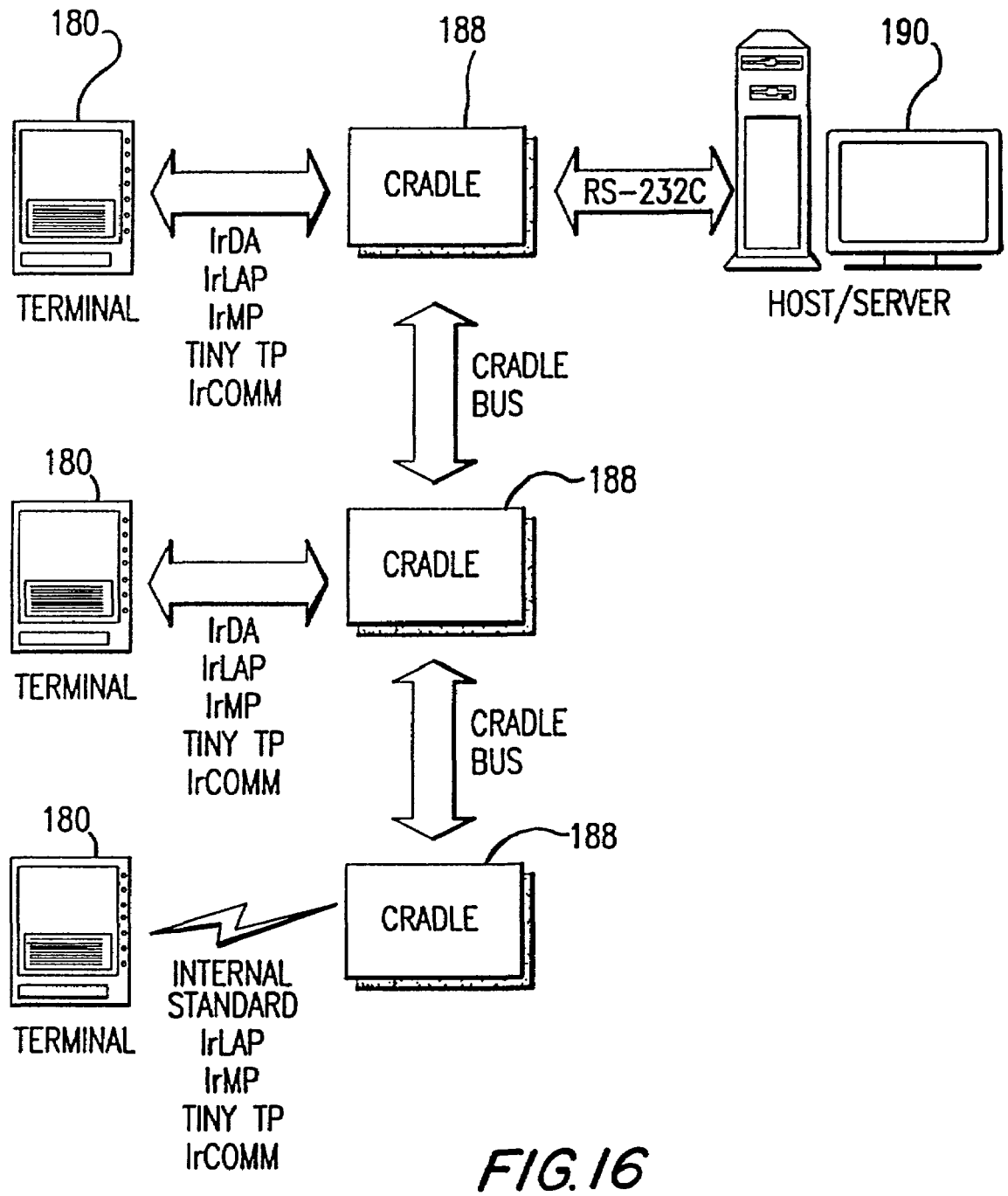
FIG. 16 shows a further detail of a wireless network configuration.

The IrDA and/or internal standard technology chained cradle shown in FIG. 16 includes communication between a plurality of terminals 180 and respective cradles 188 communicating by either of IrDA or internal standard technologies together with IrLAP, IrLMP, TinyTP and IrCOMM. The cradles communicate with each other via a cradle bus and a master cradle communicates with a host/server 190 via an RS 232C interface.

Figure 17:
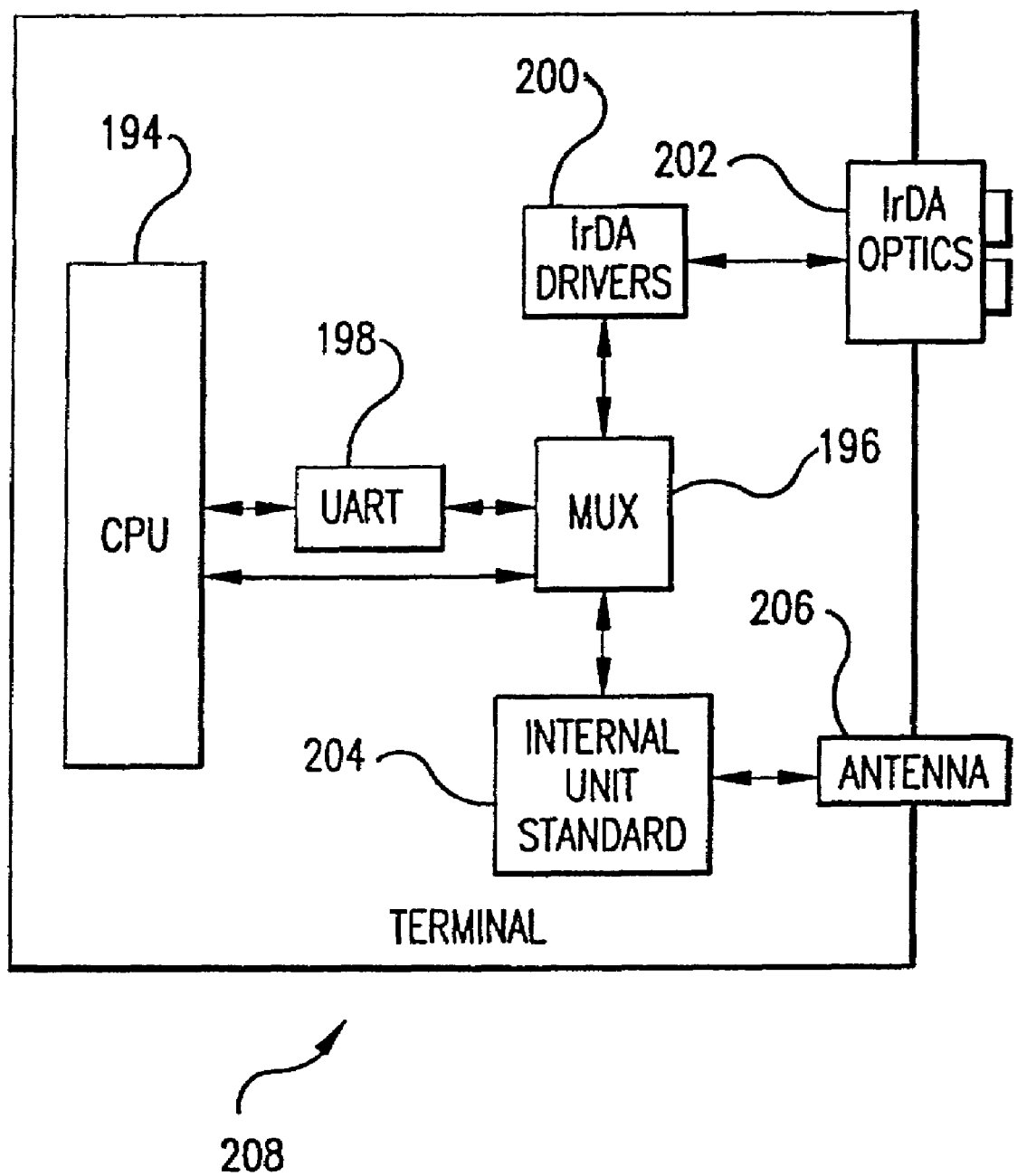
FIG. 17 is a block diagram of an alternative terminal configuration.

In the in-terminal hardware design with IrDA and internal standard shown in FIG. 17 a CPU 194 communicates with a multiplexer 196 directly and via a UART 198. The multiplexer 196 communicates via IrDA drivers 200 with the IrDA optics 202 and via an internal standard specific unit 204 with an antenna 206. The terminal as a whole is designated 208.

Figure 18:
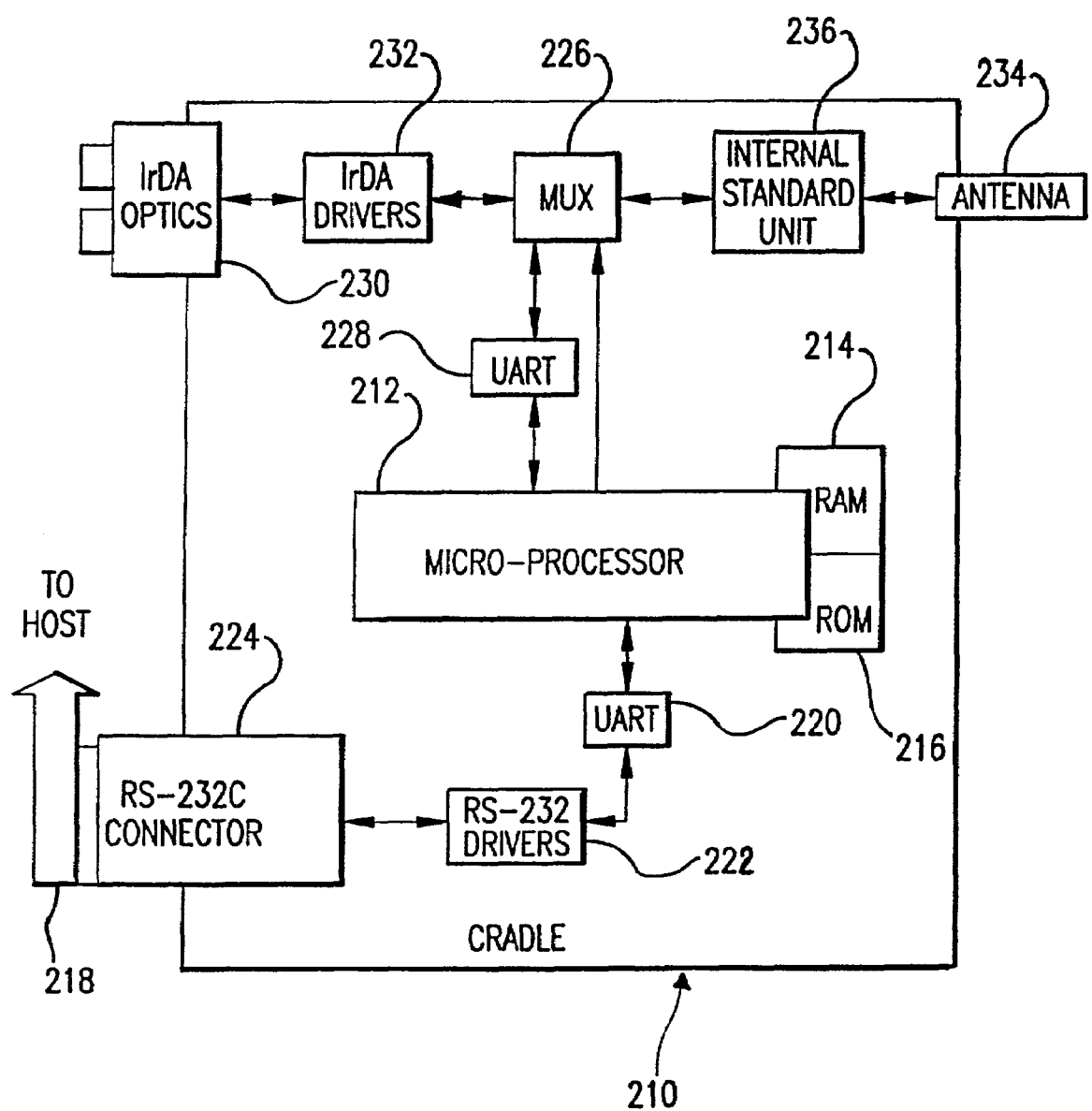
FIG. 18 is a block diagram of an alternative cradle configuration.

Referring to FIG. 18, a cradle 210 incorporates the serial port emulation hardware design with IrDA and the internal standard cooperates with a microprocessor 212 having RAM memory storage 214 and ROM memory storage 216 at its core. The microprocessor 212 communicates to the host (shown schematically at 218) via a UART 220, an RS 232 driver 222 and an RS 232 connector 224. The microprocessor 212 communicates with a multiplexer 226 directly and via a UART 228. The multiplexer 226 communicates with IrDA optics 230 via IrDA drivers 232. The multiplexer also communicates with an antenna 234 via an internal standard unit 236.

Figure 19:
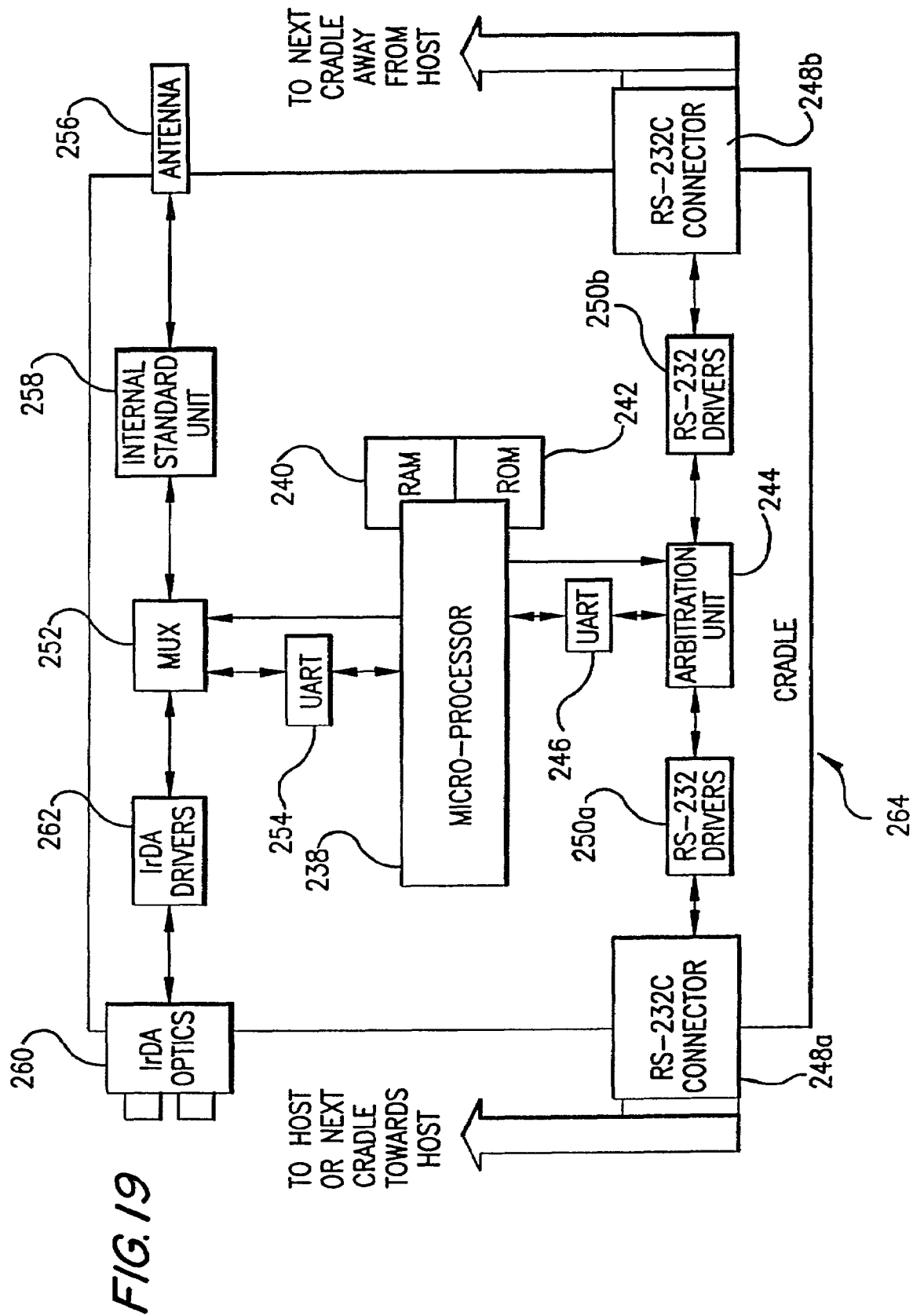
FIG. 19 is a block diagram of yet a further alternative cradle configuration.

Referring now to FIG. 19 a chainable cradle design with IrDA and internal standard technologies comprises a microprocessor carrying RAM memory storage 240 and ROM memory storage 242. The microprocessor 238 communicates with an arbitration unit 244 directly and via a UART 246. The arbitration unit arbitrates between the communication to the next cradle away from the host and communication to the host or the next cradle towards the host. The arbitration unit 244 in either case communicates with a dedicated RS 232C connector 248a, 248b via a dedicated RS 232 driver 250a, 250b. The microprocessor also communicates with a multiplexer 252 directly or via a UART 254. The multiplexer allows communication with an antenna 256 via an internal standard unit 258. The multiplexer 252 also communicates with IrDA optics 260 via an IrDA driver 262. The cradle is shown generally at 264.

Figure 20:
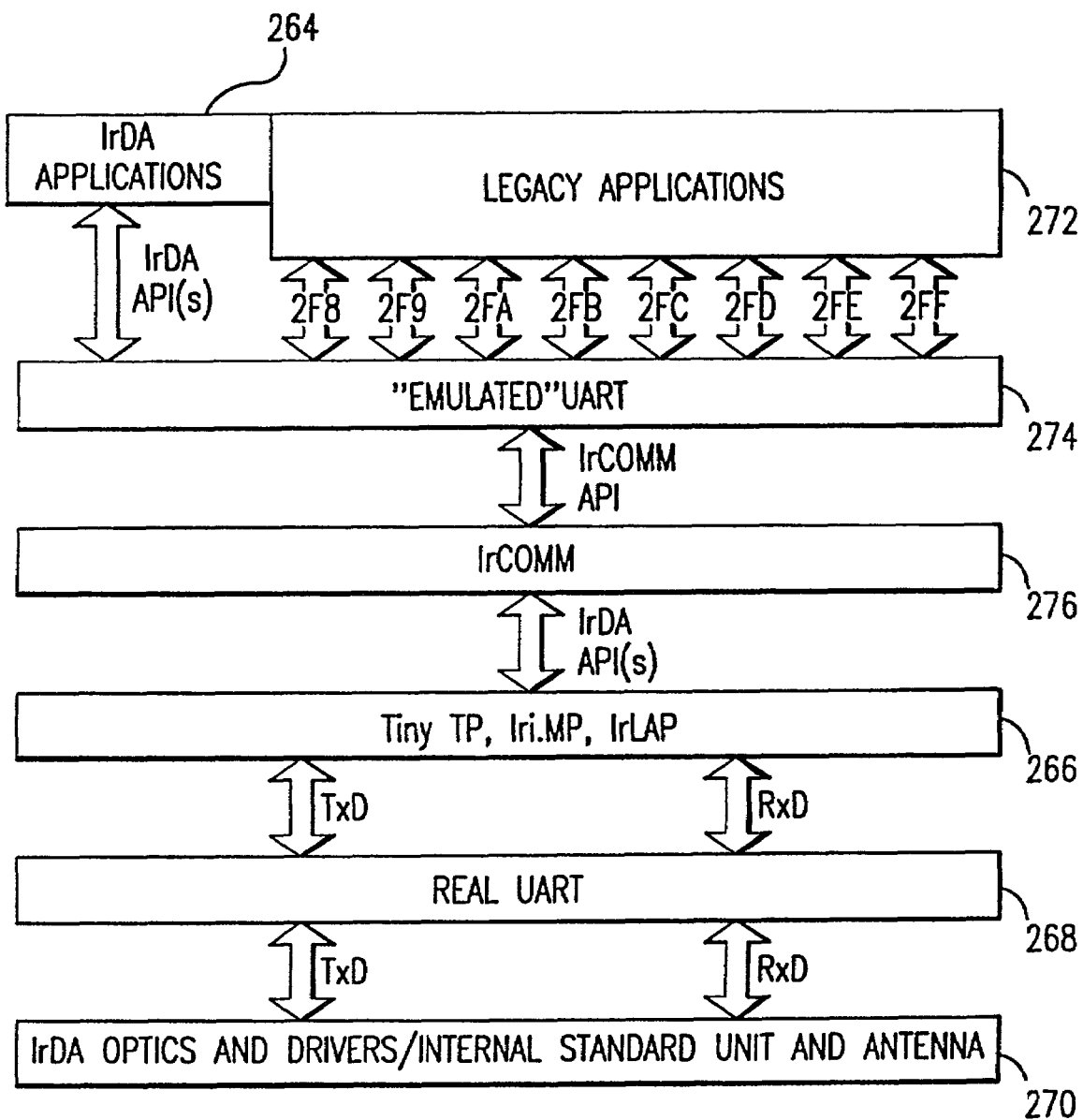
FIG. 20 shows software data and control flow in the terminal.

The software data/control flow within the terminal is shown schematically in FIG. 20. The IrD applications 264 flow via TinyTP, IrLMP, IrLAP 266; Real UART 268 and the IrDA optics and drivers or internal standard units in antenna 270. Legacy applications 272 flow via emulated UART 274; IrCOMM 276 and then follow the same path as the IrDA applications.

Figure 21:
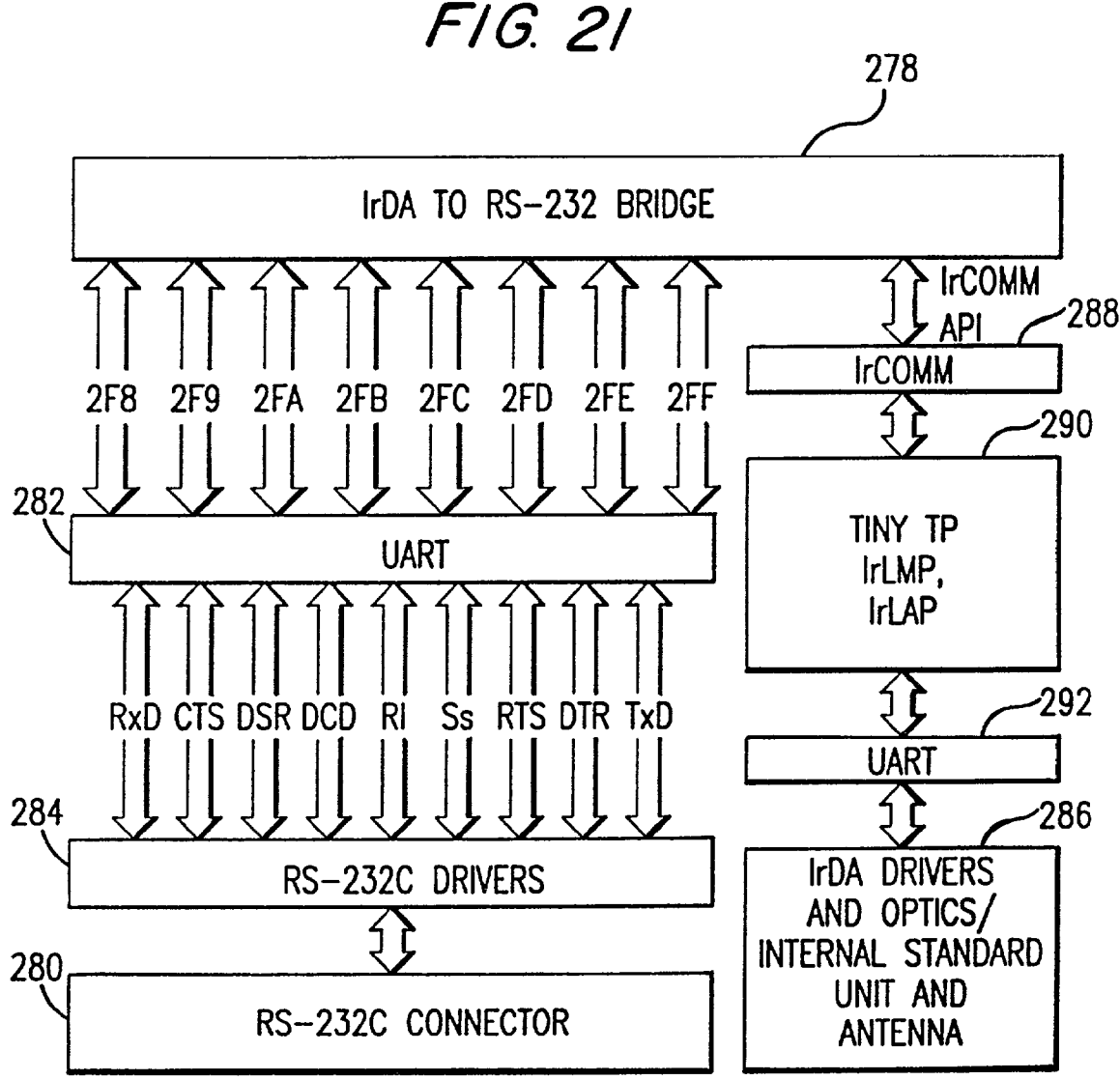
FIG. 21 shows software data and control flow in a cradle.

FIG. 21 shows software data in control flow within is the cradle. Flow from IrDA to RS 232 bridge 278—RS 232C connector 280 is via UART 282 and RS 232C drivers 284. Data flow IrDA to RS 232 bridge 278—IrDA drivers and optics/internal standard unit and antenna 286 is via IrCOMM 288; TinyTP, IrLMP, IrLAP 290 and UART 292.

Many client devices are configured to receive an adapter card allowing them to perform network access.

The components of such devices and adapter cards are well known to the skilled person and will not be described in detail here. One example of a network adapter is the system sold under the trade mark SPECTRUM 24 by the assignees of the present application.

In known systems such as that shown in FIG. 25 it is often desirable for a Client Device to perform Network File Access using Network Files System Clients (NFS) via Network Protocol Stacks on Network Adapters. To accomplish this, the Client Device 350 must generally utilize a PCMCIA slot to hold the Adapter Card 352. Additionally, various Software Components, such as a PCMCIA Card Driver 354, Protocol Stack 356, and Network File System Client 358, must all be present and executing on the Client Device.

For small, low cost Client Devices, the secondary storage needed to hold these Software Components may be large compared to the total secondary storage capacity of the device. Additionally, the RAM required to execute these Software Components may be large compared to the total RAM capacity of the device. Finally, the processing power required to execute these Software Components may be large compared to the total processing power of the device.

Since many of these Software Components may need to be Client Device-specific, configuration and deployment of Network File Access on various Client Devices may be difficult. Additionally, the secondary storage required to hold the required Software Components may require the use of a second PCMCIA slot, which may not be practical or desirable depending on the capabilities of the Client Device. Finally, the configuration and maintenance of a network can be very difficult and time consuming.

The client device and network adapter card interface via a PCMCIA interface 362. In the case of the existing-Adapter Card 352, the software consists of an autonomous radio control program 360 with an interface 352 to the ODI or NDIS driver 355 in the Client Device.

Figure 27:
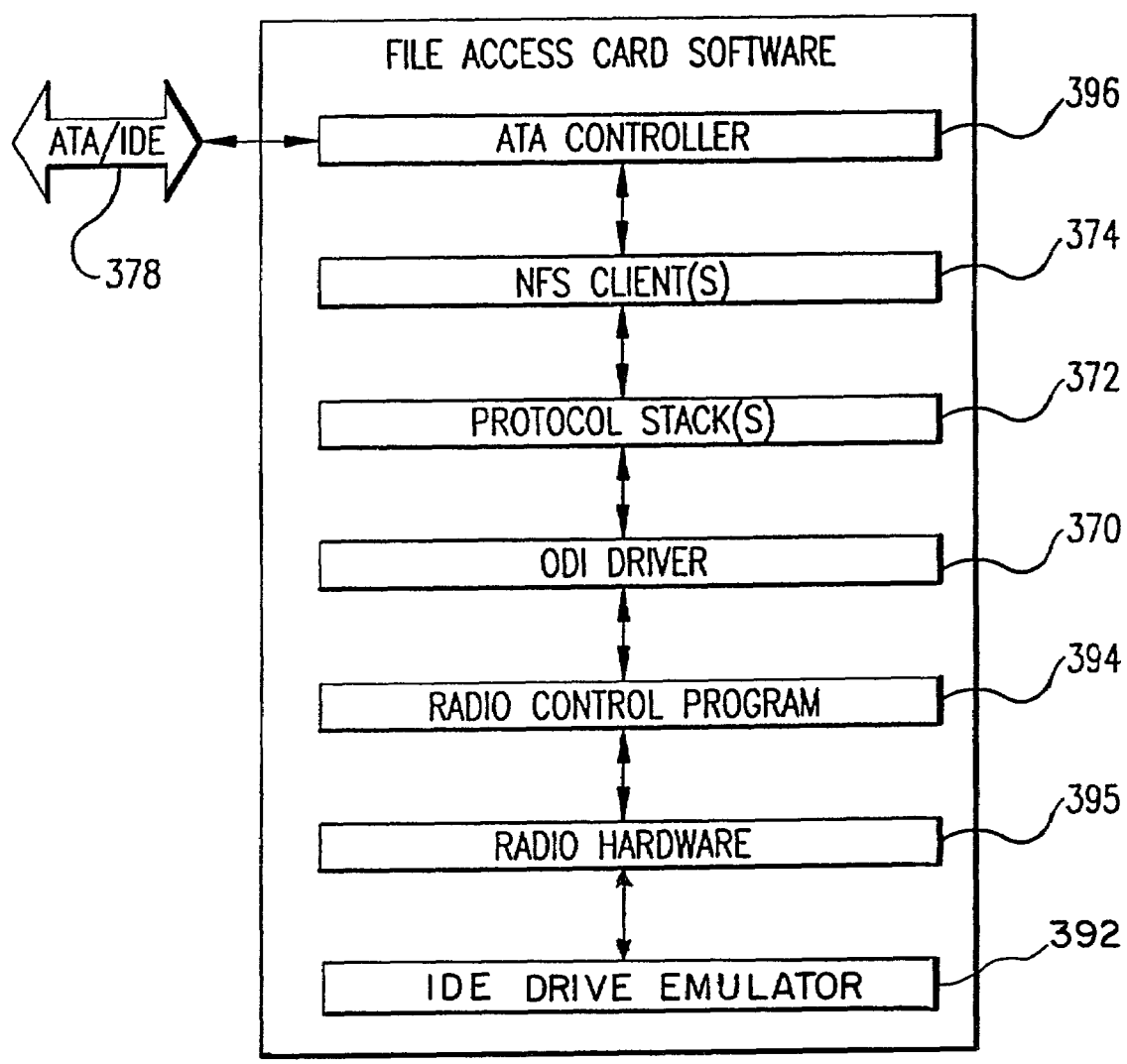
FIG. 27 is a software block diagram of the alternative File Access Card system.

The invention as shown in FIGS. 26 and 27 incorporates the functionality of the Network Adapter Card 370 into a System which also includes Network Protocol Stack(s) 372 and the NFS Client(s) 374. The entire System is then packaged into a PCMCIA card that emulates a standard PCMCIA ATA card. This allows any Client Device 376 which is capable of accessing a PCMCIA ATA card to transparently access files from a File Server. Since the only interface between the Client Device and the System is the ATA/IDE interface 378, the Client Device need have only an ATA/IDE driver 380 NOT a network adapter driver, Network Protocol Stack(s), and NFS Client(s).

The File Access Card 370 consists of a Processor, RAM, Flash and a conventional radio 388 for example of the type sold number the trade mark SPECTRUM 24 by the assignees of the present invention. This is basically the same design as the existing Adapter Card.

The fundamental difference in the proposed solution is the software running on Processor 382. The interface to the Client Device ODI or NDIS driver is replaced by a direct interface to an ODI driver 390, one or more Protocol Stacks 372, and one or more NFS Clients 374, all within the File Access Card 370 itself. All of these Software Components then run on the Processor 382 in the File Access Card 370. The software necessary to emulate an IDE disk drive is present to provide the interface to the Client Device.

The software further includes a Radio Control Program 394 unchanged from standard Radio Control Programs except that instead of interfacing to an ODI driver in the Client System via the PCMCIA interface 378, it interfaces directly to the ODI driver 390 running in the same processor within the File Access Card 370. The Protocol Stack(s) 372 and NFS Client(s) 374 load on top of the ODI driver 390 in a similar manner to the way they would on a Client Device. The ATA/IDE controller software 396 must emulate the ATA/IDE interface 378 and use the services of the NFS Client(s) 374 to access the files on the NFS server in response to Client requests via the ATA/IDE interface 378 to access the emulated disk.

In order to support multiple Protocol Stacks 372 and NFS Clients 374, the File Access Card 370 must either have multiple Protocol Stacks and NFS Clients, with a mechanism to select which one to use, or must provide a means for loading the desired Protocol Stack and NFS Client.

The File Access Card 370 further includes suitable Radio Hardware 395.

The Conventional Adapter Card Drivers require certain parameters (such as Net ID) to be specified. A mechanism must be provided for specifying these parameters. Additionally, Protocol Stacks 372 and NFS Clients 374 typically require setup parameters (such as IP address, log on name, password, etc.). A mechanism is provided to specify this information.

Numerous solutions to the problems of loading/updating Protocol Stacks 372 and NFS Clients 374, and setting parameter information can be devised. Since the hardware implementation contains Flash Memory 386, this is the obvious place to store these varying types of data. One method is to use a portion of the Flash memory 386 to emulate a disk (in the same manner used by a normal ATA Flash Card). This disk contains the standard Protocol Stack 372 and NFS Client Files 374, as well as the configuration files (NET,CFG, PCTCP.INI, etc.) used to configure the Protocol Stacks and NFS Clients. All of these files are located in the root directory or in subdirectories of the ATA drive, and all are physically stored in the Flash memory 386 of the File Access Card 370. To reconfigure or reload the Protocol Stacks 372 and/or NFS Clients 374, the Client Device need only edit or copy files within the Flash memory via the ATA driver.

In order to allow access to both the local Flash memory 386 of the File Access Card 370 and the files on the File Server using the same interface, the File Access Card ATA Controller 396 must merge the files from the File Server into the disk it is emulating. The simplest way to do this is to treat each File System mounted via the NFS Client 374 as a subdirectory in the emulated drive. By limiting the File System names to 8 characters, the name of the File System can also be the name of the subdirectory (off the root of the emulated ATA drive) that is used to access that File System.

When accesses are made to the sectors containing the directory information for a File System, the ATA 396 controller must obtain the current directory information from the File System via the corresponding NFS Client 374, construct the directory sectors accordingly, and make them available to the Client Device (via the ATA interface 378). When accesses are made to the data sectors referenced by the directory sectors, the ATA Controller 396 must obtain the data for the accessed files via the NFS Client 374, create the data sectors, and make them available to the Client Device.

If the File Access Card 370 has sufficient Flash memory 386, it may make sense to cache sectors of directory or data so that frequent accesses by the Client Device execute faster. This must be balanced carefully to trade off quick access with accurate data. Since the files on the mounted File system may be accessible by other Clients, they are not guaranteed to remain valid once they have been cached in the File Access Card 370. Adjustments to allow the Client Device to control the behaviour of the caching logic would be necessary. This information can be stored in a configuration file along with the other parameterization information.

Security issues may arise due to the need to store log on names, passwords, etc. within the Flash memory 386 of the File Access Card 370. As this information now travels with the card and, being portable, may represent a security breach, it is possible to use various encryption techniques to secure the configuration files from unauthorized browsing. The File Access Card 370 needs to make a temporary, unencrypted copy of this file for the use of the Protocol Stack(s) 372 and NFS Client(s) 374 whilst it is starting up. Once it is running, this temporary copy can be removed. So long as this temporary copy is not accessible to the Client Device it does not represent a security breach.

Data integrity issues may arise due to the need to power cycle the File Access Card 370 when used in portable Client Devices. Additionally, any time the card is removed from the Client Device, it loses power. The design of the ATA controller 396 must ensure that a write is completed fully or not at all. This is a standard design constraint of Flash memory-based ATA controllers. The File Access Card 370 must take this precaution one step further. A write cannot be considered complete until it has been successfully propagated to the File Server. Any local caching performed within the File Access Card 370 must synchronize with this all-or-nothing write behaviour.

The File Access Card 370 must establish/reestablish connections and mount/remount File Systems automatically whenever power is applied to the card. This may take a significant length of time and-access to the card may need to be delayed until this processing is complete. This is already possible with ATA cards, where the time needed to "spin up" a hard disk may be significant. The ATA/IDE 378 interface provides the mechanism necessary to delay access to the card until it is ready. Furthermore, when accesses to card data require NFS activity to get the data, individual accesses may be quite slow. The same mechanisms described previously can be applied to hold off the Client Device until data is available.

Since the File Access Card 370 must contain essentially the same hardware and firmware as a standard Adapter Card, it could also be designed to operate as such an Adapter Card. This would, of course, require the Adapter Card Driver and Protocol Stacks to be present in the Client Device. This would allow the card to be used as either a File Access Card or a standard Adapter Card interchangeably (although not at the same time).

It is also possible to create a custom communication layer between the Client Device and the File Access Card 370 that replaces the standard network layers that would normally be present on the Client Device. Since the File Access Card 370 contains the ODI driver 390 and Protocol Stack(s) 372, there is no need to duplicate these components in the Client Device. The application interface to the network can be reimplementation to use this custom communication layer, instead of talking directly to the Protocol Stack(s) 372. The end result is that Client Device applications can utilize network services without actual Protocol Stacks 372 executing on the Client Device. Suitable application interfaces will be well known to the skilled person and are not described further here. For example the interfaces available under the trade marks BERKELEY SOCKETS or WINSOCK would be appropriate.

Using the above approach it is then possible to permit direct access to network services (e.g. via application interfaces) concurrently with access to File Server files. This would require, of course, that the File Access Card 370 possessed sufficient computing capabilities to support emulation of the ATA/IDE interface 378 and support the custom communications layer at the same time.

The above described arrangement gives rise to a number of advantages in applications. For example the invention provides support for wireless access to files on file servers from any Client Device such as a PCMCIA slot and supports access to ATA cards. Client Device specific protocol stacks or NFS Clients are not required. At the same time simplified configuration for access to NFS File System is allowed. Once a card has been configured for use with a given set of protocol stacks, NFS Clients and File systems it can be freely moved from Client Device to Client Device with no change in configuration required. Because no protocol stacks or NFS Clients need to be present on the Client Device reduced memory and secondary storage requirements for Client Devices are achieved, allowing yet thinner clients. The protocol stacks and NFS Clients run in the File Access Card processor rather than in the Client Device providing consistent performance across multiple Client Devices. There is also potential reduction in the number of PCMCIA slots required to support a given application. Since all software components required to support file server access are present on the same card, many client devices may avoid the use of additional PCMCIA storage cards. This may allow Client Devices with only a single available slot to access file server files successfully.

According to another aspect there is provided an embedded storage device for use in an embedded PC-based system allowing a single standard storage solution supporting directly executable storage (e.g. BIOS) and secondary storage (e.g. disk) with field upgrade ability, suitable for use in all PC-based embedded computing systems. Hereafter the embedded storage device is simply called the Device and the embedded PC-based computing system is simply called the System.

Figure 30A:
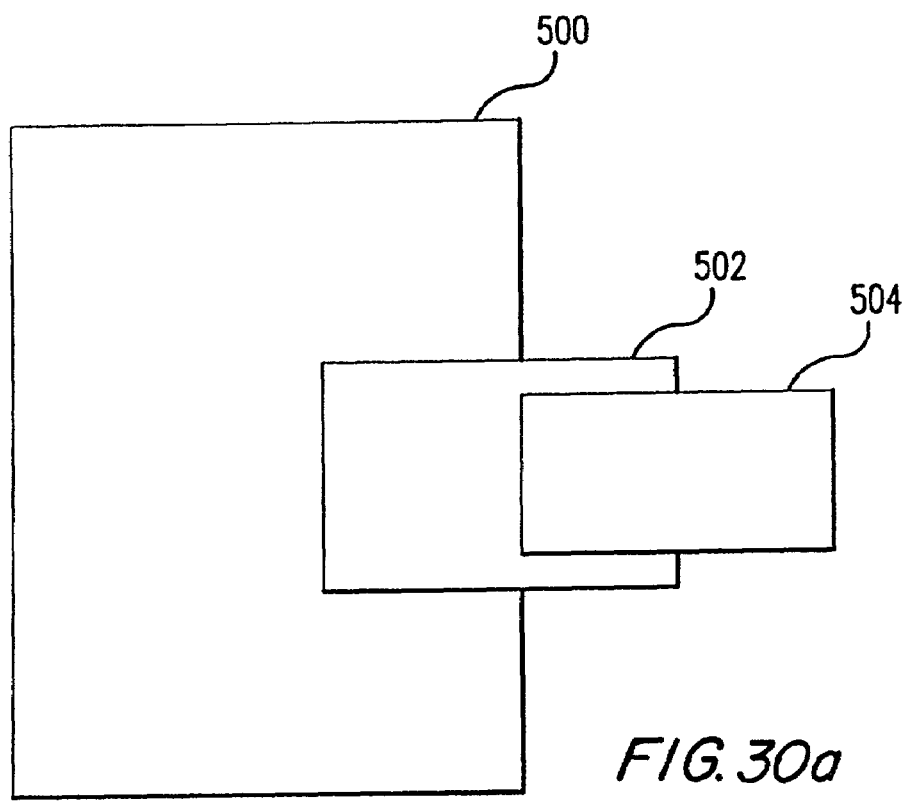
FIG. 30a shows a transparent web server.
Figure 30B:
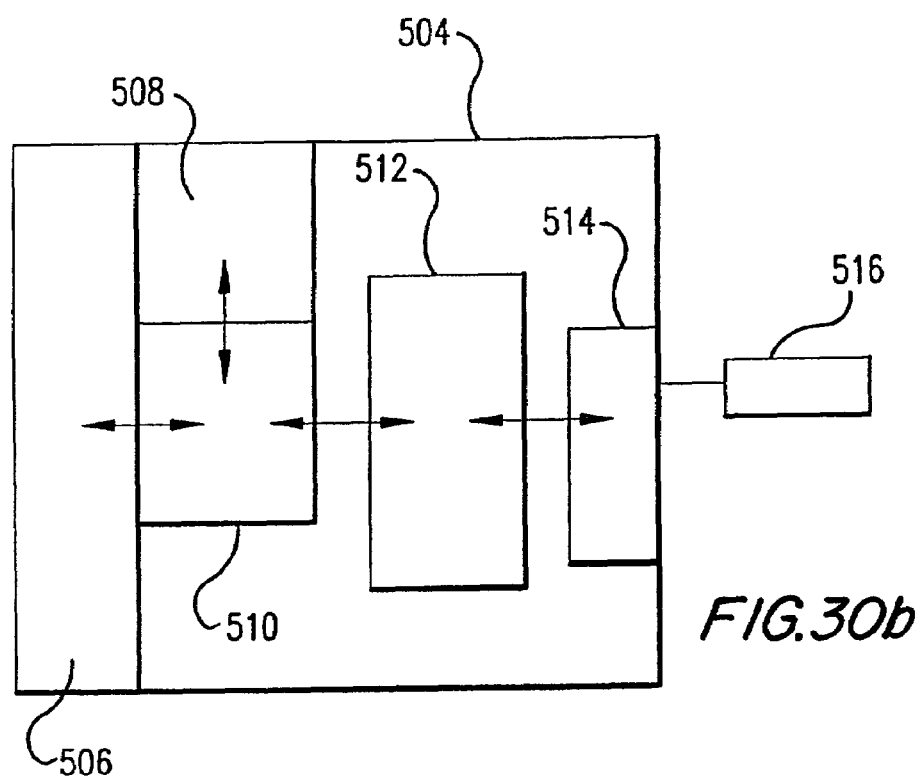
FIG. 30b shows a transparent web server card.
Figure 31A:
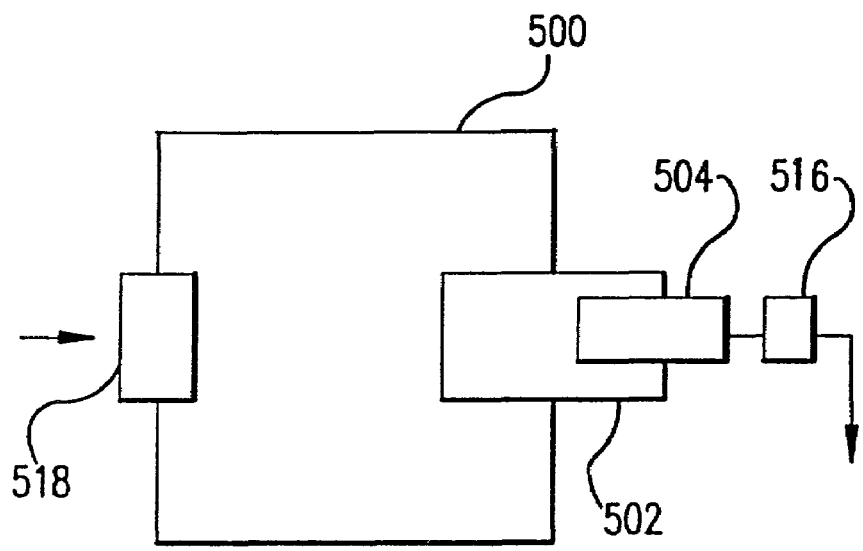
FIG. 31a shows browsing in relation to the transparent web server.
Figure 31B:
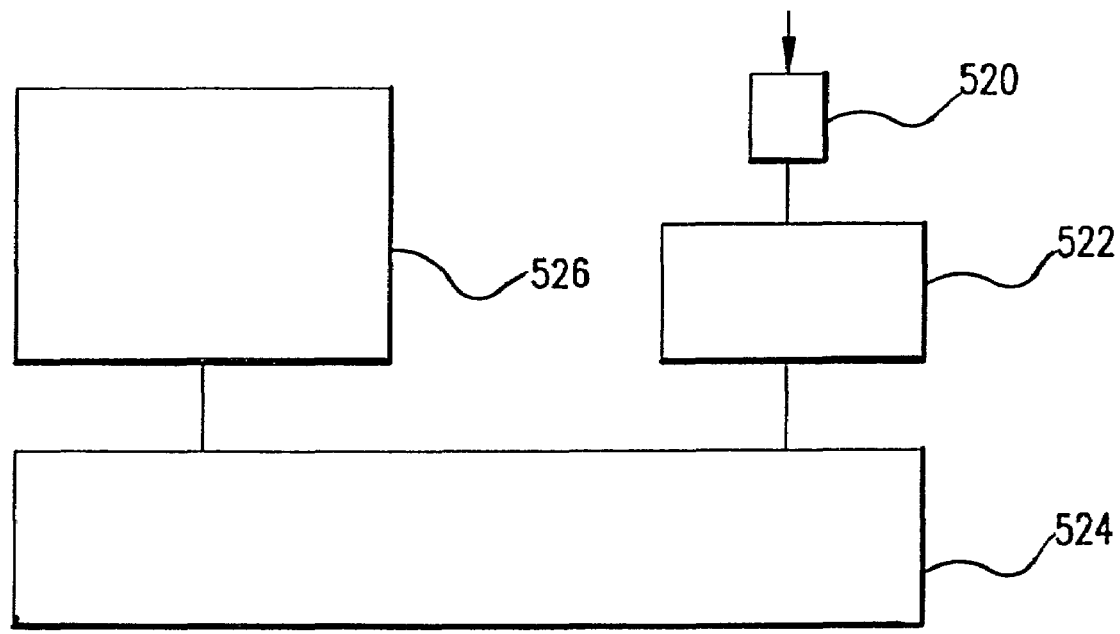
FIG. 31b shows another aspect of browsing in relation to the transparent web server.

One implementation of the invention is in relation to a "portable server", that is, a mobile terminal carrying server capability as described in more detail in copending U.S. application Ser. No. _____ filed 28, Mar. 1997 commonly assigned herewith, which is incorporated herein by reference. As shown in FIGS. 30*a*, 30*b*, 31*a* and 31*b*, web server capability can be implemented in a plug-in card, for example a PCMCIA card. A mobile device 500 which can be any suitable mobile device such as a terminal of the type discussed above, personal digital assistant, digital camera and so forth including a card interface port 502, for example a PCMCIA or compact flash slot receives a card 504 at the interface. The card 504 carries server capabilities for example for the internet or worldwide web and the system thus acts as a transparent web server. Referring in more detail to FIG. 30*b*, the card 504 includes a PCMCIA or other suitable interface for communication with the mobile device 500, flash memory 508 and an ATA (AT attachment) controller 510 used to implement the hard drive. The memory 508 is for storing data produced by the mobile device and the card 504 further includes a CPU 512 which accesses the data and operates a web server software routine. The CPU 512 is configured to run a suitable radio communications module 514, for example of the type available from the assignees under the trade mark "SPECTRUM 24 RADIO". CPU 512 is also configured to handle the TCP/IP protocols. The mobile device 500 carrying the card 504 is thus able to communicate with a suitable nearby access point and then to a client PC via aerial or antenna 516.

As a result the client PC can display a web page representative of data stored in the memory of the mobile device as desired. The card 504 can thus convert any device, as discussed above, into a server for the web. This is shown in more detail in FIGS. 31*a* and 31*b*. The mobile device 500 collects data at a data collection point 518 which can be, for example, a still, video or digital camera, a bar code reader, a microphone or a data input point such as a keyboard. The data is stored, for example in the card 504 making use of the ATA controller 510. The card 504 cooperates with the device 500 to act as a transparent web server and transmits the data from the card 504 via the antenna 516. The transmission is received by an antenna 520 to an access point 522 connected to the Ethernet backbone 524. Connected to the backbone 524 is a client PC 526. Accordingly when, for example, a worldwide web browser of any suitable type is run on the client PC 526 and calls up the "web page" at the mobile device sending an HTTP request for the desired Universal Resource Locator (URL) the request is routed via the backbone 524 and acts as point 522 to the transparent web server formed by the device 500 and card 504. The data collected at the mobile device is transmitted back to the access point in response to the request and the web page is routed to the client PC 526.

Turning to the physical requirements of the Device:

The Device is implemented in one of two physical embodiments: Modular and Component.

The Modular embodiment of the Device consists of a single, self-contained circuit board (or equivalent) which can be mounted on a circuit board (or equivalent) within the System. The subsystem implemented by the Component embodiment shall interface to the remainder of the system via the set of interface signals described below.

Modular embodiments of the Device interface to the System via a standard connector of suitable type. This connector provides the set of interface signals described below. Additionally, this connector is low cost, low profile, and highly immune to shock and vibration. This connector is not intended to be used for frequent insertion and removal, since this aspect is concerned with embedded, non-removable applications.

All embodiments of the Device interface to the System via the same set of interface signals. These signals represent a subset of the ISA bus signals, the additional signal(s) required to interface to a standard BIOS EPROM, plus signals used to control Device options. The set of required signals is listed below:

Power signals, for example
  +3.3 Vdc,
  +5 Vdc,
  +12 Vdc,
  Ground for various applications.
Control signals, for example clock, data transfers, valid address, valid data, zero wait state for current bus cycle, oscillar clock signal, reset-return to default state and prepare for normal XIP and Disk operations. If necessary, the Device can drive this line to keep the system in reset state until its own reset is complete,
  I/O device read strobe command,
  I/O device write strobe command,
  memory read strobe command,
  memory write strobe command signal to the system that the current I/O or EPROM memory cycle must be extended. This signal must be used in accordance with the performance requirements described below, signal to the System that a 16 bit EPROM memory cycle is required. This signal must not be used by the Device unless the USEMEM 16 signal is present indicating that the System is capable of and willing to participate in 16 bit EPROM memory cycles.
  Indicate to the System that a 16 bit I/O cycle is required. This signal must not be used by the Device unless the USEIO16 signal is present indicating that the System is capable of and willing to participate in 16 bit I/O cycles.
EPROM Control Signals for example:
  Indicate that the System is accessing the XIP section of the Device. This signal is generated by address decoding logic in the System and is presented after the appropriate address lines are valid. Indicate to the System that the XIP section access is complete and that the XIP section data is available on the data lines.
  If this does not occur within a single cycle, the Device must use the IOCHRDY signal to initiate extended wait cycles.
  Indicate to the System that the XIP section is ready for access by the System. This signal shall be activated after the initialization process instituted by the RESET signal is completed. The System shall not access the XIP section following RESET until this signal is activated by the Device.
  Indicate that the System grants permission to the Device to update the contents of the IPL subsection of the XIP section. When this signal is not present, the IPL subsection contents must not be modified (even if the appropriate commands are sent to the Device by the System).
Device Option Control Signals including:
  Indicate that the system wishes the Device to enter its lowest power state as soon as possible. Power consumption and timing requirements are described below. Once in suspend state, the Device need not support XIP or Disk accesses until this signal is deactivated and the Device has resumed operation (indicated by deactivating the SUSPSTATE signal).
  Indicate to the System the current suspend state of the Device. If the Device is currently in suspend state, this signal will be active, otherwise it will be inactive.
  Indicate that the System grants permission to the Device to use full power at will. Full power operations performed at the discretion of the Device (e.g. background operations), are only allowed when this signal is active. Full power is always permitted to be used by the Device during an explicitly requested XIP update or Disk write operation, regardless of the state of this signal. Indicate to the System that the Device is currently using full power. This signal need only be set when the previous signal indicates that the Device is permitted to use full power in the background and when the Device is actually doing so. This signal may also, but is not required to, be used to signal use of full power during an explicitly requested XIP update or Disk write operation.
  Chip select signal for IDE to addressee.
  Drive Active/Salve Present signal used by a Slave IDE device to acknowledge the Master IDE device during initialization.
  Signal used by the System or the external configuration fixture to indicate that the Device may be reconfigured and that the 5 and 12 volt supplies are available. The configuration of the Device shall not be changed (even if the appropriate commands are sent to the Device by the System) unless this signal is present.
  Indicate that the System is capable of executing 16 bit I/O cycles and is willing to interact with the Device using such cycles. The Device decides whether to use 8 and 16 bit cycles and indicates the choice to the System via the appropriate signal.
  Indicate that the System is capable of executing 16 bit EPROM memory cycles and is willing to interact with the Device using such cycles. The Device decides whether to use 8 and 16 bit cycles and indicates the choice to the System via the MEMCS16 signal.
Address Signals, for example
  To address the [up to 256K of the] XIP section of the Device, the System.
  If an implementation of the Device chooses to expand the size of the XIP section beyond 256 KB, additional address bits may be used to address the extra memory.

The Device can assume that ALL address bits are valid when the appropriate signal is present. The design of a System using the Device must therefore ensure that the appropriate signal generation takes into account the upper address bits. If a System were to generate that signal any time the lower address bits contained the right values, without regard to the upper address bits, then the Device might access memory other than the intended XIP section.

Data Signals, for example

When the appropriate signal indicates the need for an 8 bit memory cycle, then only a first range is used. If the signals indicate the need for a 16 bit memory cycle, then the first range is used, but the latter range may only be used after signals indicates the readiness of the upper data lines.

Interrupt Signals, for example IRQ signal supported by the Device. It is used only for IDE interface emulation. This signal may be connected to any available System IRQ line, but for compatibility, it is suggested that it be tied to the standard hard disk interrupt.

All programming voltage(s) required to access the storage within the Device are generated within the Device from either a single 3.3V or a single 5V supply voltage. A System need only provide one of these supply voltages, but may optionally provide both. The Device must be capable of obtaining its normal operating power from either supply. These supply voltages are provided via the standard Device interface described above.

The Device shall constrain its operation to conform to one of three power states as determined by the two Device option control signals discussed above. For example the signal may indicate that the Device should enter its lowest power mode and not respond to XIP or Disk section accesses or that the Device is free to use full power at its own discretion.

In the absence of either signal, the Device shall support all access operations, but must perform higher power operations (such as erase) only within the duration of an operation explicitly requested by the System (e.g. XIP update or disk write).

If the Device supports background operation (moving blocks, erasing, etc.) it may only use full power during background operations when the appropriate signal is present and must terminate such background operations if that signal is deactivated.

The Device must be capable of changing states within milliseconds from the time the signal changes. The Device must report whether or not it is in suspend state via the appropriate signal. The Device must report any background use of full power via the appropriate signal.

Table 2 describes the relationships between the power control and status signals and the power limitations for each state:

TABLE 2

| State Name | Enter Lowest Power State Signal | Current Suspend State Signal | Full Power at Nil Signal | Device using Full Power Signal | Maximum Permitted Current Load |
|---|---|---|---|---|---|
| Suspend | active | active (within 1 ms) | don't care | inactive | <1 mA |
| Busy | inactive | inactive | active An explicitly requested XIP update or Disk write operation is in progress | don't care | 50 mA |
| Background Idle | inactive | inactive | active No high power background operation is in progress | inactive | 20 ma |
| Background Busy | inactive | inactive | active A high power background operation is in progress. | active | 50 mA |
| Normal Idle | inactive | inactive | inactive No explicitly requested XIP update or Disk write operation is in progress. | inactive (within 1 ms) | 20 mA |
| Normal Busy | inactive | inactive | inactive No explicitly requested XIP update or Disk write operation is in progress. | inactive (within 1 ms) | 50 mA |

If the Device supports an IDE formatted section, then is shall support the standard Idle and Sleep commands of the ATA specification for controlling the power states of the IDE Disk controller.

Since the Device is intended for embedded applications and especially mobile embedded applications, size is of significant concern. A system design incorporating the Device must balance capacity vs. available space. For example several discrete sizes will be standardized in each of the two embodiments (Modular and Component).

Figure 22:
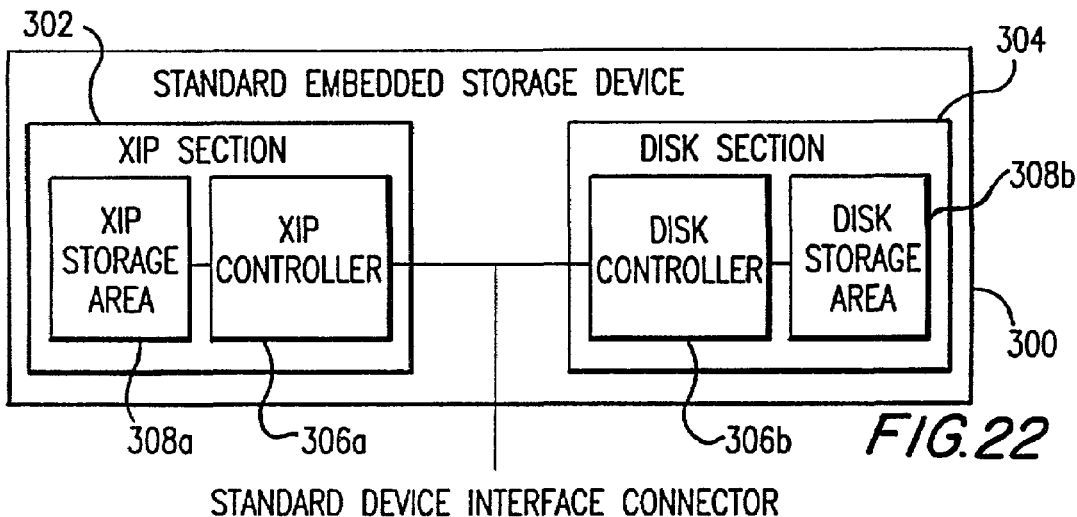
FIG. 22 is a block diagram showing components of an embedded storage device.

The functional requirements of the Device are as follows:

Referring to FIG. 22, a block diagram showing the logical structure of a typical implementation of the Device, the Device 300 provides support for two storage sections: An XIP (eXecute In Place) section 302 and a Disk section 304.

The XIP section of the Device 304 supports adjustment in size ranging from OKB up to 256 KB in 64 KB increments.

Larger XIP sections (greater than 256 KB) and/or smaller adjustment granularities (less than 64 KB) may optionally be supported, but must not prevent compatibility with the above requirements.

The Device contains two logical controllers 306a,306b and two logical storage areas 308a,308b. Although specific implementations of the Device might combine the functions of the two controllers or storage areas, these terms are used herein to describe the required functionality.

The XIP section 302 of the Device 300 is subdividable into 2 subsections: the IPL (Initial Program Loader) subsection and the BIOS (Basic Input/Output System) subsection. For use in a specific System each Device is configured for the use of the required subsection(s).

The IPL subsection of the XIP section of the Device, if configured for use by the System, is 64 KB in size and is addressed as the first 64 KB of the linear addressable area of the XIP section. If the design of a System requires the IPL subsection to be interchanged with the BIOS subsection, then the System must provide the logic to adjust the address lines supplied to the Device. No XIP section remapping logic is required to be implemented within the Device.

IPL subsection sizes larger or smaller than 64 KB may optionally be supported, but must not prevent compatibility with the above requirements.

The BIOS subsection of the XIP section of the Device, if configured for use by the System is adjustable in size ranging from 64 KB to 256 KB in increments of 64 KB. A BIOS size of 256 KB is allowed by a Device with a 256 KB XIP section only if the IPL subsection is not configured for use. If the design of a system requires remapping of areas of the BIOS, then the System must provide the logic to adjust the address lines supplied to the Device. No XIP section remapping logic is required to be implemented with the Device.

Larger BIOS subsection sizes and/or smaller granularities may optionally be supported, but must not prevent compatibility with the above requirements.

For Modular embodiments of the Device, the partitioning of the Device into the XIP section and the Disk section is possible via a separate external configuration fixture to which the Device is connected via the standard connector described above.

For Component embodiments of the Device the partitioning of the Device into the XIP section and the Disk section is possible either in-circuit or via an external configuration fixture (if the System board itself is equipped with the standard Device connector).

The actual configuration of the XIP section of the Device is accomplished via the standard configuration interface described above.

It is permissible to require 5V (for radio) or 12V supply voltages (in addition to the standard 3.3V or 5V operating voltages) for configuration purposes only. These supply voltages must not be used except when the appropriate signal is present. This signal identifies that the configuration supply voltages are valid and that Device configuration is permitted. At a minimum, the configuration supply voltages and the signal would be provided by the external configuration fixture via the standard Device connector. The configuration supply voltages and the signal are described above.

The configuration of the Device, once performed, must be stored within the Device in a nonvolatile manner. This may require the use of a separate configuration storage area. Although it is possible to reconfigure the Device in the event of an erroneous configuration, this is considered an infrequent event. It is therefore permissible to limit the number of reconfigurations (to allow use of a limited re-write configuration storage area). In any event, a minimum of for example 100 reconfigurations are supported.

It is possible to detect the capabilities and configuration of the Device. The XIP section capabilities and configuration are determined via the interface described below.

The Disk section of the Device conforms to one of two formats: IDE or FTL. A standard mechanism exists for determining which of the two formats is supported by an implementation of the Device. It is permissible to have an implementation of the Device that supports both formats. In such a case, an additional configuration option must be provided to select the format that will be used as the "primary" or "boot" device. The selection and detection of the disk section configuration is not required to permit read accesses to the XIP section interleaved with accesses to the I/O interface of the XIP controller. As a result, the System may not execute from the XIP section while updating or configuring the XIP section via the XIP controller.

A Disk section supporting the IDE format provides a complete emulation of an IDE disk drive and is configurable to operate in any of the following modes: Primary IDE master, Primary IDE slave, Secondary IDE master, Secondary IDE slave. The selection of the mode is determined by the settings of the appropriate signals described above.

The management of the logical disk drive within the disk storage area is performed by the Disk controller within the Device. Access to the logical disk drive is via IDE commands sent to the Disk controller by the IDE driver within the BIOS.

A Disk section supporting the IDE format is configurable to operate in either 8 or 16 bit wide modes. The data width is selected by the System, via the appropriate signal. Although this signal may be dynamically controlled by the System, it would normally be tied high or low depending on the capabilities of the System. When the signal is present, the corresponding signal is used by the Device to indicate to the System that 16-bit accesses are required.

Figure 23:
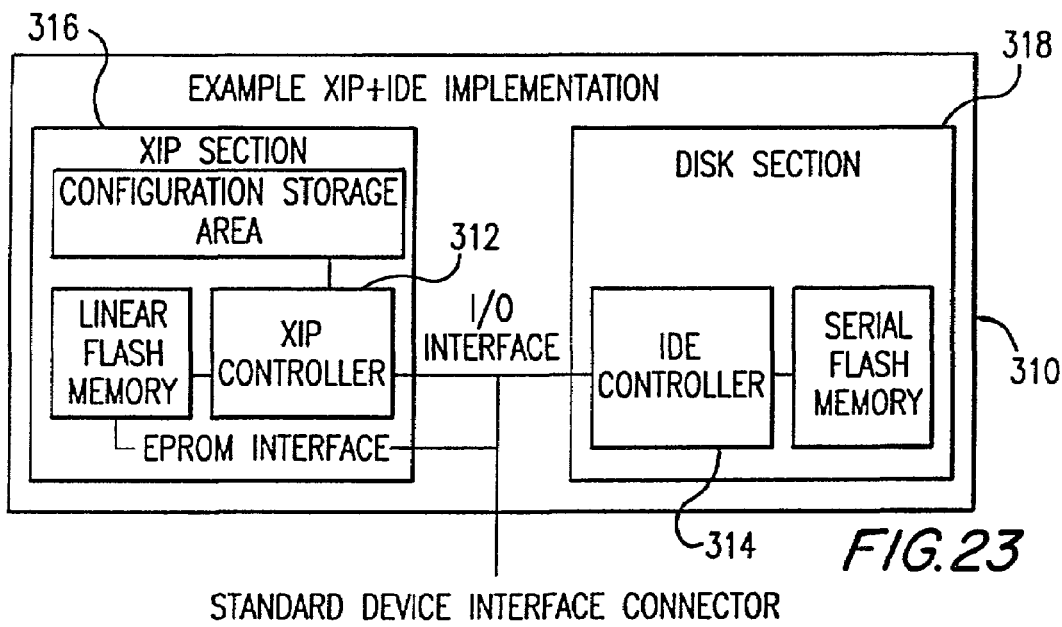
FIG. 23 is a block diagram showing a configuration of an alternative storage device.

A block diagram showing one possible implementation of the Device with an IDE format Disk section is shown in FIG. 23.

The Device implementation 310 shown contains separate XIP 312 and Disk 314 controllers and separate XIP 316 and Disk 318 storage areas. The XIP controller 312 handles the configuration and updating of the XIP storage area and the Disk controller handles the emulation of the IDE drive using the Disk storage area.

Figure 24:
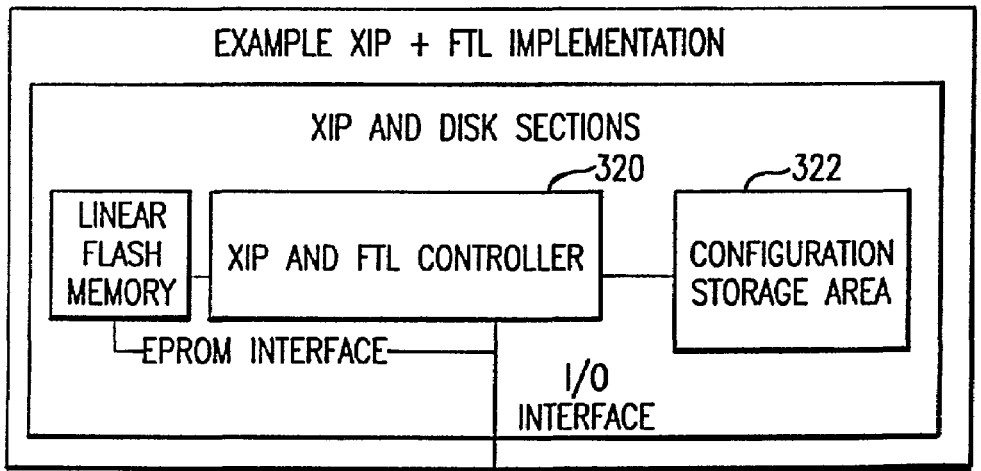
FIG. 24 is a block diagram showing the configuration of yet a further alternative storage device.

A Disk section supporting FTL format is shown in FIG. 24 in block diagram and provides a standard mechanism for accessing blocks for storage within the XIP storage area. This standard mechanism must be the same regardless of the technology used to implement the disk storage area within the Device and is described below.

The Device implementation shown contains a single controller 320 serving as both the XIP and Disk (FTL) controllers and a single storage area 322 serving as both the XIP and Disk storage areas. No IDE support is provided, and the XIP and Disk controller functions share common logic.

The BIOS of every System that utilizes the Device must include both IDE and FTL drivers to ensure that all implementation of the Device may be used on all Systems.

The XIP section of the Device emulates 8-bit, byte-addressable read-only linear memory (e.g. equivalent to a similarly-sized EPROM). Address bits sufficient to address up to 256 KB are provided by the System to the Device and they are decoded as necessary within the Device. The appropriate signal is provided by the System to the Device to identify that the XIP area is being addressed. Address decoding required to produce the signal from a wider range of address bits is the responsibility of the System.

16-bit EPROM emulation may optionally be supported, but must not prevent compatibility with the above requirements. If supported, the 16-bit EPROM emulation mode shall be enabled by the System via the appropriate signal. Although the signal may be dynamically controlled by the System, it would normally be tied high or low depending on the capabilities of the System. When the signal is present and the Device supports 16-bit mode, then the corresponding signal is used to indicate to the System that 16-bit accesses are required.

The contents of the XIP section of the Device, if configured for use by the System, are updatable, in circuit, via a standardized programming interface. The Device supports the standard XIP section programming interface described below, regardless of the specific technologies used in the implementation the XIP storage area of the Device.

The IPL subsection of the XIP section of the Device, if configured for use by the System is independently protectable from update via a signal hat "protects" or "unprotects" the IPL subsection.

The Disk section shall be updatable, in circuit, via the standard DOS disk driver and the standard BIOS IDE or FTL drivers, regardless of the specific technologies used in the implementation of the Disk storage area of the Device.

The rated storage capacity of the Device is defined to be the size of the Disk section supported by the Device when an XIP section of 256 KB has been configured. This should provide a worst case measurement for all implementations.

Although it is permissible for an implementation to extend the size of the XIP area beyond the requirements of this specification, this extra space shall not be considered to increase the rated storage capacity of the Device unless incorporated into the Disk section when the XIP section is configured to a size to 256 KB.

The XIP section of the Device provides performance sufficient to allow direct execution of code from the emulated linear memory. Since the Device is interfaced through the ISA bus, the maximum speed of access may be limited where appropriate by the 8 MHz ISA bus speed. Use of ISA bus extended wait states (through the use of the appropriate signal) is permitted in the event of delayed access to XIP data, but the maximum number of wait states shall be no more than 10 and the average number of wait states shall be no more than 2.

Although the System may optionally support the ability to "Shadow" the BIOS or other system code from the XIP area into system RAM for improved performance, thins must not be required to meet the performance requirements above.

The programming requirements of the Device are as follows.

A special I/O interface is provided by the XIP controller within the Device for determining the capabilities of the Device. This includes, but is not limited to, the following information:
Granularity of adjustment of XIP section (granule size)
Specified as an integral number of KB
Maximum size of XIP section
Specified as an integral number of granules
Must be greater than or equal to 256 KB
IDE format disk section presence flag
FTL format disk section presence flag
Size of FTL erase blocks (if FLT format is used)
Specified as an integral number of granules The Device is not required to permit read accesses to the XIP section interleaved with accessed to the I/O interface of the XIP controller. As a result, the System may not execute from the XIP section while updating or configuring the XIP section via the XIP controller.

A special interface is provided by the XIP controller within the Device for determining the current configuration of the Device. This includes, but is not limited to, the following information:
Current IPL subsection size
Specified as an integral number of granules
Current BIOS subsection size
Specified as an integral number of granules
Choice of IDE or FTL formatted drive as the "boot" device
When both are present The Device is not required to permit read accesses to the XIP section interleaved with access to the I/O interface of the XIP controller. As a result, the System may not execute from the XIP section while updating or configuring the XIP section via the XIP controller.

A special I/O interface is provided by the XIP controller within the Device for selecting the desired configuration of the Device. This includes, but is not limited to, the following information:
Current IPL subsection size
Specified as an integral number of granules
Current BIOS subsection size
Specified as an integral number of granules
Choice of IDE or FTL formatted drive as the "boot" device
When both are present The Device is not required to permit read accesses to the XIP section interleaved with accessed to the I/O interface of the XIP controller. As a result, the System may not execute from the XIP section while updating or configuring the XIP section via the XIP controller.

A special I/O interface is provided by the XIP controller within the Device for updating the contents of the XIP section. This includes, but is not limited to, the following functions:
Erase IPl
Write IPL
Erase BIOS
Write BIOS The Device is not required to permit read accesses to the XIP section interleaved with accesses to the I/O interface of the XIP controller. As a result, the System may not execute from the XIP section while updating or configuring the XIP section via the XIP controller.

When the Disk section supports the IDE format, then the standard IDE command set is supported. The System BIOS IDE driver is used to update the IDE format of the disk section.

When the Disk section supports the FTL format, then a special interface is provided by the Disk controller within the Device for updating the contents of the Disk Section. This includes, but is not limited to, the following functions:
Erase Block
Map Block
Write Block The Device permits read accesses to the XIP section interleaved with accesses to the I/O interface of the FTL controller. As a result, the BIOS FTL driver may execute from the XIP section while updating the Disk storage area via the FTL controller.

Without further analysis, the foregoing will so fully reveal the gist of the present invention that others can readily adapt to various applications without omitting features that, of the standpoint of prior art, fairly constitute essential characteristics of the generic or specific aspects of the invention and, therefore, such adaptions should and are intended to be compounded within the meaning and range of equivalents of the following claims.

The invention claimed is:

1. A product location information retrieval system in a retail establishment comprising:

a computer terminal with an optical reader arranged to receive a data input query from the customer utilizing the terminal and relating to one or more products located in a product access zone;

a positioning system that determines a position of the terminal;

a remote link that receives a wireless signal from an access point and transmits the wireless signal to the computer terminal, wherein the wireless signal is associated with information relating to the one or more products within the product access zone; and a display that presents an image of the one or more products to be accessed by the user, the image is based at least in part upon the wireless signal, the displayed image indicates location of the product with respect to the current detected position of the terminal.

2. The system of claim 1, the optical reader is a bar code reader which generates the query by scanning a bar code symbol.

3. The system of claim 1, farther comprising:
   means for delivering display format information for the display associated with a terminal; and
   means for configuring the data to be presented on the display according to the display format information.

4. The system of claim 3, the display format information includes the number of characters in a horizontal line in the display.

5. The system of claim 3, the means for configuring the data includes means for scaling the data to the size of the display.

6. The system of claim 3, the display is included in the housing of the terminal.

7. The system of claim 1, the query is relayed to a server and the terminal receives responsive data from the server using wireless communications.

8. The system of claim 1, the product access zone corresponds to a region in the vicinity of the terminal in which the product is located.

9. The system of claim 1, the terminal display provides a map of the product access zone.

10. The system of claim 1, the terminal is a mobile, handheld terminal.

11. The system of claim 1, the display indicates the position of the terminal on a map.

12. The system of claim 1, the product access zone comprises a shelf location.

13. The system of claim 1, the terminal displays an image of the product on sale.

14. The system of claim 1, a user provides information identifying the user to the system via a magnetic card swipe slot.

15. The system of claim 10, the terminal displays product offers related to the user''s personal buying patterns and/or preferences the selection of such offers being derived from a database associated with the user identification information.

16. The system of claim 11, the terminal further includes a speaker and a voice synthesizer for providing product or other information corresponding to the user's preference.

17. The system of claim 7, the mobile terminal includes a range alarm activated if the terminal leaves the product access zone.

18. A methodology for locating a product in an enclosed environment, comprising:
   providing a computer terminal to a user which is utilized within the enclosed environment;
   determining current location of the terminal, the current location determined based at least in part by establishing which access points was in communication with the terminal or a simple geometric positioning system;
   receiving a signal that provides information relating to specified products within a pre- defined radius of the user; and
   displaying an image of each of the specified products via the computer terminal the displayed image indicates location of the product with respect to the current location of the terminal.

19. A system that provides product information to a user, comprising:
   means for sending a wireless signal to a computer terminal;
   means for receiving the wireless signal via computer terminal indicative of at least one product within a product access zone;
   means for associating at least one image with at least one product located within the product access zone; and
   means for determining location of the computer terminal, the location determined based at least in part by establishing which product access zone was in communication with the terminal or a simple geometric positioning system;
   means for displaying the at least one image on the computer terminal, the displayed image indicates location of the product with respect to the current location of the terminal.

* * * * *

UNITED STATES PATENT AND TRADEMARK OFFICE
CERTIFICATE OF CORRECTION

PATENT NO. : 7,515,914 B2
APPLICATION NO. : 10/057463
DATED : April 7, 2009
INVENTOR(S) : Herrod et al.

It is certified that error appears in the above-identified patent and that said Letters Patent is hereby corrected as shown below:

In Fig. 20, Sheet 20 of 29, for Tag "266", Line 1, delete "lri.MP," and insert -- lrLMP, --, therefor.

In Column 11, Line 35, delete "art" and insert -- and --, therefor.

In Column 14, Line 43, delete "5" before "following".

In Column 15, Line 4, delete "is-not" and insert -- is not --, therefor.

In Column 25, Line 25, delete "mode;" and insert -- mode. --, therefor.

In Column 26, Line 46, after "within" delete "is".

In Column 26, Lines 54-58, delete "The component of such................application." and insert the same at Line 53, after "network access.", as a continuation.

In Column 29, Lines 43-44, delete "reimplementation" and insert -- reimplemented --, therefor.

In Column 33, Lines 17-21, after "for example", delete "IRQ signal.........interrupt." and insert the same at Line 18, as a new paragraph.

In Column 34, Line 58, delete "OKB" and insert -- 0KB --, therefor.

In Column 37, Line 40, delete "thins" and insert -- this --, therefor.

In Column 38, Line 31, delete "IPl" and insert -- IPL --, therefor.

In Column 39, Line 20, in Claim 3, delete "farther" and insert -- further --, therefor.

In Column 40, Line 5, in Claim 15, delete "user''s" and insert -- user's --, therefor.

In Column 40, Line 23, in Claim 18, delete "pre- defined" and insert -- pre-defined --, therefor.

CERTIFICATE OF CORRECTION (continued)
U.S. Pat. No. 7,515,914 B2

In Column 40, Line 26, in Claim 18, delete "terminal" and insert -- terminal, --, therefor.

Signed and Sealed this

Sixteenth Day of February, 2010

David J. Kappos
*Director of the United States Patent and Trademark Office*